US008134920B2

(12) United States Patent
Imajuku et al.

(10) Patent No.: US 8,134,920 B2
(45) Date of Patent: Mar. 13, 2012

(54) DEVICE AND METHOD FOR CORRECTING A PATH TROUBLE IN A COMMUNICATION NETWORK

(75) Inventors: Wataru Imajuku, Kanagawa (JP); Katsuhiro Shimano, Kanagawa (JP); Yoshihiro Takikawa, Kanagawa (JP); Eiji Oki, Tokyo (JP); Yasutaka Okazaki, Kanagawa (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 881 days.

(21) Appl. No.: 10/546,379

(22) PCT Filed: Feb. 20, 2004

(86) PCT No.: PCT/JP2004/001965
§ 371 (c)(1),
(2), (4) Date: Aug. 22, 2005

(87) PCT Pub. No.: WO2004/075494
PCT Pub. Date: Sep. 2, 2004

(65) Prior Publication Data
US 2006/0256712 A1 Nov. 16, 2006

(30) Foreign Application Priority Data

Feb. 21, 2003 (JP) ................. 2003-043643
Feb. 21, 2003 (JP) ................. 2003-043644
Apr. 7, 2003 (JP) ................. 2003-103092
Apr. 7, 2003 (JP) ................. 2003-103093
Apr. 7, 2003 (JP) ................. 2003-103094
Jun. 4, 2003 (JP) ................. 2003-159828
Jun. 4, 2003 (JP) ................. 2003-159829

(51) Int. Cl.
*G01R 31/08* (2006.01)
*H04L 12/28* (2006.01)

(52) U.S. Cl. ........................ 370/228; 370/389
(58) Field of Classification Search ................ None
See application file for complete search history.

(56) References Cited

U.S. PATENT DOCUMENTS 5,235,599 A * 8/1993 Nishimura et al. ............... 714/4
(Continued)

FOREIGN PATENT DOCUMENTS
JP           62-214747          9/1987
(Continued)

OTHER PUBLICATIONS

Masaki Tokuhisa et al., 'Photonic MPLS Net Work no Okeru Path Sekkei', NTT Gijutsu Journal, vol. 14, No. 6, pp. 69 to 73, Jun. 1, 2002.

(Continued)

*Primary Examiner* — Kwang B Yao
*Assistant Examiner* — Jutai Kao
(74) *Attorney, Agent, or Firm* — Oblon, Spivak, McClelland, Maier & Neustadt, L.L.P.

(57) ABSTRACT

In a disclosed backup path bandwidth keeping method for keeping bandwidth of a backup path to which an active path is switched when the active path becomes unavailable in nodes of a communication network, each node is connected to the same destination, and the method includes a backup path bandwidth keeping phase, for M (M is a natural number equal to or less than L) channels in L (L is a natural number) channels kept as backup path bandwidth, for notifying a destination-side node existing in a destination side of the backup path of identification number information of the M channels to be kept and identification information indicating that a path for which the bandwidth is to be kept is a backup path.

17 Claims, 58 Drawing Sheets

U.S. PATENT DOCUMENTS

| | | | | |
|---|---|---|---|---|
| 5,748,611 | A * | 5/1998 | Allen et al. | 370/221 |
| 7,130,263 | B1 * | 10/2006 | Ong et al. | 370/223 |
| 7,372,804 | B2 * | 5/2008 | Arikawa et al. | 370/217 |
| 7,436,763 | B1 * | 10/2008 | Phelps et al. | 370/219 |
| 2002/0097671 | A1 * | 7/2002 | Doverspike et al. | 370/216 |
| 2002/0172149 | A1 | 11/2002 | Kinoshita et al. | |
| 2002/0178397 | A1 * | 11/2002 | Ueno et al. | 714/4 |
| 2003/0031127 | A1 * | 2/2003 | Saleh et al. | 370/228 |
| 2003/0058897 | A1 * | 3/2003 | Yamamoto | 370/535 |
| 2003/0152024 | A1 * | 8/2003 | Yang et al. | 370/216 |
| 2003/0223359 | A1 * | 12/2003 | Einstein et al. | 370/228 |
| 2004/0223451 | A1 * | 11/2004 | Homma et al. | 370/228 |
| 2005/0201276 | A1 * | 9/2005 | Sinha | 370/225 |

FOREIGN PATENT DOCUMENTS

| | | |
|---|---|---|
| JP | 06-266684 | 9/1994 |
| JP | 06-311179 | 11/1994 |
| JP | 7-23105 | 1/1995 |
| JP | 07-038953 | 2/1995 |
| JP | 7-177173 | 7/1995 |
| JP | 2675802 | 7/1997 |
| JP | 10-210050 | 8/1998 |
| JP | 11-055285 | 2/1999 |
| JP | 11-355310 | 12/1999 |
| JP | 2000-151634 | 5/2000 |
| JP | 2000-341294 | 12/2000 |
| JP | 2002-033738 | 1/2002 |
| JP | 2002-51043 | 2/2002 |
| JP | 2002-261791 | 9/2002 |
| JP | 2002-261803 | 9/2002 |
| JP | 2002-271372 | 9/2002 |
| JP | 2002-290449 | 10/2002 |
| JP | 2002-344491 | 11/2002 |
| JP | 2004-266488 | 9/2004 |

OTHER PUBLICATIONS

Taishi Yahara et al., 'Fukusu no Shinraido o Jitsugen Suru ATM-mo Self Heeling Hoshiki no Kento' (Multi-reliablity Self-healing scheme in ATM networks), The Institute of Electronics, Information and Communication Engineers, Shingaku Giho, IN 96-96, pp. 59-64, Nov. 14, 1996.

Yoshiaki Konishi et al., 'Hikari Net Work ni okeru Path Seijosei Kakuninho no-Kento' (A study of continuity check scheme for optical path), 2002 Nen, The Institute of Electronics, Information and Communication Engineers So go Taikai Koen Ronbunshu B-6-191, p. 205, Mar. 7, 2002.

Seiji Detani et al., "Hoshu Path no Shiken Seijyo Hoshiki ni Kansuru-Kento" (A study on Autonomous Testing Methods of Maintenance Bus), 1994 Nen The Institute of Electronics, Information and Communication Engineers, Shuki Taikai Koen Ronbunshu, B-416, p. 14, Sep. 5, 1994.

Tomohiro Okazaki et al., "Operation system ni Okeru Node Teiki Kirikae Kanri Hoshiki no Kento" (A study on operation and management of cyclic test time of network element), 1998 Nen The Institute of Electronics, Information and Communication Engineers Sogo Taikai Koen Ronbunshu, B-6-101, p. 101, Mar. 6, 1998.

K. Shimano et al., "MPLambdaS demonstration employing photonic routers (256x256 OLSPs) to integrate optical and IP networks", Technical Digest of NFOEC' 2001, vol. 1, pp. 2-10, 2001.

Kenichi Sato et al., "GMPLS-Based Photonic Multilayer Routet (Hikari Router) Architecture: An Overview of Traffic Engineering and Signaling Technology", IEEE Communications Magazine, vol. 40, pp. 96-101, Mar. 2002.

Ryutaro Kawamura et al., "Implementation of Self-Healing Function in ATM Networks", Journal of Network and Systems Management, vol. 3, No. 3, pp. 243-264, 1995.

Naohide Nagatsu: "Photonic Network Design Issues and Applications to the IP Backbone", Journal of Lightwave Technology, vol. 18, No. 12, pp. 2010-2018, Dec. 2000.

Katsuhiro Shimano et al., "Demonstration of Fast Restoration for Distributed Control Plane on Photonic Network", Technical Digest in ECOC, lecture No. 7.4.2, Copenhagen, pp. 26 & 27, Sep. 2002.

Taishi Yahara and Ryutaro Kawamura: "Virtual path self-healing scheme based on multi-reliability ATM network concept", IEEE Globcom '97, vol. 3, pp. 1803-1807, 1997.

Ryutaro Kawamura et al., "Implementation of Self-healing Function in ATM Networks Based on Virtual Path Concepts", pp. 303-311, 1995.

Keiko Ohkubo, et al. "A Study of Shared Backup Bandwidth of 1:N Path Protection", Technical Report of IEICE (The Institute of Electronics, Information and Communication Engineers) IN2002-67, Sep. 2002, vol. 102, No. 350, pp. 85-88.

Katsuhiro Shimano, et al. "RSVP Extensions for GMPLS Restoration Signaling", Internet Draft draft-shimano-imajuku-gmpls-restoration-00.txt, Feb. 2003.

D. Papadimitriou, et al. "Inference of Shared Risk Link Groups", Interenet-Draft : draft-many-inference-srlg-00. txt, Feb. 2001, 27 pages.

"Analysis of Generalized MPLS-based Recovery Mechanisms (including Protection and Restoration)", CCAMP Working Group, CCAMP GMPLS P&R Design Team, draft-ietf-ccamp-gmpls-recovery-analysis-00.txt, vol. ccamp, XP015001509, Jan. 2003, 40 pages.

"Generalized Multi-Protocol Label Switching (GMPLS) Architecture", CCAMP Working Group, draft-ietf-ccamp-gmpls-arblitecture-03.txt, vol. ccamp, No. 3, XP015001496, Aug. 2002, 59 pages.

* cited by examiner

FIG.4
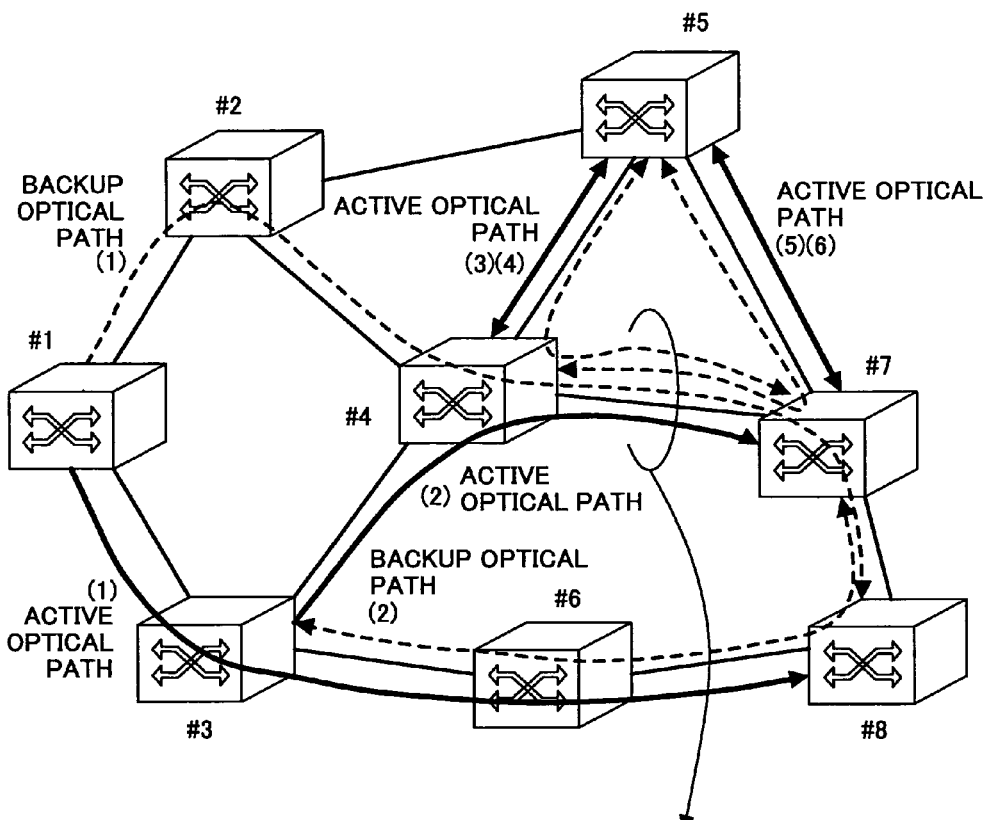
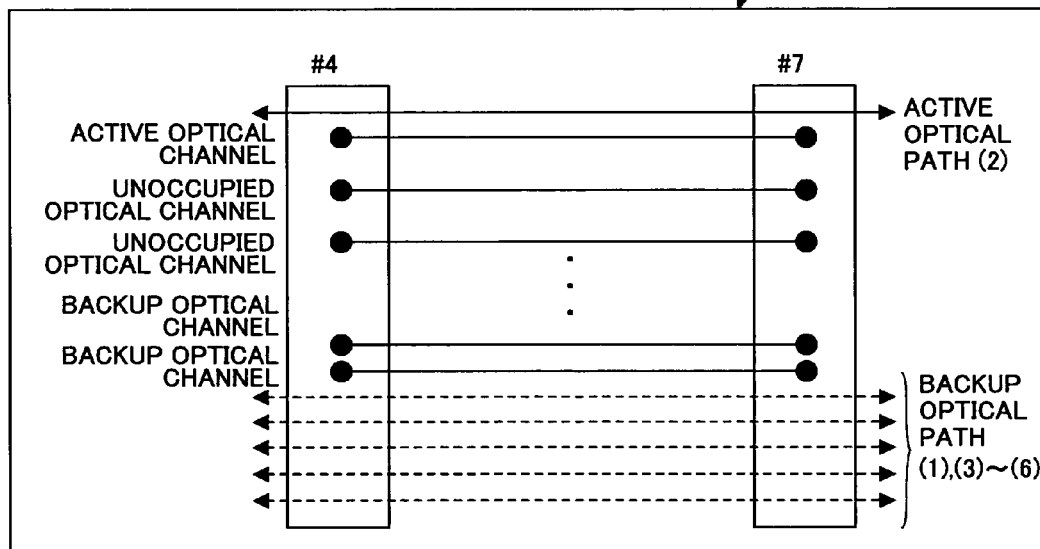

FIG.13

| ID | ACTIVE/ BACKUP | START POINT NODE ID | END POINT NODE ID | INPUT IF · Label | OUTPUT IF · Label |
|---|---|---|---|---|---|
| 1 | ACTIVE | 10:10:101:1 | 10:10:109:1 | 3/4 | 1/1 |
| 2 | ACTIVE | 10:10:101:2 | 10:10:108:1 | 4/1 | 3/1 |
| 2 | BACKUP | 10:10:101:2 | 10:10:108:1 | 4/1 | 5/3 |
| 3 | ACTIVE | 10:10:103:2 | 10:10:107:1 | 2/1 | 3/3 |
| 4 | ACTIVE | 10:10:104:2 | 10:10:106:1 | 1/1 | 5/1 |

FIG.20

CHANNEL GROUP NUMBER {N}
NUMBER OF CHANNELS {3}
INCLUDED CHANNEL NUMBERS {1,2,3}
BACKUP PATH A  RISK CLASSIFICATION NUMBER {12,13,14}
BACKUP PATH B  RISK CLASSIFICATION NUMBER {12,13}
BACKUP PATH C  RISK CLASSIFICATION NUMBER {11,14}
BACKUP PATH D  RISK CLASSIFICATION NUMBER {12,15}
BACKUP PATH E  RISK CLASSIFICATION NUMBER {11,15,16}
BACKUP PATH F  RISK CLASSIFICATION NUMBER {16}

BACKUP PATH X  RISK CLASSIFICATION NUMBER {12,18,21}

$M=3$
$Max\ \{P(r)\}=4\ (r=12)$
↓
$Max\ \{P(r)\} > M$
↓
ADD CHANNEL NUMBER M

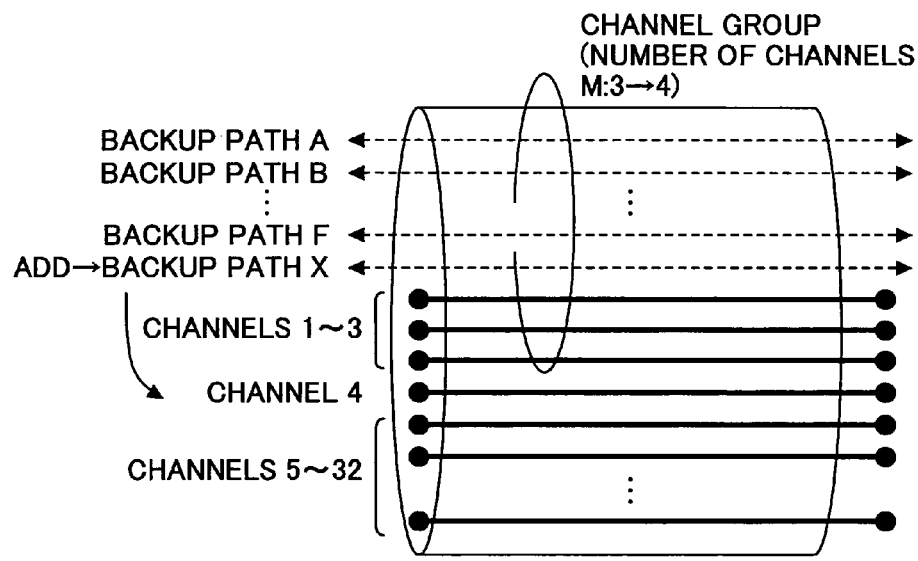

FIG.22

CHANNEL GROUP NUMBER {N}
FAILURE SERVICE CLASS {Gold}
NUMBER OF CHANNELS {5}
INCLUDED CHANNEL NUMBERS {1,2,3,10,11}
BACKUP PATH A   RISK CLASSIFICATION NUMBER {2,3,4}
BACKUP PATH B   RISK CLASSIFICATION NUMBER {2,3}
BACKUP PATH C   RISK CLASSIFICATION NUMBER {2,5}
BACKUP PATH D   RISK CLASSIFICATION NUMBER {1,5,6}
BACKUP PATH E   RISK CLASSIFICATION NUMBER {6}

$M=5$
$n=5$
$a(Gold)=2$
$Max\{P(r)\}=3\ (r=2)$
$\downarrow$
$\alpha =\min\{a(Gold)\times Max\{P(r)\},n\}=5$
$\downarrow$
$\alpha=M$

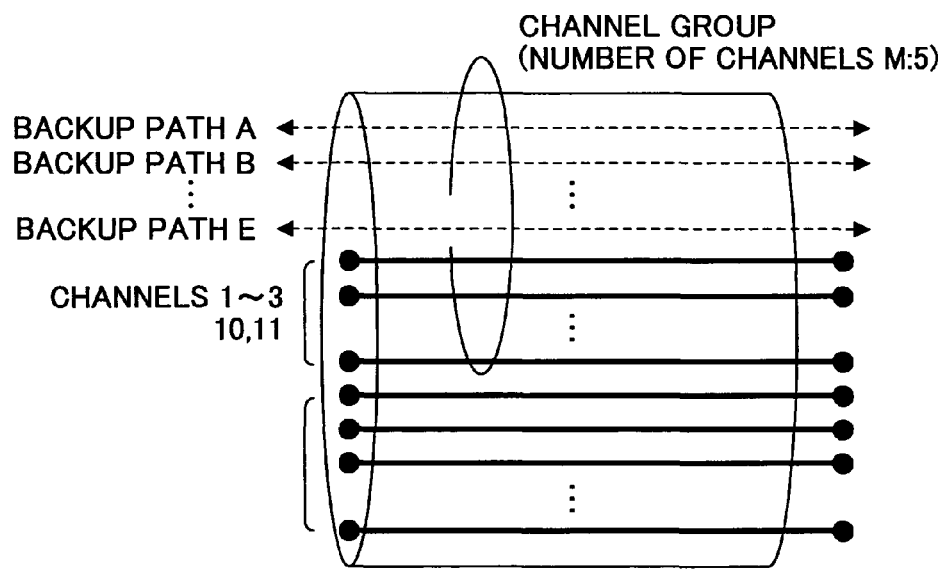

FIG.29

BACKUP PATH BANDWIDTHS ALREADY KEPT M 800Mbit/s

BACKUP PATH A  100Mbit/s   RISK CLASSIFICATION NUMBER {12,13,14}
BACKUP PATH B  400Mbit/s   RISK CLASSIFICATION NUMBER {12,13}
BACKUP PATH C  100Mbit/s   RISK CLASSIFICATION NUMBER {11,14}
BACKUP PATH D  300Mbit/s   RISK CLASSIFICATION NUMBER {12,15}
BACKUP PATH E  100Mbit/s   RISK CLASSIFICATION NUMBER {11,15,16}
BACKUP PATH F  100Mbit/s   RISK CLASSIFICATION NUMBER {16}

$M = 800\text{Mbit/s}$
$\text{Max }\{P(r)\} = 800 \ (r=12)$
$\downarrow$
$\text{Max }\{P(r)\} = M$

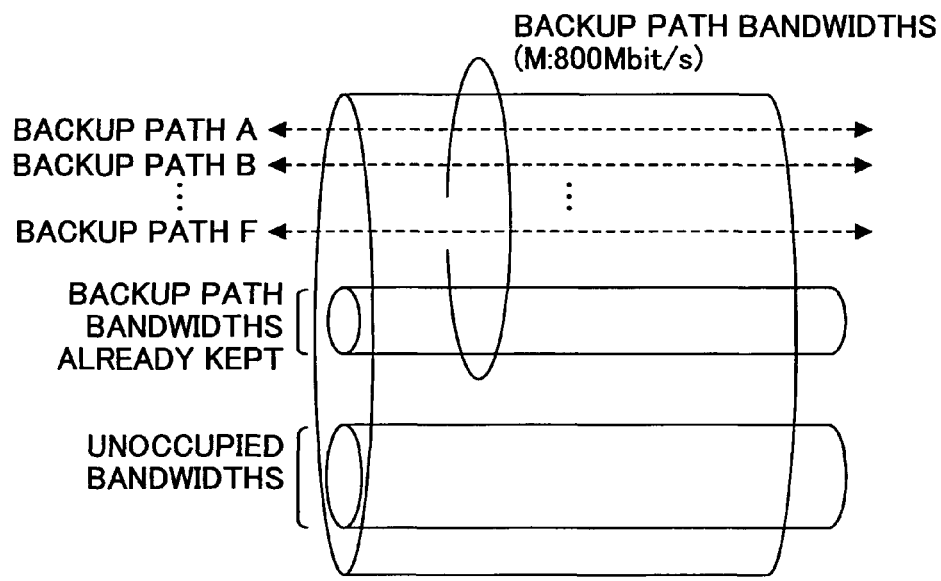

FIG.30

BACKUP PATH BANDWIDTHS ALREADY KEPT M 800Mbit/s

BACKUP PATH A  100Mbit/s   RISK CLASSIFICATION NUMBER {12,13,14}
BACKUP PATH B  400Mbit/s   RISK CLASSIFICATION NUMBER {12,13}
BACKUP PATH C  100Mbit/s   RISK CLASSIFICATION NUMBER {11,14}
BACKUP PATH D  300Mbit/s   RISK CLASSIFICATION NUMBER {12,15}
BACKUP PATH E  100Mbit/s   RISK CLASSIFICATION NUMBER {11,15,16}
BACKUP PATH F  100Mbit/s   RISK CLASSIFICATION NUMBER {16}

BACKUP PATH X  200Mbit/s   RISK CLASSIFICATION NUMBER {12,18,21}

M=800Mbit/s
Max {P(r)}=1000 (r=12)
↓
Max {P(r)} > M
↓
INCREASE BACKUP PATH BANDWIDTHS

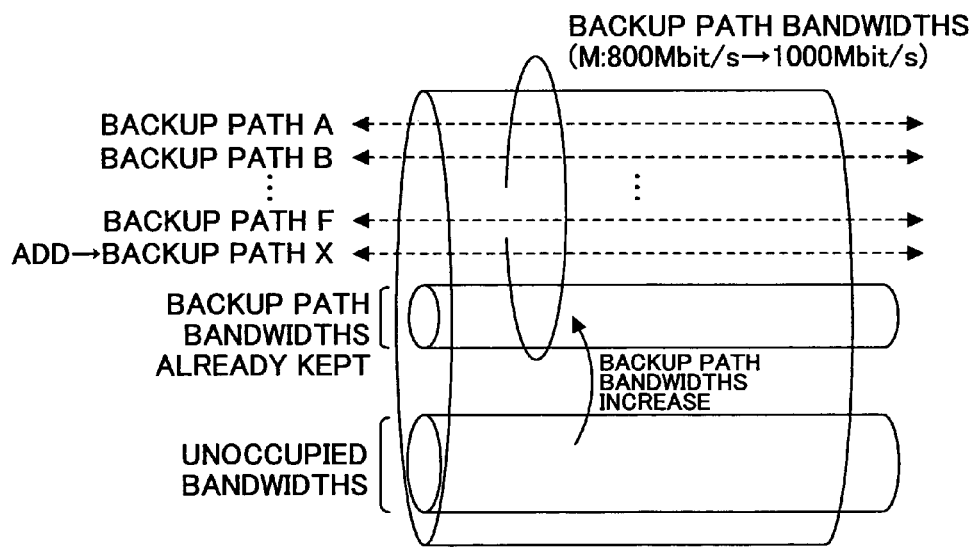

FIG.42A

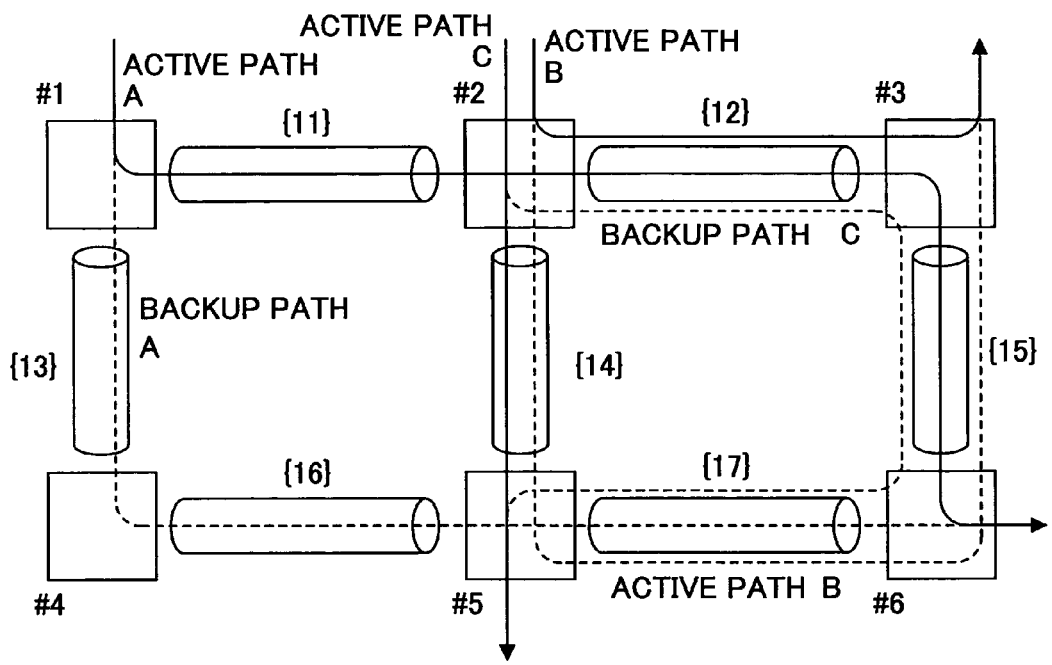

FIG.42B

DATA FOR MANAGING LINK BETWEEN NODES #5-#6
{ BACKUP PATH A: RISK CLASSIFICATION NUMBER OF ACTIVE PATH A {11,12,15}
{ BACKUP PATH B: RISK CLASSIFICATION NUMBER OF ACTIVE PATH B {12}
{ BACKUP PATH C: RISK CLASSIFICATION NUMBER OF ACTIVE PATH C {14}
↓
NUMBER OF ACTIVE PATHS PASSING THROUGH A LINK OF
RISK CLASSIFICATION NUMBER {12} IS 2 (MAXIMUM)
↓
NUMBER OF BACKUP OPTICAL CHANNELS FOR LINK FAILURE OF
RISK CLASSIFICATION NUMBER {12} IS 2

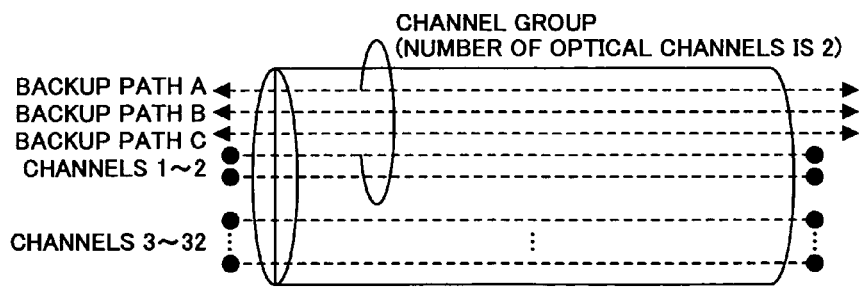

FLOODING METHOD

MULTICAST METHOD

UNICAST METHOD

DEVICE AND METHOD FOR CORRECTING A PATH TROUBLE IN A COMMUNICATION NETWORK

TECHNICAL FIELD

The present invention relates to failure recovery of paths in a large-capacity path network.

BACKGROUND ART

As data communications traffic in the Internet increases, it is being studied to introduce node apparatuses having a throughput no less than a T bit/s currently, and no less than 10-100 T bit/s in the near future. As means for realizing a node apparatus having such a large transferring capability, an optical router is becoming prevalent since such a capability exceeds the limit of electrical processing. As documents on the optical router, there are a document 1 (K. Shimano et al., in Technical Digest of NFOEC'2001, vol. 1, p. 5, 2001) and a document 2 (K-I Sato et al., "GMPLS-Based Photonic Multilayer Router (Hikari Router) Architecture", An overview of traffic engineering and signaling technology, IEEE Comm. Mag. vol. 40, pp. 96-101, March 2002), and the like.

As for the optical router, management of an optical communication network is performed in a distributed manner for each node, and optical path connection setting is performed based on signaling processing between the nodes. That is, in an optical communication network using optical routers, setting and management of the optical paths are performed in an autonomous distributed manner for each node.

In the optical communications network, as means for providing highly reliable network services while using resources efficiently, a restoration method is promising. In this method, backup optical path bandwidth accommodated in a route completely different from an active optical path is kept, and the backup optical path bandwidth is shared with a backup optical path for restoring other active optical path. Accordingly, resources of backup optical paths required in a whole network for keeping a certain reliability can be reduced, so that the means is very effective.

In a study of the restoration method by autonomous distributed control (document 3: R. Kawamura et al., "Implementation of self-healing function in ATM networks", Journal of Network and System Management, vol. 3, no. 3, pp. 243-264, 1995), a principal objective is to implement a self-healing function in an ATM network, in which both an active virtual path (active VP) set in the ATM network and a backup virtual path (backup VP) for restoring the active virtual path are set before a failure occurs. The method of presetting the backup VP defined in the ATM network focuses on setting a route of the backup VP. VP bandwidths in an ATM network can be set successively in units of M Hz. As for the bandwidth of the backup VP, various cases are conceivable such as a case where a same value as the bandwidth of the active VP is ensured or a case where a smaller value than the bandwidth of active VP is ensured. But, as for backup bandwidths that accommodate backup VPs defined for each link, the backup bandwidths are not necessarily set the same as a total sum of bandwidths of active VPs to be restored.

By the way, for implementing the self-healing function by the restoration method based on the autonomous distribution control in a network such as SDH paths and optical paths in which bandwidths are discretely set and bandwidths of an active path need to be completely the same as that of a backup path, it is necessary to extend a signaling protocol for not only setting a route of the backup path but also keeping the bandwidth of the backup path. For example, as shown in FIG. 1, the bandwidth is kept for nodes #1-#3-#6-#8 as an active path. Then, an optical path is created on this route. On the other hand, it is required that bandwidth be only reserved in nodes #1-#2-#4-#7-#8 as a backup path and actual path connection is not performed until the active path becomes unconnectable.

In such a network, a concept of "channel" is important in constructing a management model. An optical network is managed by dividing it into three layers that are an op (optical path) layer, an oms (optical multiplexed section) layer, and an ots (optical transmission section) layer. As for the op layer, the oms layer and the ots layer, an op trail, an oms trail and an ots trail are defined, respectively.

As shown in FIG. 2, an optical channel corresponds to a wavelength bandwidth of an optical region defined between nodes, and corresponds to an op connection that accommodates the oms trail. As for a SDH transmission network, the "channel" corresponds to a VC-3 (50 Mbit/s) or VC-4 (155 Mbit/s) bandwidth defined between cross-connect nodes.

As for backup channels for which backup paths to be used are registered, there are a method for managing the channels in units of one channel, and a method for managing in units of M channels. FIG. 3 shows the method for managing the backup channels in units of one channel. In the method, in the backup optical channels, a backup system for three optical paths (1), (3) and (4) is registered so that 1-to-3 shared backup restoration is realized. The number of backup channels that are actually required is one third of active paths.

In this example, if a failure occurs in the active optical path (1) so that the path is switched to the backup channel, each of active optical paths (3) and (4) enters in a state in which no backup bandwidth is kept in the section. To resolve the state in which failure recovery is not ensured due to such switching, backup path resources are kept again by performing new routing processing, and route change in the backup system occurs. When a failure occurs, there is a possibility that storm of optical path failure recovery requests occur so that network operations may be hindered.

FIG. 4 shows the method for managing the backup channels in units of M channels. A backup channel group consists of two backup channels, and a backup system for five optical paths (1), (3)-(6) is registered so that 2-to-5 shared backup restoration is realized. The number of backup channels actually required is two fifths of actual paths in this example. In this example, even if a failure occurs in the actual optical path (1) and switching to the backup channel occurs, each of other actual optical paths (3)-(6) can be restored by using a remaining one of the backup channels. That is, compared with the method for managing backup channels in units of one channel, it is possible to largely decrease frequency of occurrence of the process for keeping backup path resources again due to failure switching. The method for registering M backup channels for N optical paths is called a M N shared restoration method.

For realizing such networking, a technology for efficiently keeping bandwidths of backup paths is required.

As a design method for accommodating active/backup paths based on the restoration method, there is a method, for example, for estimating the number of wavelengths required for links with respect to traffic demands (optical path demands) in an optical path network based on a wavelength-division multiplexing transmission technology (document 4: K. Nagatsu, "Photonic network design issues and application to the IP backbone", Journal of Lightwave Technology, vol. 18, no. 12, pp. 2010-2018, December 2000). In the method, when a single link failure occurs, the number of wavelengths necessary for restoring active paths passing through the link is estimated.

A similar technology is also applied to an ATM network in which virtual paths (VP) can be defined on a physical circuit, IP over MPLS in which a label switched path (LSP) can be defined, and Ether over MPLS network. That is, even though the bandwidth that is set for each active virtual path is switched to a backup route by the restoration method at the time when a link failure occurs, the necessary bandwidth set in the virtual path can be kept.

By the way, in actual network operations, there is a case where it is difficult to realize a high-quality communication service only by ensuring failure recovery for a single link failure r1. It is the case where a new different link failure r2 occurs before a path switched to a backup route is reverted to an original active route when recovery of the failed link is completed. At this time, in assignment of resources of backup paths, if a backup path for saving an active path disconnected by the link failure r1 is shared with a backup path for saving an active path disconnected by the link failure r2, there may be a case where the active path disconnected by the link failure r2 cannot be restored, so that a non-operating state of a path may occur.

As mentioned above, in the restoration method, a management control function for autonomously keeping a number of channels or bandwidths required for a channel group accommodating backup paths in units of link becomes important in order to reduce competing states in which a plurality of active paths that switch due to failure in a part of a network apparatus try to keep the same backup path bandwidth with each other.

In addition, in the shared restoration method, it is necessary to recover disconnection of an active optical path due to occurrence of failure of a network for avoiding service interruption as much as possible in the shared restoration method. In addition, as a technology relating to performing failure recovery at high speed, there is a technology disclosed in a document 5 (K. Shimano et al., "Demonstration of Fast Restoration for Distibuted Control Plane on Photonic Network", Technical Digest in ECOC, lecture number 7.4.2, Copenhagen, September 2002).

For applying the restoration method to a network in which bandwidths of active paths need to be completely the same as bandwidths of backup paths like SDH paths and optical paths and the like, it is necessary to use "pre-assign restoration method" for keeping 100% bandwidth of backup SDH paths or optical paths beforehand. In the pre-assign restoration method, especially, it is required to quickly perform failure switching to a backup path having a long route length.

Further, in a case when multiple failures occur in a network, conflicts for keeping bandwidths may occur in a section in which bandwidth sharing of backup paths is performed so that failure recovery may fail. Therefore, it is required to recover multiple failures as much as possible.

By the way, the document 2 shows a network using optical routers in which a cross-connect technology based on high-reliability switches and a GMPLS (Generalized Multiple Protocol Label Switching) technology for realizing IP network-like distributed control are integrated. As shown in FIG. 5, different from a conventional IP network, the network is configured such that a data plane and a control plane are clearly separated, wherein the data plane is formed by a switch function part for transferring user information of the communication network, and the control plane is formed by a control apparatus for transferring control signals of the communication network. In this configuration, it is required to reduce disconnection of a normal path set in the data plane and unnecessary switching operations as bad influences due to failure of the control plane.

DISCLOSURE OF THE INVENTION

A first object of the present invention is to provide, for realizing the shared restoration method, a backup path bandwidth keeping method for keeping bandwidth of backup paths and a path switching apparatus for realizing the method.

A second object of the present invention is to provide, in a large capacity communication network autonomously controlled in a distributed way, a backup path bandwidth keeping method and a path switching apparatus that can dynamically keep a number of channels necessary for a channel group that accommodates backup paths so as to realize reliable failure recovery for a single link failure, and that can also flexibly support multiple link failure.

A third object of the present invention is to provide, in a large capacity communication network that is autonomously controlled in a distributed way and that is virtually set on a link, a backup path bandwidth keeping method and a path switching apparatus that can dynamically keep a number of channels necessary for a channel group that accommodates backup paths so as to realize reliable failure recovery for a single link failure, and that can also flexibly support multiple link failure.

A fourth object of the present invention is to provide a high-speed path switching method for performing failure recovery operations quickly in the shared restoration method, and to provide a path switching apparatus for realizing the method.

A sixth object is to provide a path management apparatus that can perform failure recovery for multiple failures efficiently by performing distributed control.

A seventh object of the present invention is to provide a network control apparatus that can reduce disconnection of a normal path set in the data plane and unnecessary switching operations as bad influences due to failure of the control plane.

The first object of the present invention is achieved by the following invention.

The present invention is a backup path bandwidth keeping method for keeping bandwidth of a backup path to which an active path is switched when the active path becomes unavailable in nodes of a communication network, wherein each node is connected to the same destination, and the method includes, as to M (M is a natural number equal to or less than L) channels in L (L is a natural number) channels that are kept as backup path bandwidth:

a backup path bandwidth keeping phase, when keeping the bandwidth of the backup path, for sending identification number information of the M channels to be kept and identification information indicating that a path for which the bandwidth is to be kept is a backup path to destination-side nodes existing in a destination side of the backup path.

The present invention can be also configured as a backup path bandwidth keeping method for keeping bandwidth of a backup path to which an active path is switched when the active path becomes unavailable in nodes of a communication network, wherein each node is connected to the same destination, M (M is a natural number equal to or less than L) channels in L (L is a natural number) channels kept as a backup path bandwidth are defined as a channel group, and identification number information for identifying the channel group is held, the method includes:

a backup path bandwidth keeping phase, when keeping the bandwidth of the backup path, for sending identification number information of the channel group to be kept and identification information indicating that a path for which the bandwidth is to be kept is a backup path to a destination-side node existing in a destination side of the backup path.

The present invention can be also configured as a backup path bandwidth keeping method for keeping bandwidth of a backup path to which an active path is switched when the active path becomes unavailable in nodes of a communication network, wherein each node is connected to the same destination, M (M is a natural number equal to or less than L) channels in L (L is a natural number) channels kept as a backup path bandwidth are defined as a channel group, the method includes:

a phase for recommending identification number information of each channel that is a candidate of a member of the channel group and identification information indicating that the channel group is a backup resource to a master node; and a backup channel group keeping phase in which the master node determines each channel to be kept as the member of the channel group and sends identification number information of the channel to a slave node.

In the backup path bandwidth keeping method, the master node and the slave node are defined between two nodes adjacent to each other, and the method includes a master-slave check phase for determining one of the two nodes as the master node and the other as the slave node according to order of size of a node identification number assigned to each of the two nodes. In addition, information to be sent may include risk classification number information of links and nodes through which an active path corresponding to the backup path to be set passes. The identification information indicating that the channel group is a backup resource may include identification information to identify a failure service class.

In addition, the backup channel group keeping phase may be invoked at the same time as the backup path bandwidth keeping phase, and at that time, the master node is a destination-side node existing at a destination side of the backup path, and the slave node is a source-side node existing at a source side of the backup path.

In addition, the method may include a phase in which, as to the M channels kept as the backup path bandwidth, when it becomes necessary to exchange a channel in the M channels with another channel that is not kept as backup path bandwidth, at least identification number information of a new channel is recommended to a node at a destination of an opposite side of the channel.

In addition, the present invention may be configured as a path switching apparatus including a path setting management function part for keeping bandwidth of a backup path to which an active path is switched when the active path that is set in a communication network becomes unavailable, wherein the path setting management function part is connected to the same destination, the switching apparatus including:

a backup path setting process part including a function for managing Min (Min is a natural number equal to or less than L) channels in L channels kept as backup path bandwidth; and a signaling process part for receiving, when keeping the bandwidth of the backup path, identification number information of M channels sent from an adjacent path switching apparatus and identification number information indicating that a path for which the bandwidth is to be kept is a backup path, searching for an output port corresponding to the backup path, and outputting identification number information of Mout channels kept in an output side of the backup path to an adjacent node.

In addition, the present invention may be configured as a path switching apparatus including a path setting management function part for keeping a bandwidth of a backup path to which an active path is switched when the active path that is set in a communication network becomes unavailable, wherein the path setting management function part is connected to the same destination, the switching apparatus including:

a backup path setting process part including a function for collectively managing M (M is a natural number equal to or less than L) channels, as a channel group, in L (L is a natural number) channels kept as backup path bandwidth; and a signaling process part for receiving, when keeping the bandwidth of the backup path, identification number information of channels or the channel group sent from an adjacent path switching apparatus and identification number information indicating that a path for which the bandwidth is to be kept is the backup path, searching for an output port corresponding to the backup path, and outputting identification number information of the channels or the channel group kept in an output side of the backup path to an adjacent node. In the path switching apparatus, path switching may be performed for each optical path transmitted between nodes by the wavelength division multiplexing scheme, for each electrical path or each optical path transmitted between nodes by the time division multiplexing scheme, or for each virtual electric path.

The second object can be achieved by a backup path bandwidth keeping method for keeping bandwidth of a backup path to which an active path is switched when the active path becomes unavailable in nodes of a communication network, wherein each node is connected to the same destination, and channel identification number information of M (M is a natural number equal to or less than L) channels in L (L is a natural number) channels kept as backup path bandwidth are held, when assuming that n (n is a natural number) indicates a number of backup paths registered in a channel group in a link connecting two nodes, P(r) indicates a number of backup paths to be switched to any of the M channels when a switching operation from an active path to a backup path relating to a switching factor of a risk classification number r occurs, and that Max{P(r)} indicates a maximum value of P(r) for each risk classification number r, the number M of channels to be kept as the backup path bandwidth in the link is set such that M is equal to or greater than Max{P(r)} and equal to or less than n.

The present invention can be also configured as a backup path bandwidth keeping method for keeping bandwidth of a backup path to which an active path is switched when the active path becomes unavailable in nodes of a communication network, wherein each node is connected to the same destination, M (M is a natural number equal to or less than L) channels in L (L is a natural number) channels kept as a backup path bandwidth are defined as a channel group, and identification number information for identifying each channel group are held, when assuming that n (n is a natural number) indicates a number of backup paths registered in a channel group in a link connecting two nodes, P(r) indicates a number of backup paths to be switched to the channel group when a switching operation from an active path to a backup path relating to a switching factor of a risk classification number r occurs, and that Max{P(r)} indicates a maximum value of the number P(r) for each risk classification number r, the number M of channels forming the channel group in the link is set such that M is equal to or greater than Max{P(r)} and equal to or less than n.

By the way, the risk classification number is an identifying number for managing single link failure, single node failure as a risk component in the network, or a network domain as a complex of these. For example, a number {1} is assigned for a risk such as a link failure between a node A and a node B so as to manage the risk. In order to define an active path and a backup path in such a network and realize a reliable communication service by keeping redundancy, the active path and the backup path are set such that the active path passes through links, nodes or network domains to which risk classification numbers that are different from those assigned for the backup path are assigned.

Since each channel group accommodates backup paths having a failure service class different from the others, each group of $M_1$ channels $\sim M_m$ channels ($L=M_1+M_2+\ldots+M_m$) is defined as a channel group as to m types of failure service classes. The failure service class is defined based on reliability of each path. For example, when a failure occurs in a network, it may become temporarily impossible to keep connections for every path due to lack of an adequate amount of communication resources. In this case, by classifying the reliability of each path, efficient network operation can be realized. For example, the communication resource is assigned first to a path having a failure service class corresponding to high reliability, on a priority base. At the same time, it becomes possible to demand a price corresponding to the failure service class from a user who receives a communication service.

The failure service class attribute information f may be set for each channel group in the link and for each backup path accommodated in the channel group, and a positive value a(f) corresponding to the failure service class attribute information f is defined, each backup path having the failure service class attribute information f is accommodated in the channel group having the same failure service class attribute information f, and the number M of channels forming the channel group of the failure service class attribute information f in the link is set to be equal to or greater than a(f)×Max{P(r)} and equal to or less than n when a(f)×Max{P(r)} is equal to or less than n, and is set to be equal to or less than n when a(f)×Max{P(r)} is greater than n.

The present invention can be also configured as a path switching apparatus including a path setting management part for keeping a bandwidth of a backup path to which an active path is switched when the active path set in a communication network becomes unavailable, the path setting management function part including:

a function for holding channel identification number information of M (M is a natural number equal to or less than L) channels in L (L is a natural number) channels kept as backup path bandwidth, and a function for setting the number M of channels to be kept as the backup path bandwidth in the link such that M is equal to or greater than Max{P(r)} and equal to or less than n, wherein n (n is a natural number) indicates a number of backup paths registered in a channel group in a link connecting two nodes, P(r) indicates a number of backup paths to be switched to any of the M channels when a switching operation from an active path to a backup path relating to a switching factor of a risk classification number r occurs, and that Max{P(r)} indicates a maximum value of P(r) for each risk classification number r.

In addition, the present invention can be also configured as a path switching apparatus including a path setting management part for keeping bandwidth of a backup path to which an active path is switched when the active path set in a communication network becomes unavailable, the path setting management function part including:

a function for defining M (M is a natural number equal to or less than L) channels in L (L is a natural number) channels kept as a backup path bandwidth as a channel group, and holding identification number information for identifying each channel group, and a function for setting the number M of channels forming the channel group in the link such that M is equal to or greater than Max{P(r)} and equal to or less than n, wherein n (n is a natural number) indicates a number of backup paths registered in a channel group in a link connecting two nodes, P(r) indicates a number of backup paths to be switched to the channel group when a switching operation from an active path to a backup path relating to a switching factor of a risk classification number r occurs, and that Max{P(r)} indicates a maximum value of the number P(r) for each risk classification number r.

Failure service class attribute information f may be set for each channel group in the link and for each backup path accommodated in the channel group, and a positive value a(f) corresponding to the failure service class attribute information f is defined, each backup path having the failure service class attribute information f is accommodated in the channel group having the same failure service class attribute information f, wherein the path setting management part includes a function for setting the number M of channels forming the channel group of the failure service class attribute information f in the link to be equal to or greater than a(f)×Max{P(r)} and equal to or less than n when a(f)×Max{P(r)} is equal to or less than n, and setting the number M to be equal to or less than n when a(f)×Max{P(r)} is greater than n.

Path switching can be performed for each optical path conducting transmission between nodes by the wavelength division multiplexing scheme, or for each electrical path or each optical path conducting transmission between nodes by the time division multiplexing scheme.

The third object of the present invention is achieved by the following invention.

The present invention is a backup path bandwidth keeping method for keeping bandwidth of a backup path to which an active path is switched when the active path becomes unavailable in nodes of a communication network, wherein each node is connected to the same destination, and holds backup path bandwidth M (M≦L) in backup path accommodating bandwidth L that is kept beforehand, when assuming that b indicates a total sum of backup path bandwidths registered in a VPI group in a link connecting two nodes, P(r) indicates a total sum of backup path bandwidths to be switched to any of the VPI group when a switching operation from an active path to a backup path relating to a switching factor of a risk classification number r occurs, and that Max{P(r)} indicates a maximum value of the backup path bandwidths P(r) for each risk classification number r, the bandwidth M to be kept as the backup path bandwidth in the link is set such that M is equal to or greater than Max{P(r)} and equal to or less than b.

The present invention can be also configured as a backup path bandwidth keeping method for keeping bandwidth of a backup path to which an active path is switched when the active path becomes unavailable in nodes of a communication network, wherein each node is connected to the same destination, a backup path bandwidth M (M≦L) in backup path accommodating bandwidth L kept beforehand is defined as a VPI group, and identification number information for identifying each VPI group is held, when assuming that b indicates a total sum of backup path bandwidths registered in the VPI group in a link connecting two nodes, P(r) indicates a total sum of backup path bandwidths to be switched to the VPI group when a switching operation from an active path to a backup path related to a switching factor of a risk classification number r occurs, and that Max{P(r)} indicates a maximum value of backup path bandwidths P(r) for each risk classification number r, the backup path bandwidth M forming the VPI group in the link is set such that M is equal to or greater than Max{P(r)} and equal to or less than b.

The VPI is an identifying number of a logical channel defined for accommodating a VP (virtual path), and is called Virtual Path Identifier. The VPI is defined for each link between nodes.

Since each VPI group accommodates backup paths having a failure service class different from each other, each group of $M_1$ backup path band ~$M_m$ backup path band ($L=M_1+M_2+...+M_m$) is defined as a VPI group as to m types of failure service classes.

Failure service class attribute information f may be set for each VPI group in the link and for each backup path accommodated in the VPI group, and a positive value a(f) corresponding to the failure service class attribute information f is defined, each backup path having the failure service class attribute information f is accommodated in the VPI group having the same failure service class attribute information f, and the backup path bandwidth M of the VPI group of the failure service class attribute information f in the link is set to be equal to or greater than a(f)×Max{P(r)} and equal to or less than n when a(f)×Max{P(r)} is equal to or less than n, and is set to be equal to or less than n when a(f)×Max{P(r)} is greater than n.

In addition, the present invention can be also configured as a path switching apparatus including a path setting management part for keeping bandwidth of a backup path to which an active path is switched when the active path set in a communication network becomes unavailable, wherein each path switching apparatus is connected to the same destination, the path setting management function part holds backup path bandwidth M (M≦L) in backup path accommodating bandwidth L kept beforehand, the path setting management function part including:

a function for setting the bandwidth M to be kept as the backup path bandwidth in the link such that M is equal to or greater than Max{P(r)} and equal to or less than b, wherein b indicates a total sum of backup path bandwidths registered in the VPI group in a link connecting two nodes, P(r) indicates a total sum of backup path bandwidths to be switched to any of the VPI group when a switching operation from an active path to a backup path relating to a switching factor of a risk classification number r occurs, and that Max{P(r)} indicates a maximum value of backup path bandwidths P(r) for each risk classification number r.

In addition, the present invention can be also configured as a path switching apparatus including a path setting management part for keeping bandwidth of a backup path to which an active path is switched when the active path set in a communication network becomes unavailable, wherein each path switching apparatus is connected to the same destination, the path setting management function part including:

a function for defining, as a VPI group, backup path bandwidth M (M≦L) in backup path accommodating bandwidth L kept beforehand, and holding identification number information for identifying each VPI group, and a function for setting the bandwidth M forming the VPI group in the link such that M is equal to or greater than Max{P(r)} and equal to or less than b, wherein b indicates a total sum of backup path bandwidths registered in the VPI group in a link connecting two nodes, P(r) indicates a total sum of backup path bandwidths to be switched to the VPI group when a switching operation from an active path to a backup path relating to a switching factor of a risk classification number r occurs, and that Max{P(r)} indicates a maximum value of the total sum P(r) of the backup path bandwidths for each risk classification number r.

Failure service class attribute information f may be set for each VPI group in the link and for each backup path accommodated in the VPI group, and a positive value a(f) corresponding to the failure service class attribute information f is defined, each backup path having the failure service class attribute information f is accommodated in the VPI group having the same failure service class attribute information f, and the path setting management function part includes:

a function for setting the backup path bandwidth M of the VPI group of the failure service class attribute information f in the link to be equal to or greater than a(f)×Max{P(r)} and equal to or less than n when a(f)×Max{P(r)} is equal to or less than n, and setting the backup path bandwidth M to be equal to or less than n when a(f)×Max{P(r)} is greater than n.

The fourth object of the present invention is achieved by the following invention.

The present invention is a high-speed path switching method for activating a backup path to be switched from an active path when the active path becomes unavailable in nodes of a communication network, wherein:

each node is connected to the same destination, M (M is a natural number equal to or less than L) channels in L (L is a natural number) channels kept as backup path bandwidth are defined as a channel group, the backup path is virtually accommodated in the channel group beforehand, wherein, between two nodes adjacent to each other, one of the two nodes is determined as a master node and another is determined as a slave according to size order of a node identification number assigned to each of the two nodes, when the backup path accommodated in the channel group is activated, the master node activates channels in turn from a channel having a small (or large) identification number, and the slave node activates channels in turn to form a channel having a large (or small) identification number.

In addition, the present invention can be also configured as a path switching apparatus including a path setting management function part for keeping bandwidth of a backup path to which an active path is switched when the active path that is set in a communication network becomes unavailable, wherein the path setting management function part is connected to the same destination, the switching apparatus including:

a backup path setting process part including a function for defining M (M is a natural number equal to or less than L) channels as a channel group in L (L is a natural number) channels kept as backup path bandwidth, and holding an identification number for identifying the channel group;

a channel management database for holding the identification number of the channel group and an identification number of a backup path accommodated in the channel group while associating the identification number of the channel group with the identification number of the backup path; and a backup path activation process part for inputting and outputting a backup path activation signal with an adjacent node and driving a switch to perform switching of the backup path.

The path switching apparatus may further include:

means for determining one of two nodes adjacent to each other as a master node and the other node as a slave node according to size order of a node identification number assigned to each of the two nodes, wherein, when activating the backup path accommodated in the channel group, the backup path activation process part in the master node activates channels in turn from a channel having a small (or large) identification number, and the backup path activation process part in the slave node activates channels in turn to form a channel having a large (or small) identification number.

Path switching may performed for each optical path transmitted between nodes by the wavelength division multiplexing scheme, for each electrical path or each optical path transmitted between nodes by the time division multiplexing scheme, or for each virtual electric path transmitted between nodes by the cell, frame or packet multiplexing scheme.

The fifth object of the present invention can be achieved by the following invention.

The present invention is a high-speed path switching method, including the steps of:

setting a path, as an active path, that connects two nodes in a communication network via plural routes, and setting another path as a backup path in which connectivity is ensured via routes between a source and a destination;

switching the active path to the backup path by performing switching operations in a node at the source or the destination when a failure of the active path occurs; and releasing the bandwidth of the backup path as bandwidth for accommodating a backup path prepared for failure recovery for another active path when a failure of the other active path occurs.

The backup path may be set when a route length of the backup path exceeds a predetermined length or when a number of nodes through which the backup path passes exceeds a predetermined number, and in other cases, only bandwidth is kept for the backup path.

In addition, the present invention can be also configured as a path switching apparatus for switching an active path set between two nodes in a communication network to a backup path set between the two nodes via a route different from that of the active path when the active path fails, the path switching apparatus including:

path management means for managing, as the backup path, a hot state backup path for which connectivity is ensured via the route and a normal backup path for which only bandwidth is kept while distinguishing between the hot state backup path and the normal backup path; and means for sharing bandwidth allocated to the hot state backup path with bandwidth kept for the normal backup path.

The path switching apparatus may further include means for sending and receiving identification information indicating whether a backup path set between the own node and an adjacent node is the hot state backup path. In addition, the path switching apparatus may further include means for, when sending and receiving a switching message for switching the active path to the backup path via the backup path route at the time of failure of the active path, obtaining channel bandwidth information that accommodates the hot state backup path from the path management means and selecting a switching destination of the backup path so as to generate the switching message including the channel bandwidth. In addition, the path switching apparatus may further includes means for transferring a message along path switching apparatuses on the route of the hot state backup path for restoring the active path at the time of failure of the active path, wherein the message is for making settings such that the bandwidth of the hot state backup path is not released for failure recovery for other paths.

The sixth object of the present invention can be achieved by the following invention.

The present invention is a path management apparatus for keeping bandwidth (a channel) of a backup path to which an active path set in a communication network is switched when the active path becomes unavailable, and managing path connection and switching, the path management apparatus including:

notification means for, when detecting that a backup path becomes impossible to activate since a channel accommodating the backup path is failed or is used for other backup path, sending activation impossibility of the backup path to nodes through which the backup path passes.

The notification means may be configured to perform the notification of the activation impossibility including information of activation impossibility for each node section through which the backup path passes. In addition, the notification means may be configured to add information of the activation impossibility of the backup path to a backup path management message that is transferred periodically for normality verification in a direction from a source node to a destination node of the backup path or in the reverse direction.

The path management apparatus may further include channel diverting means for ascertaining that a backup path cannot keep a channel in another node section according to the notification of the activation impossibility, and diverting a channel assigned for accommodating the activation-impossible backup path to a channel for accommodating the other backup path.

In addition, the present invention can be configured as a path management apparatus for keeping a channel of a backup path to which an active path set in a communication network is switched when the active path becomes unavailable, and managing path connection and switching, wherein plural channels for accommodating plural backup path groups are kept and shared, and a priority class is set for each backup path group, the path management apparatus including:

channel diverting means for, when channels for accommodating a predetermined number of backup paths in the backup path groups are short, diverting a necessary number of channels in a channel group assigned for accommodating backup path groups having a priority lower than that of the backup path groups.

The seventh object of the present invention can be achieved by the following invention.

The present invention is a network control apparatus for controlling path management in a distributed manner for nodes in a communication network in which a data plane for transferring user information and a control plane for transferring control signals are separated, the network control apparatus including:

a control link management function part for performing normality checking for the control plane;

a path management database for performing setting management for paths set on the data plane;

a signaling process part for performing normality checking for each of the paths; and a timer process part for deleting path management information registered in the path management database when an elapsed time for verifying normality of each path exceeds a threshold, the control link management function part including a function for outputting a timer stopping signal to the timer process part when detecting abnormality of a control link connected to own node and when verifying normality of a data link corresponding to the control link, the timer process part including a function for stopping a timer process for measuring the elapsed time of the normality verification in response to an input of the timer stopping signal, and the signaling process part including a function for sending information indicating the timer stopping process is performed for all nodes through which a path, for which the timer stopping process is performed, passes.

The control link management function part may include a function for sending abnormality of a control link connected to own node to an adjacent node; and a function for sending abnormality of a control link information received from an adjacent node to another adjacent node.

BRIEF DESCRIPTION OF THE DRAWINGS

FIG. 4 is a figure for explaining a method of managing backup paths in units of M channels.

FIG. 13 shows an example of information stored in a path management database 225.

FIG. 20 is a figure for explaining an example 2 of the backup path setting process sequence according to the embodiment 2-1.

FIG. 22 is a figure for explaining an example 1 of the backup path setting process sequence according to the embodiment 2-2.

FIG. 29 is a figure for explaining an example 1 of the backup path setting process sequence according to the embodiment 3-1.

FIG. 30 is a figure for explaining an example 2 of the backup path setting process sequence according to the embodiment 3-1.

FIGS. 42A and B are figures showing an example of a backup path bandwidth keeping method.

PREFERRED EMBODIMENTS FOR CARRYING OUT THE INVENTION

In the following, each embodiment of the present invention is described with reference to figures.

Embodiments 1-1—1-7

As to the means for realizing networking based on the restoration method described in the BACKGROUND ART, in order to keep bandwidths of a backup path by performing signaling processes similar to those for setting an active path, it is necessary to include identification information for identifying setting of the backup path. In addition, for the restoration method to work effectively, it is necessary to register backup paths such that a contention state does not occur, wherein, in the contention state, plural active paths to be switched due to a failure in a part of network apparatuses mutually try to keep the same backup channel bandwidth. To prevent such a contention state, a management control function for autonomously keeping, link by link, a number of channels necessary for a backup channel group is also important.

In the embodiments 1-1—1-7, technologies for realizing the above-mentioned functions are described.

Embodiment 1-1

Backup Path Bandwidth Keeping Method

Figure 1:
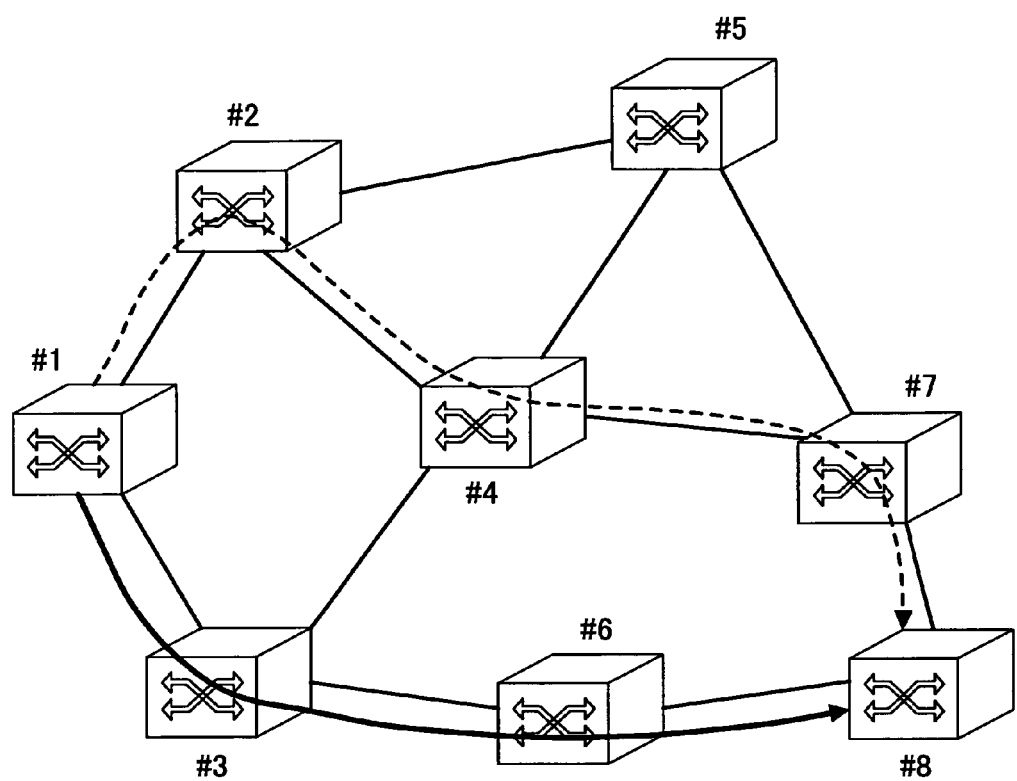
FIG. 1 is a figure showing a configuration example of a communication network.
Figure 2:
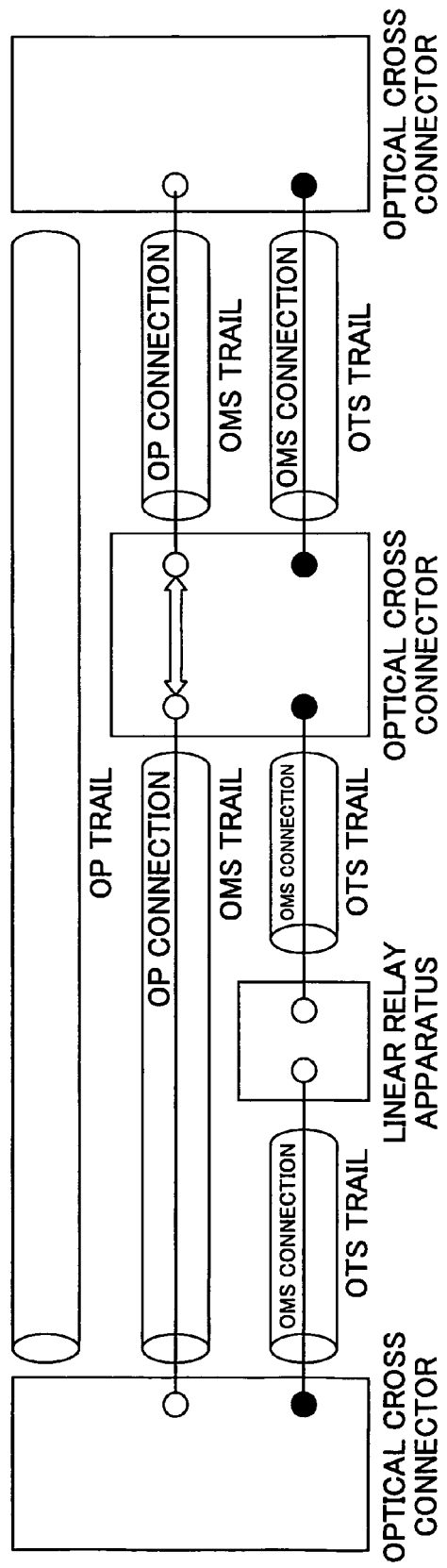
FIG. 2 is a figure showing a management model of a network.
Figure 3:
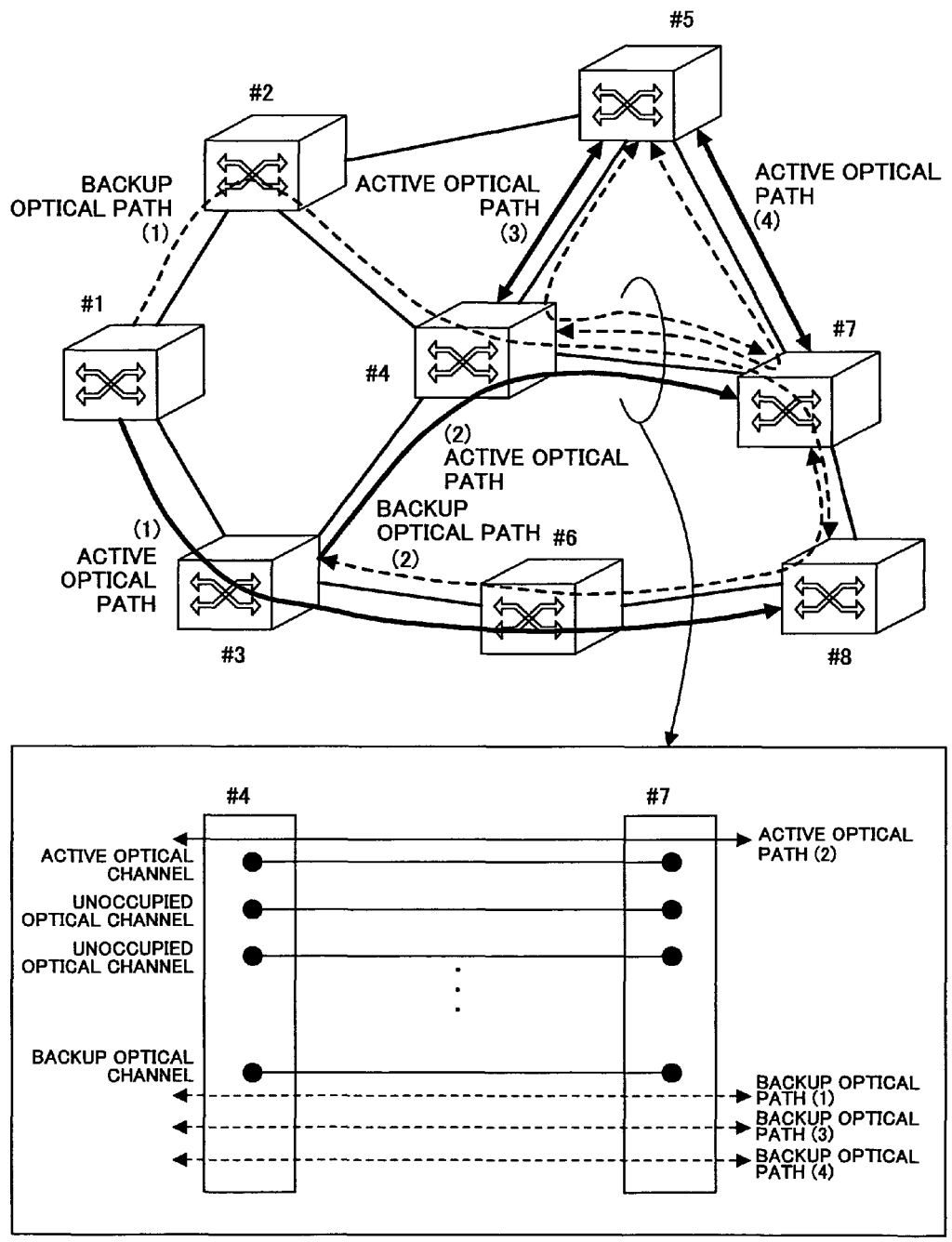
FIG. 3 is a figure for explaining a method of managing backup paths in units of one channel.

A communication network to which the backup path bandwidth keeping method of the present embodiment is applied is one shown in FIG. 1. This communication network is an optical path network defining optical paths of wavelength units, and the communication network is formed by optical cross-connect nodes for realizing cross-connection of these optical paths.

The optical paths are defined in the nodes from the source node #1 to the destination node #8 in a point-to-point manner. At each of relay nodes #3 and #6, the wavelength of the optical path is converted to avoid a collision with another optical path. The bandwidth of the optical path is 10 Gbit/s, for example, and transmission is performed with an OTN format conforming to the ITU-T G.709 specification. In addition, optical paths are accommodated in a fiber link at intervals of 50 GHz so that wavelength division multiplexing transmission of 32 wavelengths is realized in each fiber link.

Figure 6:
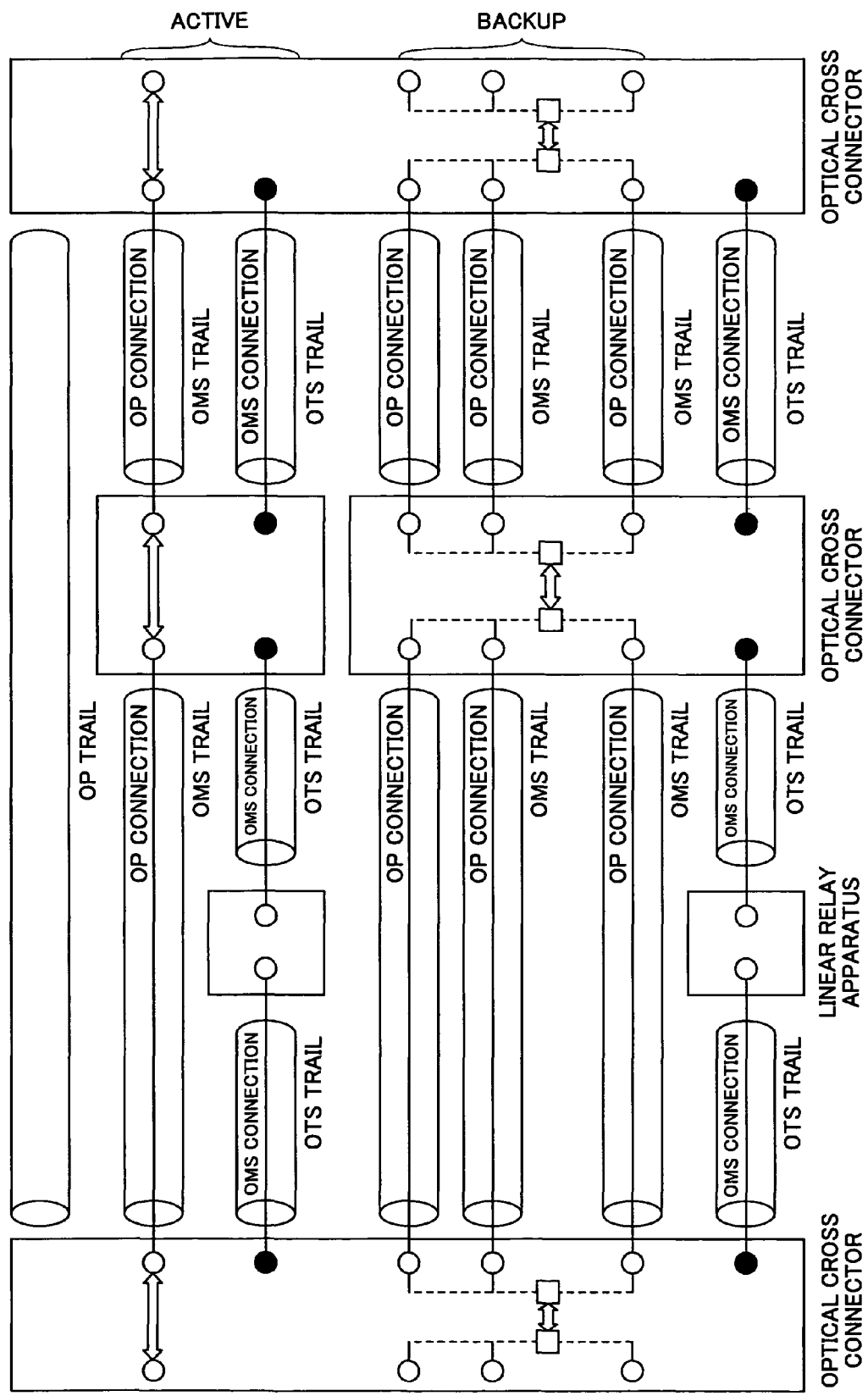
FIG. 6 is a figure showing a management model of a network in a backup path bandwidth keeping method in an embodiment 1-1.

In this network, according to a management model of the network shown in FIG. 6, M op connections, that are optical channels, in L op connections to be used as backup paths are bundled for the purpose of management so that the op connections are managed as an optical channel group. In FIG. 6, ● indicates an interface of a fiber label, ○ indicates an interface of a wavelength label, □ indicates an interface of a backup optical channel group label. An identification number is assigned not only to the optical path but also to the optical channel group. Then, keeping bandwidths for backup optical paths is performed by designating backup optical channel groups of each link.

Figure 7:
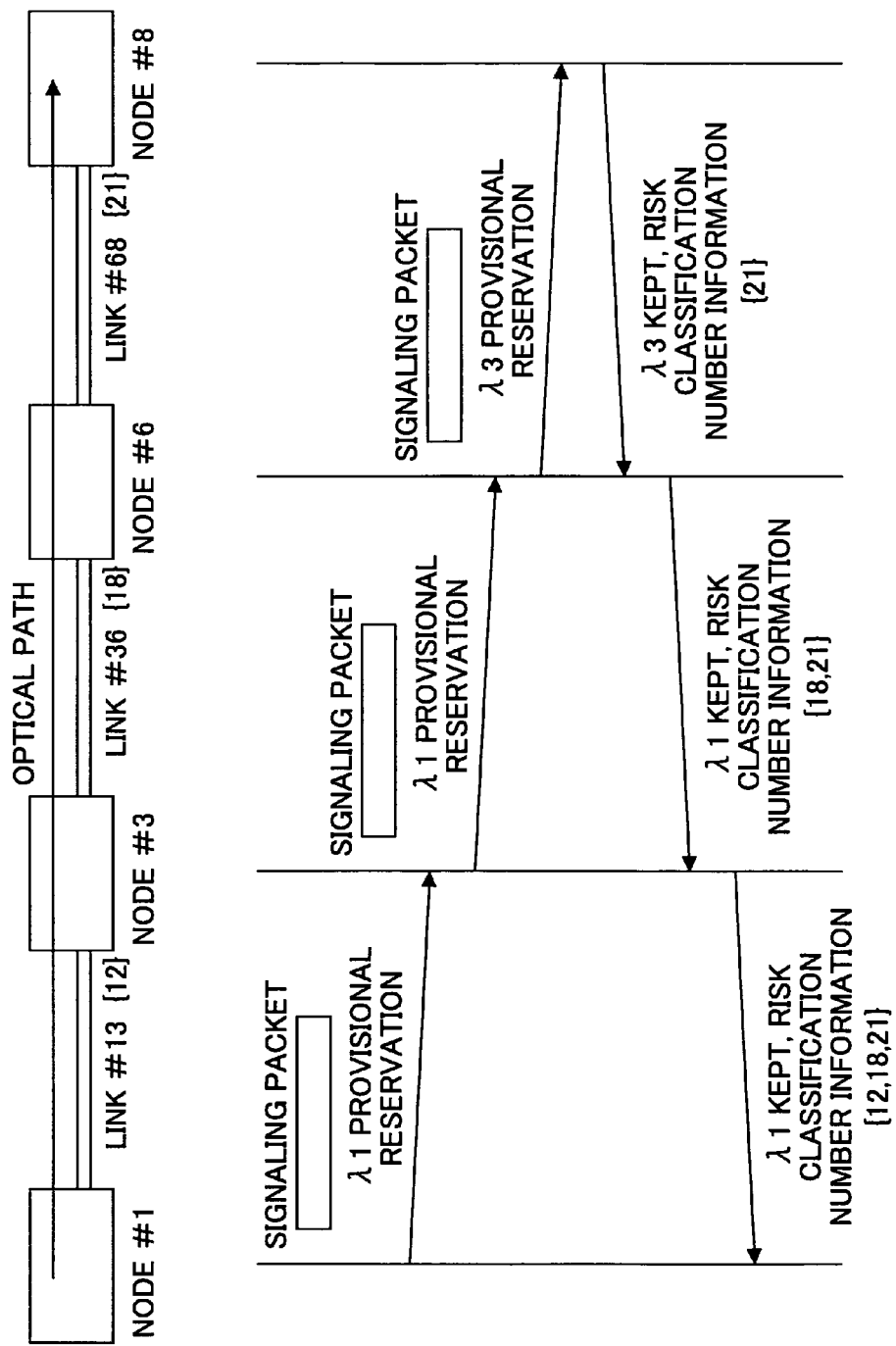
FIG. 7 is a figure showing a signaling sequence for setting an active optical path and a backup optical path in the backup path bandwidth keeping method of the embodiment 1-1.

FIG. 7 is a figure showing a signaling sequence for setting an active optical path and a backup optical path in the backup path bandwidth keeping method of the embodiment 1-1.

For the signaling sequence of the active path, a RSVP-TE protocol is used. In the RSVP-TE protocol, a Path message is sent from a source-side node to a destination-side node, so that resources necessary for setting the optical path are provisionally reserved in each node. When resources are provisionally reserved successfully for the nodes on the route including the destination node, resources that have been provisionally reserved are kept by using a Resv message from the destination-side node. At that time, risk classification number information of nodes and links through which the optical path passes is recorded and is reported to the source-side node.

After the signaling sequence of the active optical path succeeds, a signaling sequence for the backup optical path is performed next. The source-side node performs route calculation for the backup optical path. In the route calculation, the risk classification number information of the active optical path that is reported by the above-mentioned Resv message is used, and the route of the backup optical path is determined under the constraint that the route does not pass through a node or a link having the risk classification number information. The risk classification number information is failure scenario number information assigned to a single node or a single link or to a set of nodes or links. The route of the backup optical path is determined such that a failure scenario the same as that of the active optical path is included.

The concept of the "risk classification number" of the present embodiment is based on SRLG (Shared Risk Link Group (IETF Internet draft draft-ietf-ipo-framework-01.txt)). The SRLG is a technology in which a failure of each link or node apparatus is managed as a scenario number, and a setting route of a backup line for restoring an active line is determined beforehand for each failure scenario.

Figure 8:
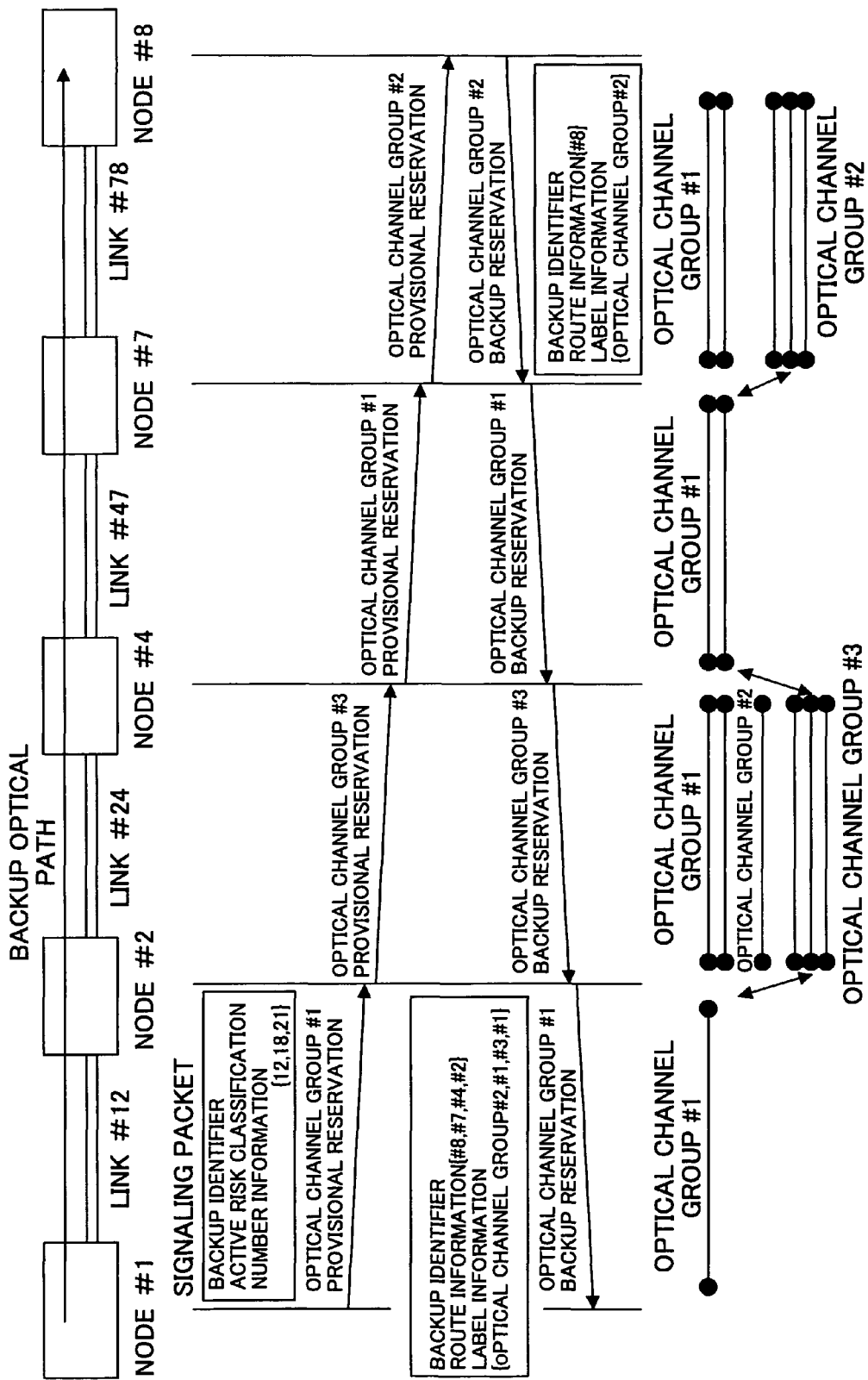
FIG. 8 is a figure showing a signaling sequence for setting the backup optical path of the embodiment 1-1.

FIG. 8 is a figure showing a signaling sequence for setting the backup optical path of the embodiment 1-1. The RSVP-TE protocol is also used for the signaling sequence for the backup optical path.

In the RSVP-TE protocol, a Path message is sent from the source-side node to the destination-side node, so that resources necessary for setting the optical path are provisionally reserved for each node.

The path message includes a backup identifier indicating that the message is for setting the backup optical path, and risk classification number information added to links and nodes through which the active path corresponding to the backup path passes. These pieces of information are stored in each node at which the resources are provisionally reserved.

After the resource provisional reservation succeeds in passing nodes on the route including the destination node, the provisionally reserved resources are "backup reserved" by using the Resv message from the destination-side node. Here, "backup reservation" is performed by specifying an identification number of an optical channel group or an optical channel used as backup resources. Physical setting of optical switches is not mandatory in the backup reservation. The Resv message includes a backup optical channel group identifying number of a backup optical channel group that accommodates the backup optical path. The backup optical channel group identifying number is different for each link. In this embodiment, a channel group 2 is selected between nodes #7 and #8, a channel group 3 is selected between nodes #2 and #4, and a channel group 1 is selected between nodes #4 and #1. The Resv message sent from the node #2 to the node #1 includes optical channel group number information of optical channel groups selected in each link in addition to route information (passing node number information). By receiving the information; the node #1 (Ingress node) can ascertain the route and selected backup wavelength channel group numbers for the backup optical path.

According to the method of this embodiment, by sharing an optical channel as a backup optical path resource necessary for failure recovery of an active optical path, it becomes possible to decrease the necessary number of optical channels. In addition, by bundling plural "backup reserved" optical channels so as to collectively manage the optical channels under one piece of identification number information, the number of managed objects of backup optical channel resources can be largely decreased in the whole network. Further, frequency of re-keeping processes for the backup optical path resources due to occurrence of switching can be largely decreased.

Embodiment 1-2

Backup Path Bandwidth Keeping Method

Each node has status of use of fiber links, identification information of active optical paths to be restored by each "backup reserved" optical channel group, and risk classification number information, through which links the active optical paths pass. Associated with adding a backup optical path that uses the "backup reserved" optical channel group, or deletion of a backup optical path "backup reserved" using the optical channel group, the necessary number of optical channels that forms the optical channel group changes. In the embodiment 1-2, an additional example of an management control method for the optional channel group that is "backup reserved" in the embodiment 1-1.

Figure 9:
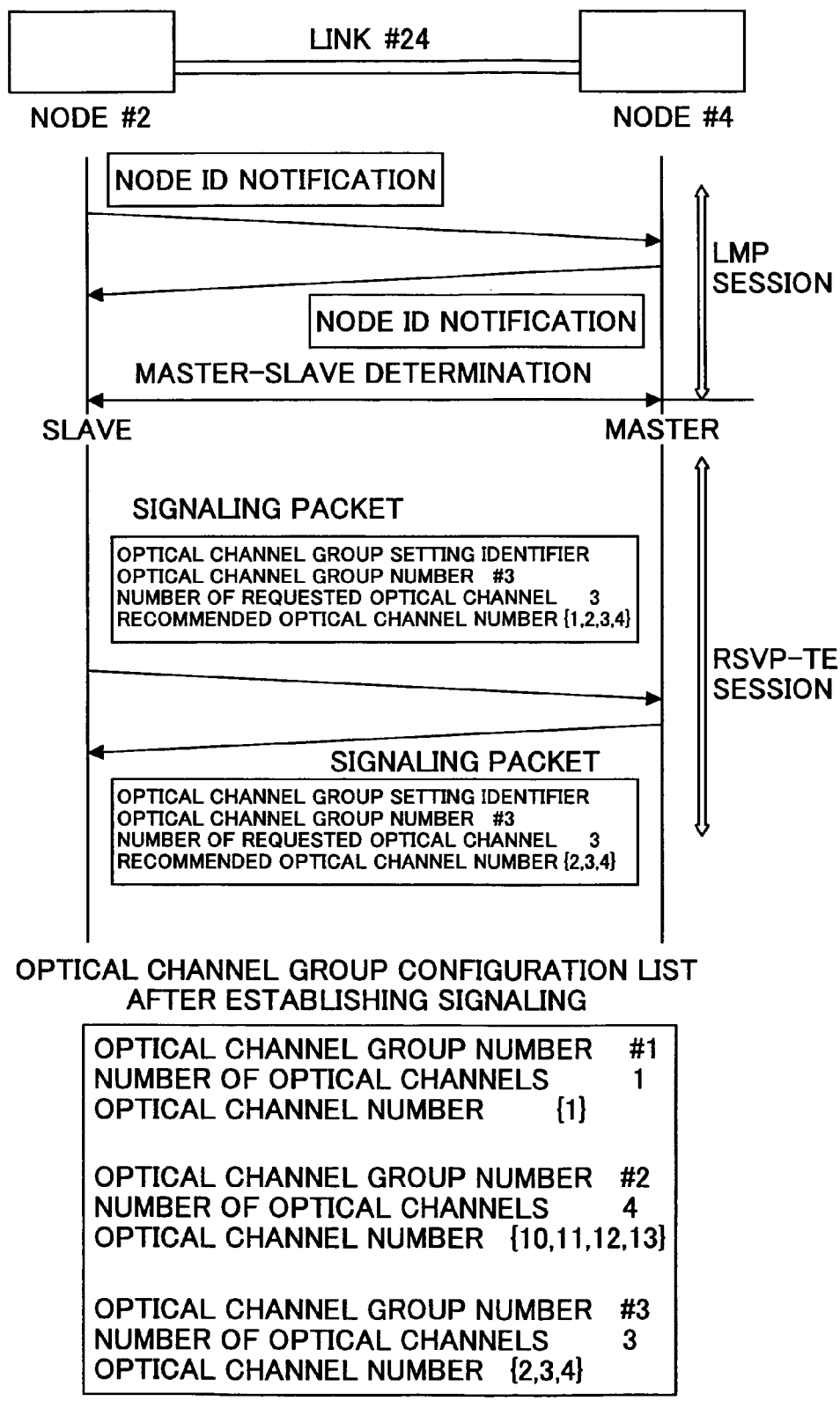
FIG. 9 is a figure showing a signaling sequence of an embodiment 1-2.

FIG. 9 shows a signaling sequence of the embodiment 1-2. A master node and a slave node are defined between two nodes adjacent to each other such that a node having a larger node identification number is determined to be the master node and a node having a smaller one is determined as the slave node. Or, the reverse may be applied.

A slave node #2 that has detected a change of backup reservation state of the backup optical paths recommends to a master node #4 candidates of optical channels forming the optical channel group by using the Path message. The master node #4 selects optical channels (2, 3, 4 in this example) that are applicable for members of the optical channel group among from the recommended optical channels (1, 2, 3, 4), and notifies the slave node #2 of the result by using the Resv message.

Even when the optical channel group is not established between the adjacent nodes, the same sequence is used. Deletion of an optical channel group may be performed when the number of optical channels that form the optical channel group becomes 0 or 1.

As mentioned above, in the present embodiment, the optical channel group that accommodates backup optical paths is autonomously maintained, established or deleted between adjacent nodes, and the present embodiment indicates a means for controlling optical channels that are members of the optical channel group in an autonomous distributing manner. According to that, the number of optical channels of the optical channel group that accommodates backup optical paths can be changed flexibly so that effective use of network resources and a high recovery rate for active optical path failure can be realized.

Embodiment 1-3

Backup Path Bandwidth Keeping Method

In the embodiment 1-3, a modified example of the management control method for the optical channel group that is "backup reserved" in the embodiment 1-2 is shown. In this embodiment, it is assumed that the optical channel group and optical channels that form the optical channel group have been autonomously established between the adjacent nodes.

Figure 10:
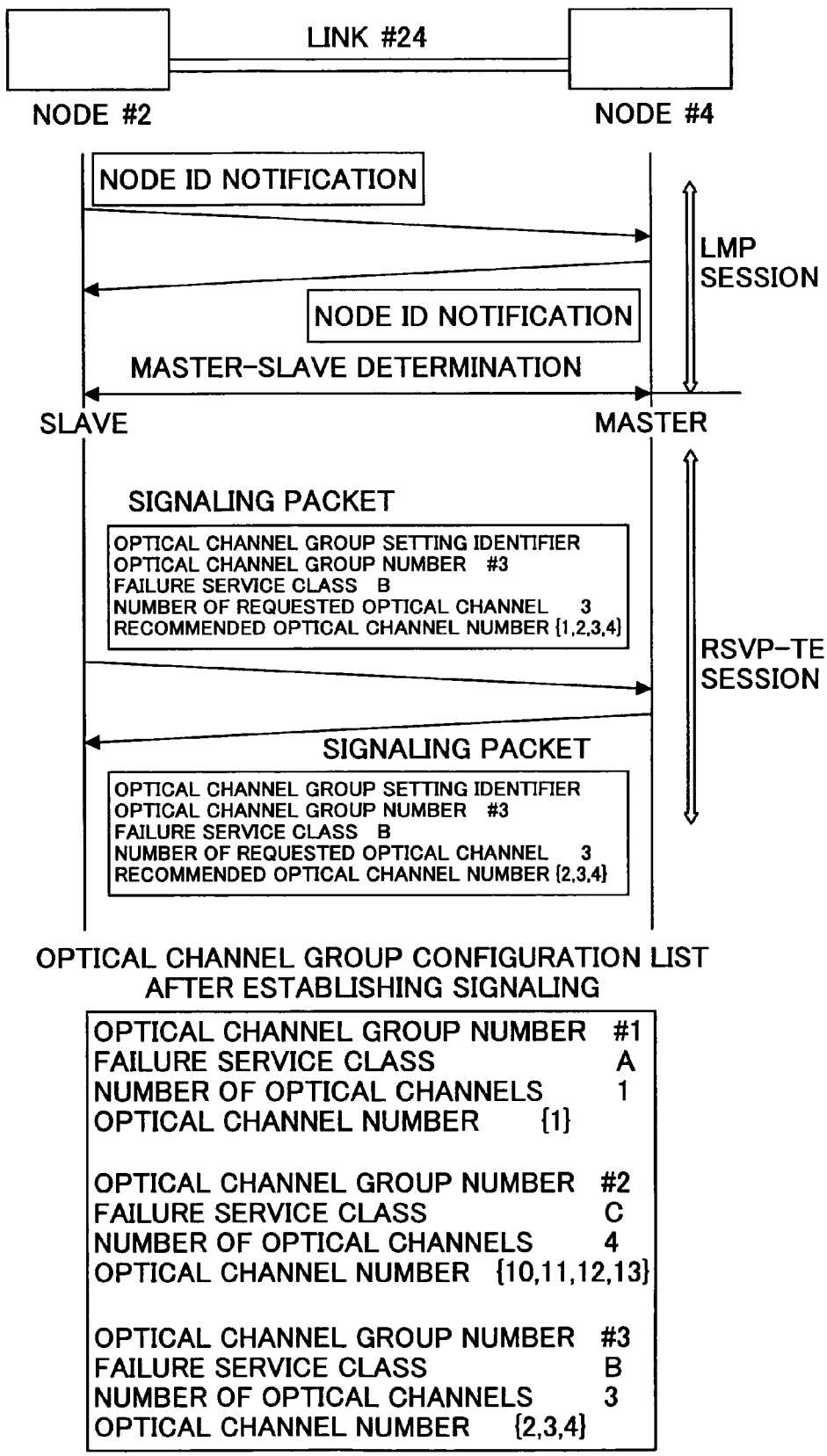
FIG. 10 is a figure showing a signaling sequence of an embodiment 1-3.

FIG. 10 shows a signaling sequence of the embodiment 1-3. The slave node #2 that has detected a change of backup reservation state of the backup optical paths recommends to the master node #4 candidates of optical channels forming the optical channel group by using the Path message. At this time, the slave node #2 also notifies the master node #4 of a failure service class of the optical channel group. The master node #4 selects optical channels (2, 3, 4 in this example) that are applicable for members of the optical channel group among from the recommended optical channels (1, 2, 3, 4), and notifies the slave node #2 of the result by using the Resv message. At this time, the master node #4 selects optical channels of the members in consideration of the failure service class of the optical channel group.

As mentioned above, according to the present embodiment, the optical channel group that accommodates backup optical paths is autonomously maintained, established or deleted between adjacent nodes, and by defining the failure service class of the optical channel group, the number of optical channels that become members of the optical channel group can be increased or decreased according to the failure service class. That is, a high recovery rate can be realized by including many optical channels as members for a high service class.

Embodiment 1-4

Backup Path Bandwidth Keeping Method

In the embodiment 1-4, a modified example of the management control method of the optical channel group that is "backup reserved" in the embodiment 1-2 is shown. In this embodiment, a method is shown in which the optical channel group and optical channels that form the optical channel group are autonomously established between adjacent nodes, wherein the establishment of the optical channel group and "backup reservation" of backup optical paths are performed at the same time.

Figure 11:
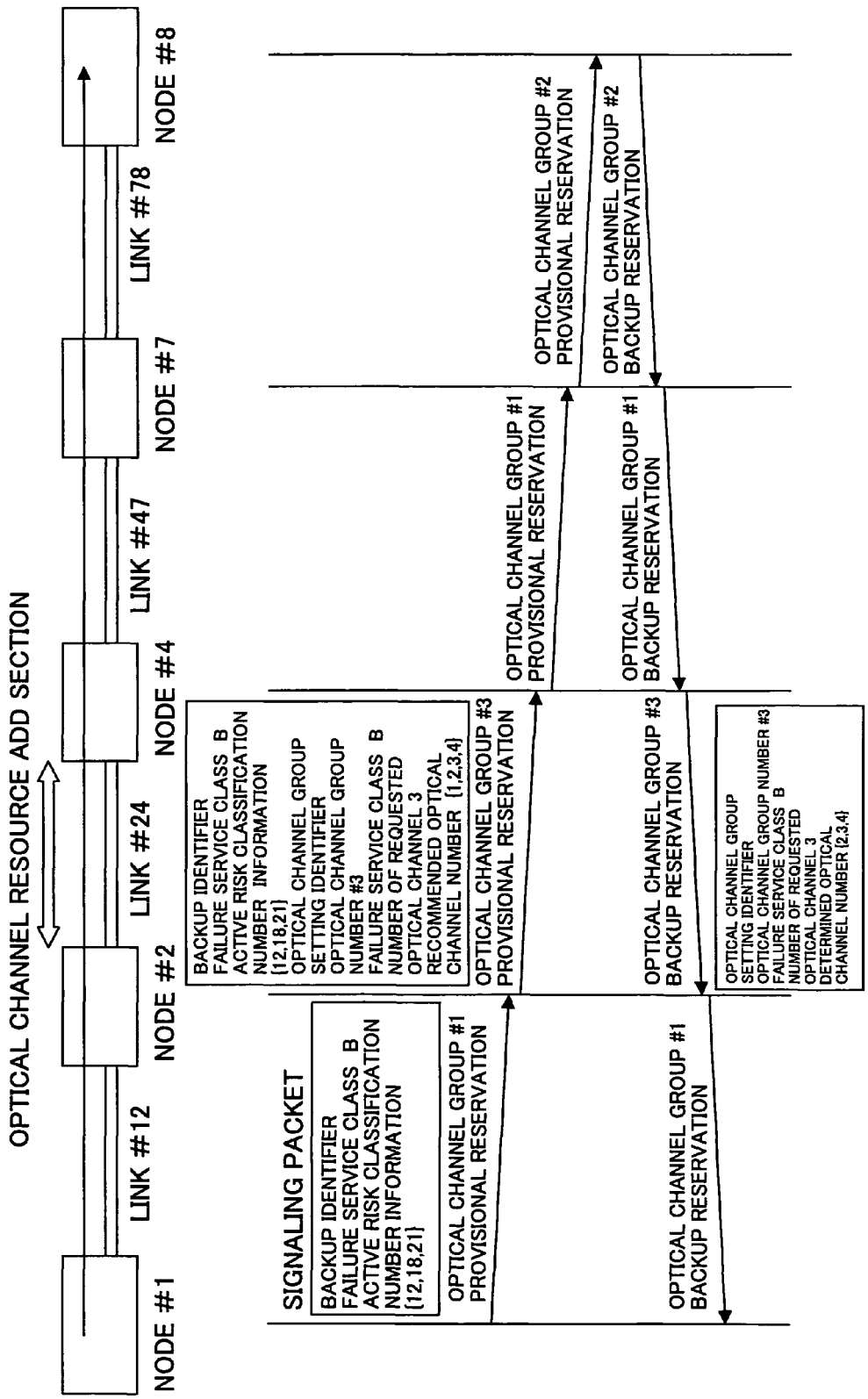
FIG. 11 is a figure showing a signaling sequence of an embodiment 1-4.

FIG. 11 shows a signaling sequence of the embodiment 1-4.

A source-side node that has detected a change of backup reservation state of the backup optical path at the same time when provisional reservation of the backup paths is performed recommends to a destination-side node candidates of optical channels forming the optical channel group by using a Path message. The destination-side node selects optical channels (2, 3, 4 in this example) that are applicable for members of the optical channel group among from the recommended optical channels (1, 2, 3, 4), and notifies the source-side node of the result by adding the result to the Resv message for establishing "backup reservation" of the backup optical paths.

As mentioned above, in this embodiment, the optical channel group, that is backup optical path resources necessary for failure recovery for active optical paths, can be established at the same time when setting the backup optical paths. When the number of optical channels that are members of the optical channel group is lacking, the number of the optical channels of the optical channel group can be quickly increased by the method of this embodiment by using the setting request of the backup optical paths. In addition, when an optical channel group that tries to accommodate backup optical paths cannot keep a necessary number of channels, "backup reservation" of the backup optical paths fails. But, processes in such a case can be also performed quickly so that backup optical path setting that uses a different route can be performed in a short time.

In each above-mentioned embodiment, although the optical (wavelength) path is described as an example as a physical medium of a path, any one of VC-3 or VC-4 path of SONET/SDH, a virtual path realized by setting a VPI identifier of ATM, a label switch path realized by the MPLS technology, and an Ether path realized by a Tag-VLAN technology of the Ether can be used.

By the way, in the backup path bandwidth keeping method of the present invention, as to M channels being kept as backup path bandwidths, when it becomes necessary to exchange a channel in the M channels with another channel that is not kept as backup path bandwidth due to a factor such as a failure of a transceiver, a phase for recommending at least identification number information of the new channel to a node at an opposite side destination of the new channel is added.

Embodiment 1-5

Path Switching Apparatus

Figure 12:
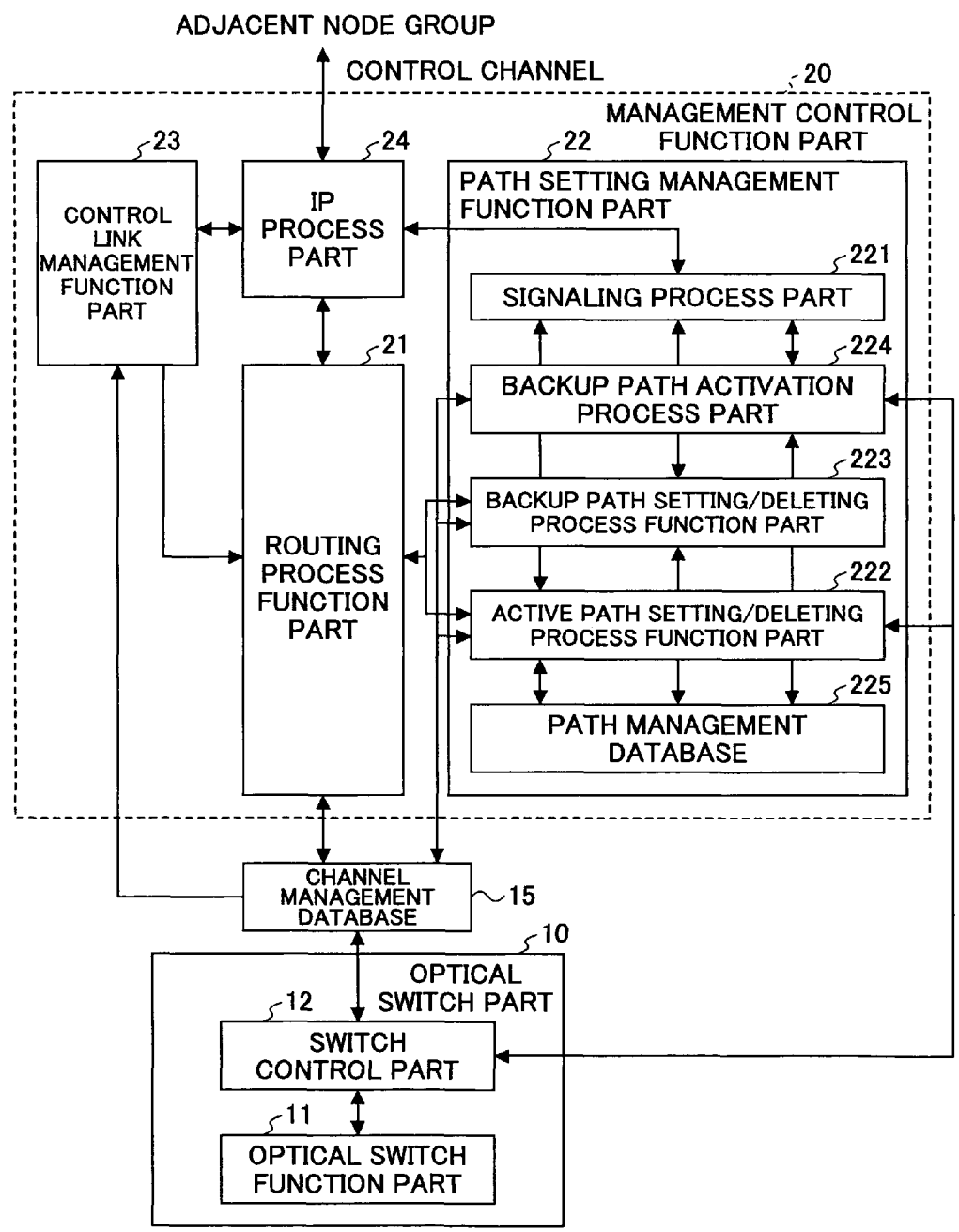
FIG. 12 is a figure showing a configuration of a path switching apparatus of an embodiment 1-5.

FIG. 12 is a block diagram of the path switching apparatus in the embodiment 1-5 of the present invention. The path switching apparatus of this embodiment is for realizing each embodiment of the above-mentioned backup path bandwidth keeping method. In block diagrams of apparatuses that are shown hereinafter, the same reference numerals are assigned to corresponding function parts.

In FIG. 12, the path switching apparatus includes an optical switch part 10 for realizing cross-connection by each wavelength path, a management control function part 20 for managing and controlling it, and a channel management database 15. The optical switch part 10 includes an optical switch function part 11 and a switch control part 12 for controlling the optical switch function part 11. The optical switch part 10 of this embodiment uses a 128×128 switch and has a capacity for inputting and outputting four fiber links each multiplexing 32 waves of optical paths. A transmission speed of each optical path is 2.5 Gbit/s, and is terminated with a SONET OC-48 interface.

Control links are formed by SONET OC-3 lines each having a transmission speed of 155 Mbit/s. The control signal is an OSPF/IS-IS protocol packet for obtaining a network topology of an optical router network, a RSVP-TE/CR-LDR protocol packet for setting and releasing an optical path between packet switches, or a LMP protocol packet for performing failure monitoring for each fiber link, for example.

The management control function part 20 includes a function part for processing the control signal protocols, and includes a routing process function part (OSPF/IS-IS protocol process function) 21 for realizing setting/releasing/switching/routing of an optical path, a path setting management function part (RSVP-TE/CR-LDR protocol process function) 22 for performing setting/releasing signaling for an optical path, a control link management function past (LMP protocol process function) 23 for performing failure monitoring of a control link network in which control signals are transmitted, and an IP process part 24.

The path setting management function part 22 includes a signaling process part 221 that is a core of the RSVP-TE protocol, an active path setting/deleting process function part 222, a backup path setting/deleting process function part 223, a backup path activation process part 224 and a path management database 225.

The signaling process part 221 may be use a CR-LDP protocol. The active path setting/deleting process function part 222, the backup path setting/deleting process function part 223 and the backup path activation process part 224 are connected to the channel management database 15. The active path setting/deleting process function part 222 and the backup path setting/deleting process function part 223 are connected to the routing process function part 21. The active path setting/deleting process function part 222 and the backup path activation process part 224 are connected to the switch control part 12. When setting an active path, signaling information is input and output to and from the active path setting/deleting process function part 222. In the same way, when setting a backup path, signaling information is input to and output from the backup path setting/deleting process function part 223.

The channel management database 15 has a data structure for defining and managing optical channel groups each bundling plural backup optical channels as resources for accommodating backup optical paths such that the optical channel management according to the management model of FIG. 6 can be performed, and the channel management database 15 performs state monitoring for optical channels. In addition, the channel management database 15 includes an optical channel risk classification database that stores risk classification number information of the path switching apparatus and of each link connected to the path switching apparatus, and stores risk classification number information registered for optical channels or optical channel groups that are accommodated in the path switching apparatus.

The backup path setting/deleting process function part 223 collectively manages M (M is a natural number equal to or less than L) channels as a channel group in L (L is a natural number) channels kept as bandwidths for accommodating backup paths to be connected to the same node. Thus, an identification number is assigned for identifying each channel group, and the backup path setting/deleting process function part 223 selects optical channels that become members of the optical channel group, and outputs the identification information of the optical channels to a database by linking the identification information with the corresponding optical channel group identification number.

The signaling process part 221 outputs a backup path activation signal communicated by an adjacent node to the backup path activation process part 224, and outputs a backup path activation signal from the backup path activation process part 224 to an adjacent node. In addition, when the signaling process part 221 receives, from an adjacent path switching apparatus, identification number information of channels or a channel group to be kept when keeping backup path bandwidths, and identification information indicating that the paths are backup paths, the signaling process part 221 distributes the information to the backup path setting/deleting process function part 223. The backup path setting/deleting process function part 223 searches for an output port of the backup path by referring to a routing table of the routing process function part 21, and outputs identification number information of a channel or a channel group to be kept in an output side for the backup path to the signaling process part 221 so as to notify an adjacent node of the identification number information.

The risk classification number information communicated from an adjacent path switching apparatus when keeping backup path bandwidths is processed in the same way. The risk classification number information input to the signaling process part 221 is input into the channel management database 15 via the backup path setting/deleting process function part 223, and is added to risk classification number information registered for the optical channel of the optical channel group to be kept for the backup optical path, and the identification number information and the risk classification number information of the optical channel or the optical channel group are communicated to an adjacent node.

The backup optical path activation process part 224 inputs/outputs a backup path activation signal with an adjacent node via the signaling process part 221. In addition, the backup optical path activation process part 224 performs actual backup path activation processes to drive the switch.

The routing process function part 21 collects statuses of links connected to the own node by using the control link management function part 23 and the channel management database 15. Next, the routing process function part 21 sends the collected link information to other adjacent nodes via the IP process part 24. At the same time, all link information received by each of the adjacent nodes are sent to the routing process function part 21 from each of the adjacent nodes. Based on the results, Next Hop information for routing optical paths to each node in the network is generated.

The Next Hop information to be generated has the following data structure:

| Node ID | Output IF |
|---|---|
| 10.10.105.1 | IF 1 |
| 10.10.105.2 | IF 2 |
| 10.11.106.2 | IF 1 |

This information means that, for example, it is instructed to connect an optical path from IF 1 in order to open the optical path to a node of 10.10.105.1.

Each of the active path setting/deleting process function part 225 and the backup path setting/deleting process function part 223 searches Next Hop information held in the routing process function part 21 on the basis of destination node ID information of an optical path included in a Path message sent from a source-side node, and sends the Path message to a searched output IF via the signaling process part 221 and the IP process part 24 to a destination-side node. The signaling process part 221 adds its own Node ID information when sending the Path message. Accordingly, when returning the Resv message from the destination node to the source node, it becomes possible to pass the Resv message through each node that sent the Path message. The active path/backup path generated through such processes is stored in the path management database 225. The path management database 225 stores information with a data structure shown in FIG. 13.

In the example shown in FIG. 13, one backup path is set in the node, and the backup path is a backup path for an active path 2. If the node having this path management database 225 has an ID of 10:10:101:2 or 10:10:108:1, the node is a terminal point of the active path and the backup path (that is, the node is a point at which an switching operation for switching to the backup path is performed when a failure occurs in the active path).

Next, an operation when a failure occurs in the active path is described. A failure notification information detected in the optical switch part 10 is transferred to the backup path activation process part 224. On the basis of this information, information of a path for which failure switching should be performed is searched for from the path management database 225. From the searched path information, it is determined whether to send a failure switching instruction. When it is necessary to send the failure switching instruction, a backup optical path activation instruction is communicated via the signaling process part 221 and the IP process part 24 along a backup path route reserved beforehand.

Embodiment 1-6

Path Switching Apparatus

Figure 14:
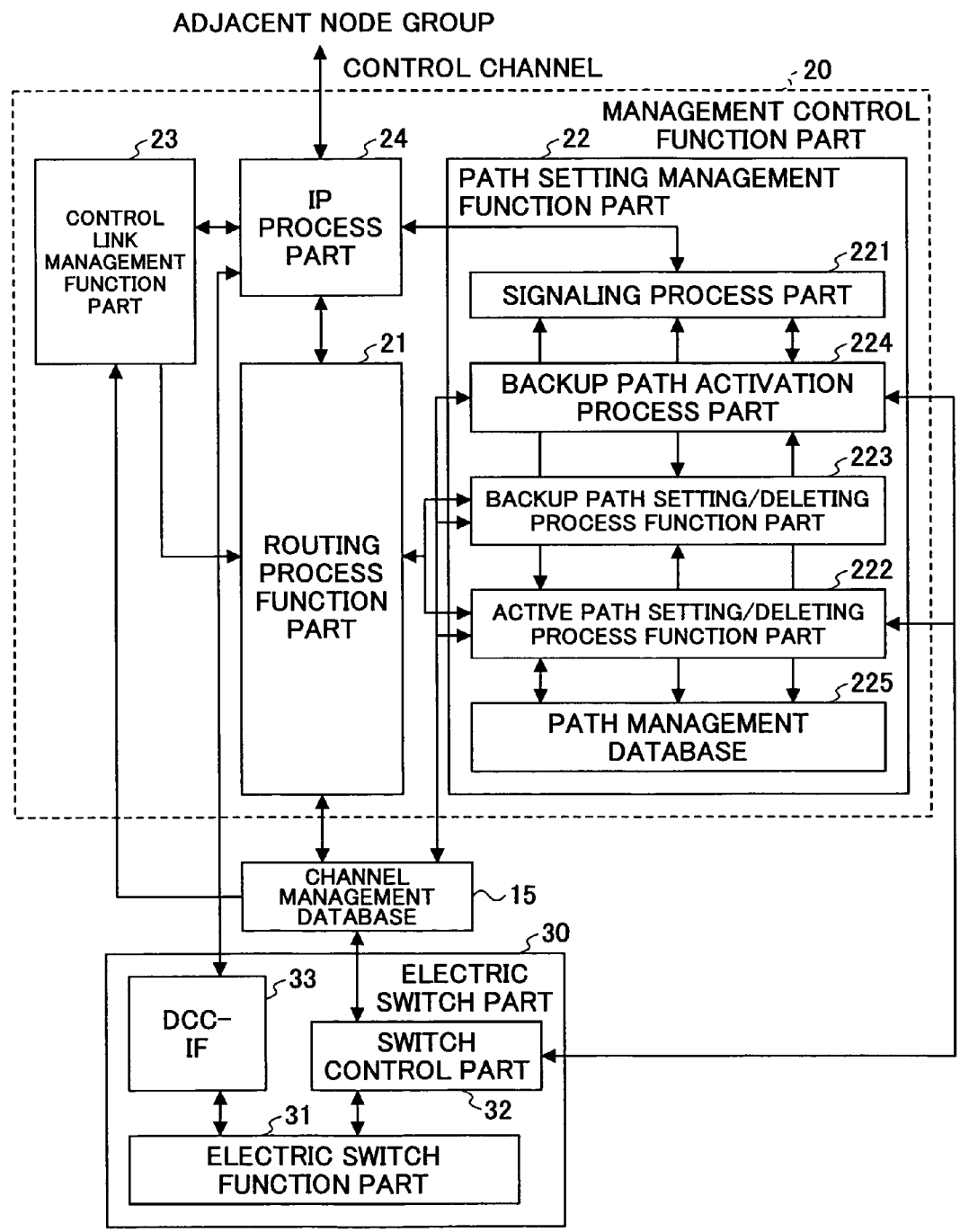
FIG. 14 is a figure showing a configuration of a path switching apparatus of an embodiment 1-6.

FIG. 14 is a block diagram of a path switching apparatus in the embodiment 1-6 of the present invention. The path switching apparatus of this embodiment includes an electrical switch part 30 instead of the optical switch part 10 of the embodiment 1-6. The electrical switch part 30 includes an electrical switch function part 31, a switch control part 32 for controlling the electrical switch function part 31, and a digital cross-connect interface (DCC-IF) 33 for exchanging a control signal with the management control function part 20, and realizes a 32×32 digital cross-connection for SONET OC-48 links.

The control link is formed by using the DCC channel of the SONET OC-48. The control signals are, for example, a OSPF/IS-IS protocol packet for obtaining a network topology, a RSVP-TE/CR-LDR protocol packet for setting/releasing a path set between packet switches, and a LMP protocol packet for performing failure monitoring of each fiber link.

A configuration of the management control function part 20 is the same as that of the embodiment 1-5. In this embodiment, it manages and controls VC-4 (155 M bit/s) channels defined in SONET instead of an optical channel.

Embodiment 1-7

Path Switching Apparatus

Figure 15:
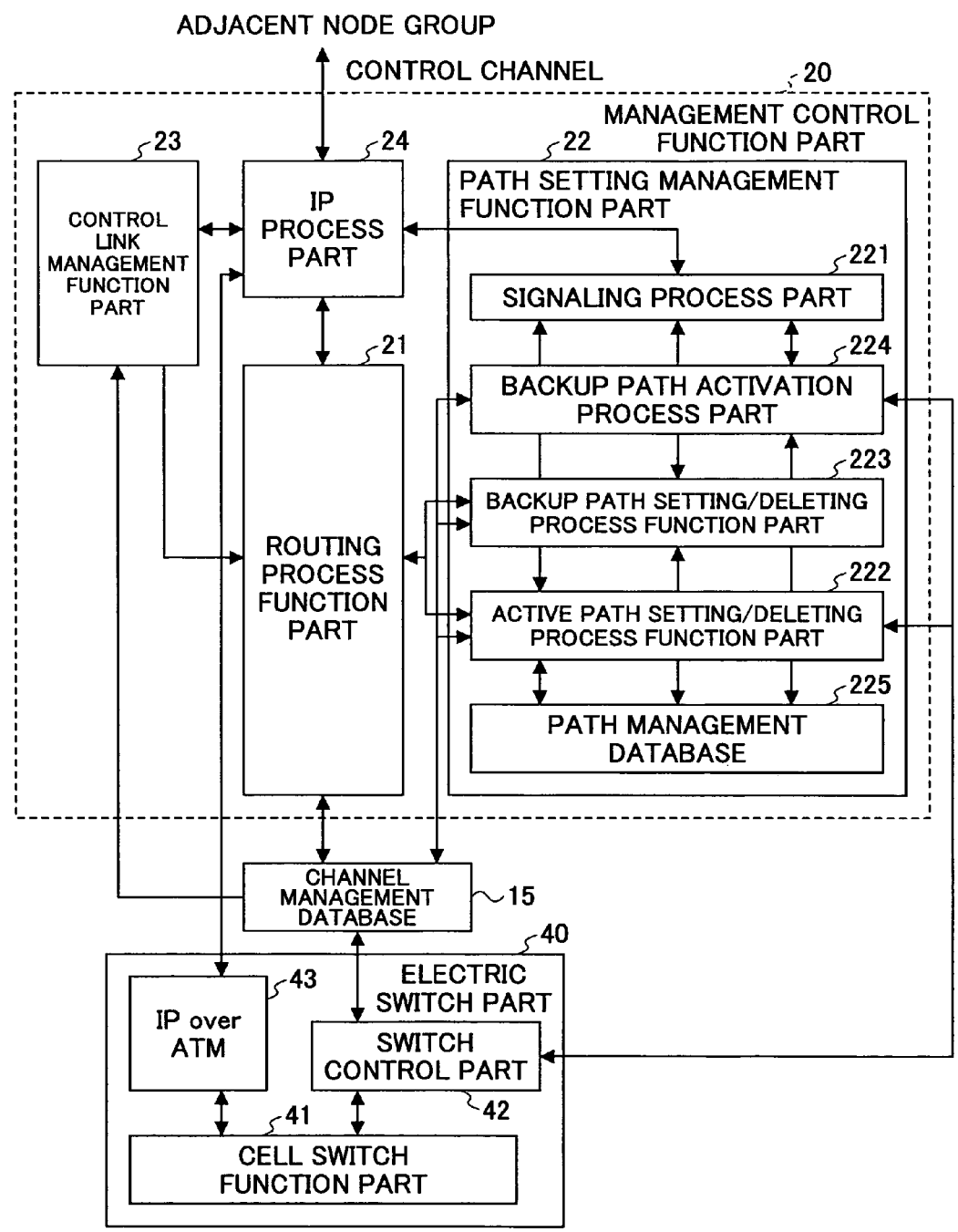
FIG. 15 is a figure showing a configuration of a path switching apparatus of an embodiment 1-6.

FIG. 15 is a block diagram of a path switching apparatus in the embodiment 1-7 of the present invention. The path switching apparatus of this embodiment includes an electrical switch part 40 instead of the optical switch part 10 of the embodiment 1-5. The electrical switch part 40 includes a cell switch function part 41, a switch control part 42 for controlling the cell switch function part 41, and a control signal interface (IP over ATM) 43 for exchanging a control signal with the management control function part 20, and can accommodate 32 input/output SONET OC-48 links, and realizes cell switching among them.

The control link is formed by using a common signaling network of a communication carrier. The control signals are, for example, a OSPF/IS-IS protocol packet for obtaining a network topology, a RSVP-TE/CR-LDR protocol packet for setting/releasing a path set between packet switches, and a LMP protocol packet for performing failure monitoring of each fiber link.

The configuration of the management control function part 20 is the same as that of the embodiment 1-5. In this embodiment, instead of the optical channel, the management control function part 20 manages and controls VPIs defined between ATM switches. The VPI defined for each link between nodes corresponds to a channel that accommodates an optical path or an electrical path. That is, as shown in the figure, to correlate VPIs between input and output in each node apparatus corresponds to a cross-connection operation of an optical path or an electrical path.

This embodiment can be applied to a label switch router that can provide a virtual path for IP packet traffic by using layer 2.5 MPLS technology, and this embodiment can be also applied to an Ether over MPLS switch that can provide a virtual path for an Ether frame in the same way.

As mentioned above, according to the backup path bandwidth keeping method and the path switching apparatus in the embodiments 1-1—1-7 of the present invention, a necessary number of channels can be decreased by sharing the channels as backup path resources necessary for failure recovery of active paths in a network in which path bandwidths are set in a dispersed or fixed manner and it is required that bandwidths of active paths completely agree with bandwidths of backup paths.

Further, by bundling plural "backup reserved" optical channels to collectively manage the optical channels on the basis of one piece of identification number information, it becomes possible to largely decrease the number of managed objects of backup channel resources in a whole network. In addition, frequency of occurrence of re-keeping processes for backup path resources due to occurrence of switching can be largely decreased. In addition, it becomes possible to construct a highly reliable communication network while preventing increase of an amount of facilities required for the backup paths. In addition, it becomes possible to differentiate service grades by defining failure classes also for backup path resources and by changing backup path recovery rates according to the failure classes.

Embodiments 2-1—2-3

Embodiment 2-1

Figure 16:
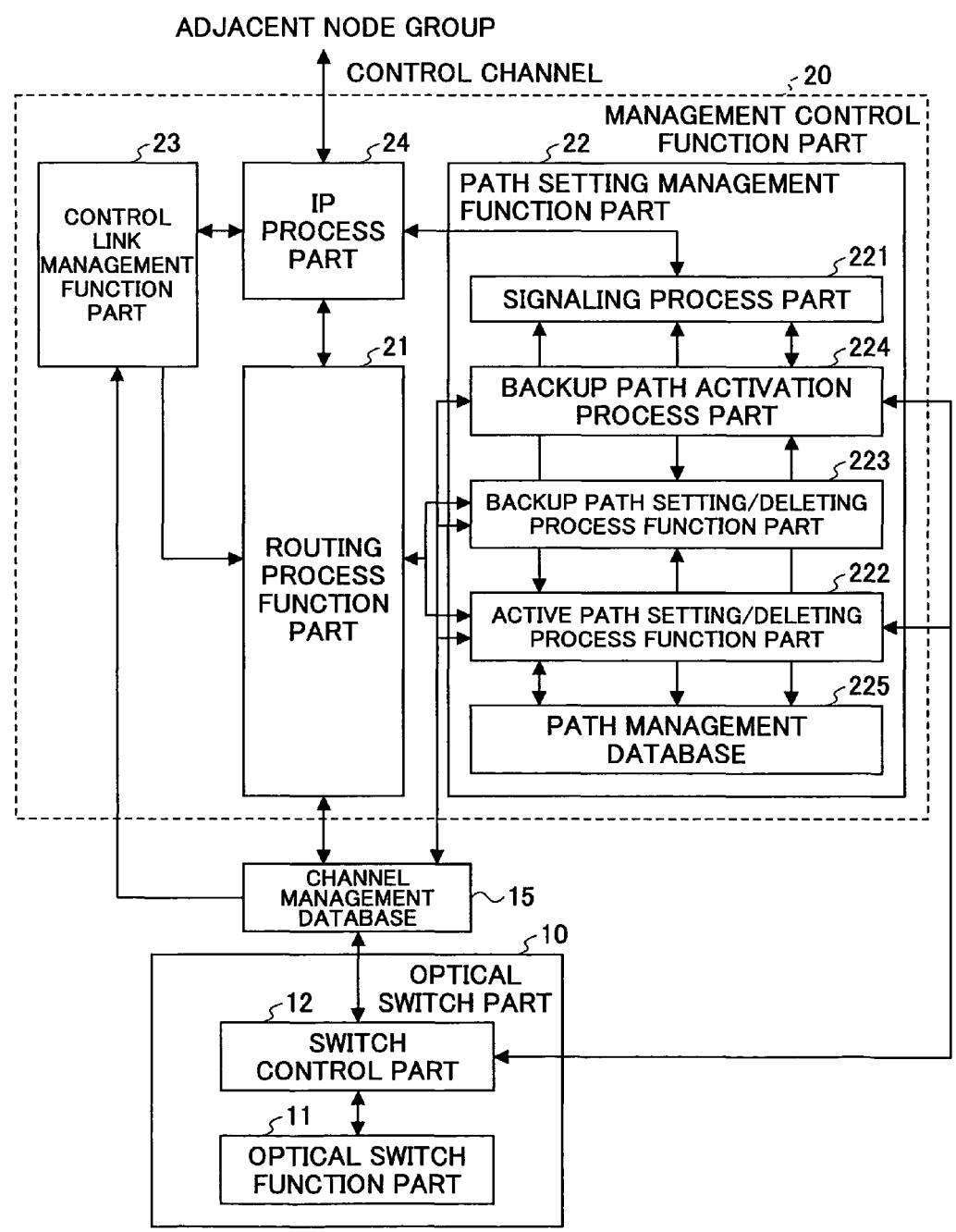
FIG. 16 is a figure showing a configuration example of a path switching apparatus of an embodiment 2-1.

FIG. 16 shows a configuration example of a path switching apparatus of the embodiment 2-1. This configuration is the same as that of the path switching apparatus of the embodiment 1-5.

That is, the path switching apparatus of the embodiment 2-1 includes an optical switch part 10 for realizing cross-connection by each wavelength path, a management control function part 20 for managing and controlling it, and a channel management database 15. The optical switch part 10 includes an optical switch function part 11 and a switch control part 12 for controlling the optical switch function part 11. The routing process function part 21 has a function for defining a cost for each fiber link, and searches for a route for which a fiber link cost accumulated between a source node and a destination node of an optical path to be established is the smallest. Dijkstra's algorithm can be applied for the search algorithm.

According to such a configuration, backup optical path setting can be performed only by designating, for each link, an optical channel group that accommodates backup optical paths. In addition, since the optical channel management database 15 is shared with the active path setting/deleting process function part 222, the apparatus can control itself such that an active optical path is not set as an optical channel forming the optical channel group accommodating backup optical paths. Accordingly, each node can set an optical channel to be "backup reserved" as a backup resource for each link in an autonomous and distributed manner.

In the following, different points compared to the path switching apparatus of the embodiment 1-5 are mainly described.

Figure 17:
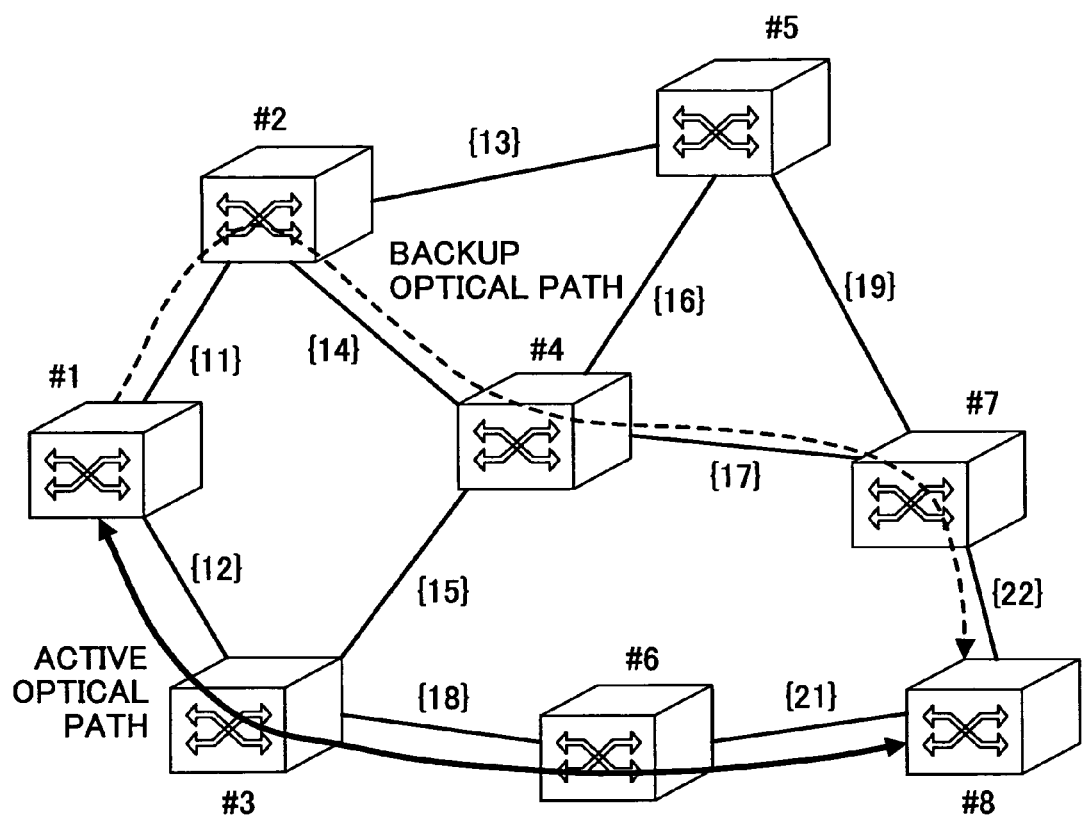
FIG. 17 is a figure showing a configuration example of an optical communication network to which the present embodiment is applied.

FIG. 17 shows a configuration example of an optical communication network to which the present embodiment is applied. A bandwidth is kept in nodes #1-#3-#6-#8 as an active path, then, an optical path is opened along the route. On the other hand, a bandwidth is only reserved in nodes #1-#2-#4-#7-#8 as a backup optical path, and actual connection setting is not performed until the active optical path is disconnected due to a certain failure for the active optical path.

For the optical channel group that accommodates the backup optical path, risk classification number information that is assigned to the active optical path corresponding to the accommodated backup optical path is recorded. In this embodiment, {12, 18, 21} is assigned as the risk classification number information that is a failure scenario of the route of the active optical path. At this time, the risk classification number information {12, 18, 21} is attached as attribute information of the optical channel group that accommodates the backup optical path for the active optical path. The risk classification number information is communicated to nodes one by one from a source-side node to a destination-side node when setting the backup optical path. Each node registers the risk classification number information in the channel management database 15 via its own signaling process part 221. As a result, the risk classification number information is associated with identification number information of the optical channel group that accommodates the backup optical path, and is stored in the channel management database 15 in every node on the backup optical path route.

Figure 18:
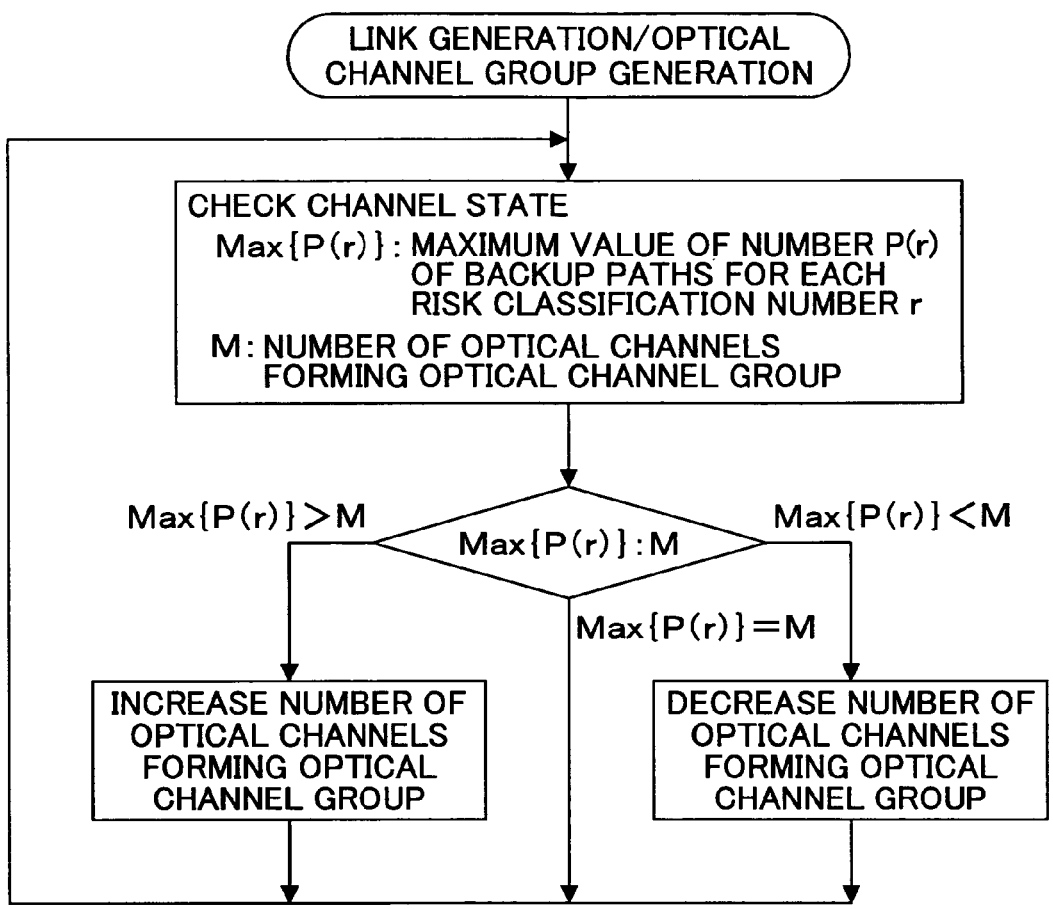
FIG. 18 is a flowchart showing a backup path setting process sequence in the backup path setting/deleting process function part 223 according to the embodiment 2-1.

FIG. 18 shows a backup path setting process sequence in the backup path setting/deleting process function part 223 according to the embodiment 2-1. Assuming that a number of backup optical paths registered in an optical channel group is n, a number of backup optical paths to be switched to the optical channel group when a switching operation from active optical paths to backup optical paths is $P(r)$ for the switching factor of a risk classification number r, and that a maximum value of the backup optical path number $P(r)$ obtained for the risk classification number r is Max $\{P(r)\}$, the backup path setting/deleting process function part 223 sends, to the signaling process part 221, a command for setting a number M of optical channels forming the optical channel group to be equal to or larger than Max $\{P(r)\}$ and equal to or smaller than n. For example, if the number M of the optical channels forming the optical channel group is smaller than Max $\{P(r)\}$, the number of the optical channels is increased, if the number M of the optical channels forming the optical channel group is larger than Max {P(r)}, the number of the optical channels is decreased; if they are the same, no process is performed.

Accordingly, setting of the backup optical paths is performed in consideration of the risk classification number information assigned to the active optical path. As to the channel group that accommodates the backup optical path, a necessary number of optical channels can be kept while checking the number of the optical channels that forms the channel group whenever necessary.

Figure 19:
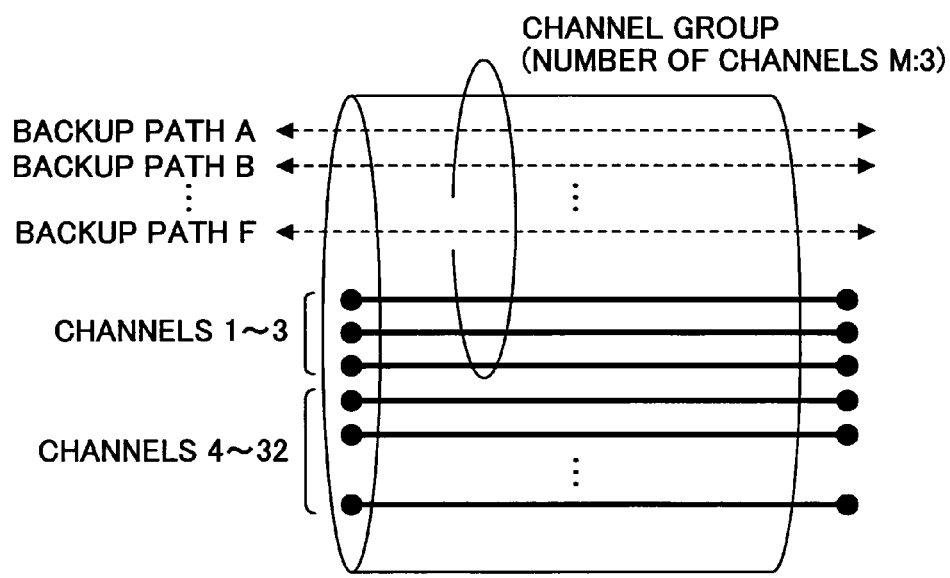
FIG. 19 is a figure for explaining an example 1 of the backup path setting process sequence according to the embodiment 2-1.

For example, as shown in FIG. 19, it is assumed that a number M of current optical channels that forms the optical channel group is 3, and that 6 backup optical paths A-F are set (n=6). In the optical channel group, there are three backup optical paths A, B and D to be switched to the optical channel group when a single failure of a risk classification number {12} occurs. Max {P(r)} is 3 when r=12. Therefore, Max {P(r)}=M, so that 100% recovery can be achieved against a failure of the risk classification number {12} in this state.

For example, in a link section #24 between nodes #2-#4 shown in FIG. 17, it is assumed that, as shown in FIG. 20, a seventh backup optical path X for an active optical path having risk classification numbers {12, 18, 21} is added to the optical channel group (M=3) formed by three optical channels. In this case, since Max {P(r)} is 4 when r=12, the three optical channels are not enough for restoring all current optical paths for the risk classification number {12}. Thus, as shown in a sequence of FIG. 18, one optical channel is increased in the optical channel group (a channel 4 is added from idle channels in FIG. 20), so that the channel group is formed by four optical channels. Accordingly, 100% recovery can be realized for a single failure for the four optical paths that pass through a link of the risk classification number {12}.

As mentioned above, in the present embodiment, the backup optical path is set in consideration of risk classification number information added to the active optical path, so that backup optical path resources can be reduced as much as possible while realizing 100% recovery for a single failure. In addition, according to the number of optical channels necessary for an optical channel group, an optical channel that belongs to the optical channel group can be dynamically added/deleted.

Embodiment 2-2

In this embodiment, as information stored in the channel management database 15, attribute information of failure service classes is added to the optical channel group that accommodates the backup optical paths. By providing optical paths having various failure service classes, path non-available rates due to multiple failures are differentiated so as to delicately serve needs for failure service grades for users.

Figure 21:
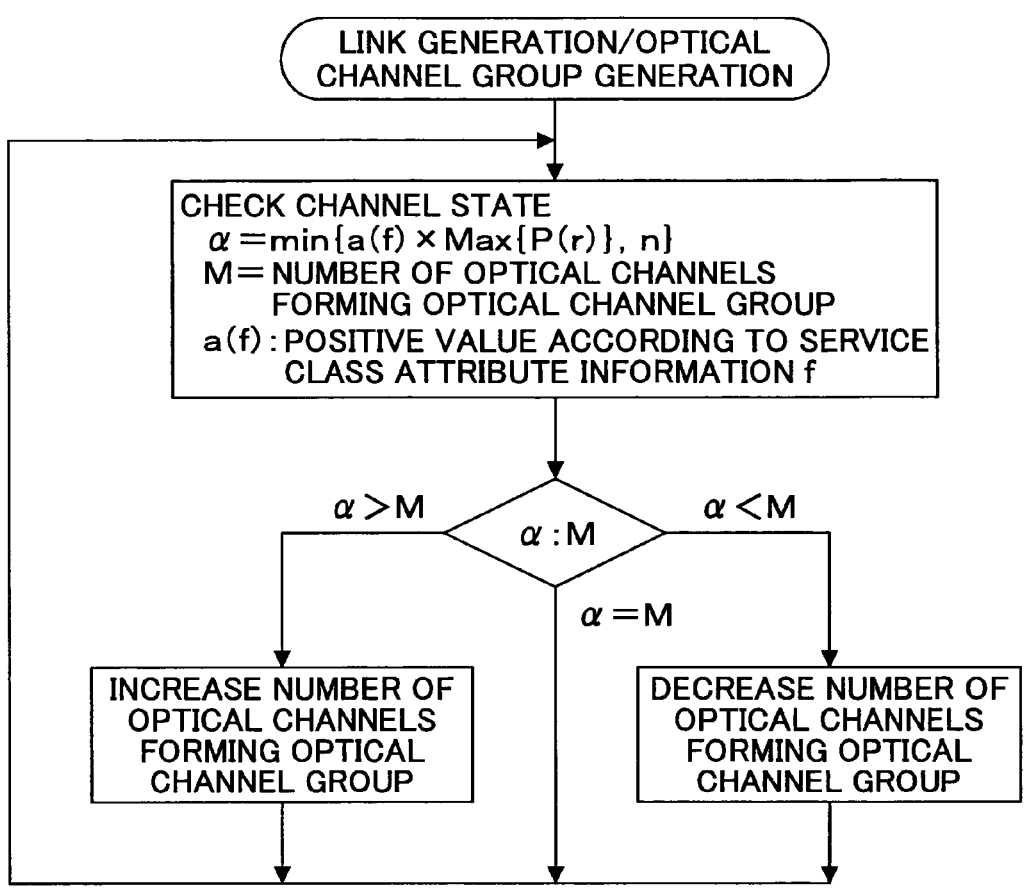
FIG. 21 is a flowchart showing a backup path setting process sequence in the backup path setting/deleting process function part 223 according to the embodiment 2-2.

FIG. 21 shows a backup path setting process sequence of the backup path setting/deleting process function part 223 in the embodiment 2-2. In this embodiment, limitations are applied in processes such that only a backup optical path for an active optical path of a failure service class the same as (or equal to or lower than) a failure service class held by the optical channel group is accommodated in the optical channel group.

Instead of the number of optical channels Max {P(r)} minimally required for the optical channel group, a positive value a(f) according to failure service class attribute information f is defined. Assuming that α is a number of optical channels necessary for an optical channel group of the failure service class attribute f, min{a(f)×Max{P(r)},n} is used as the number α. For example, as shown in FIG. 22, it is assumed that the number M of optical channels that form the optical channel group is five, and that five backup optical paths A-E are set (n=5). In the optical channel group, there are three backup optical paths A, B and C that will be switched to the optical channel group when a single failure of a risk classification number {2} occurs, so that Max{P(r)} is 3 when r=2. In the case of the embodiment 2-2, if the current five optical channels are decreased by one or two for the three optical paths that pass through the link of the risk classification number {2}, 100% recovery can be realized for a single failure.

On the other hand, according to the present embodiment, assuming that a value a(f) corresponding to a failure service class attribute "Gold" is 2, min{2×3,5}=5 is used as the number α of optical channels minimally required for the optical channel group. The number α of the optical channels does not exceed the number n (=5) of the backup optical paths. Accordingly, shared restoration for the failure service class "Gold" can be realized. That is, even if failures occur for a larger number of active optical paths, a probability of recovery becomes high for active optical paths to which a high failure service class is set, so that the path non-available rate due to multiple failures can be decreased.

Figure 23:
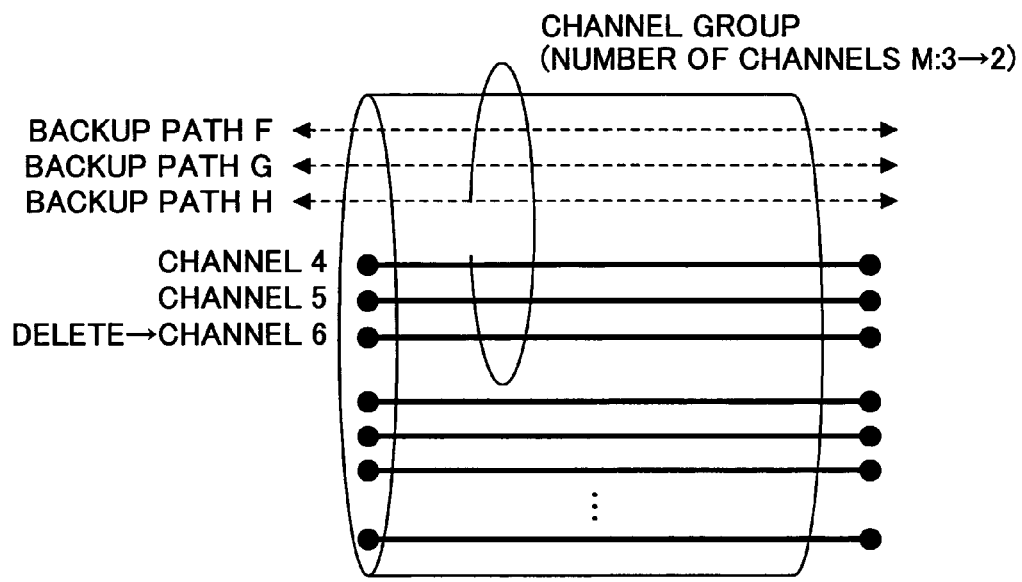
FIG. 23 is a figure for explaining an example 2 of the backup path setting process sequence according to the embodiment 2-2.

In addition, as shown in FIG. 23, assuming that the number M of the optical channels that forms the optical channel group is 3, and that three backup optical paths F-H are set (n=3). In the optical channel group, there are two backup optical paths F and H that will be switched to the optical channel group when a single failure of a risk classification number {3} occurs, so that Max{P(r)} is 2 when r=3. On the other hand, assuming that a value a(f) corresponding to a failure service class attribute "Silver" is 1, the number α of optical channels minimally required for the optical channel group becomes min{1×2,3}=2. Therefore, as shown in a sequence of FIG. 21, the number of optical channels that form the optical channel group is decreased by one from the current three, so that shared restoration can be realized for the failure service class "Silver".

Embodiment 2-3

Figure 24:
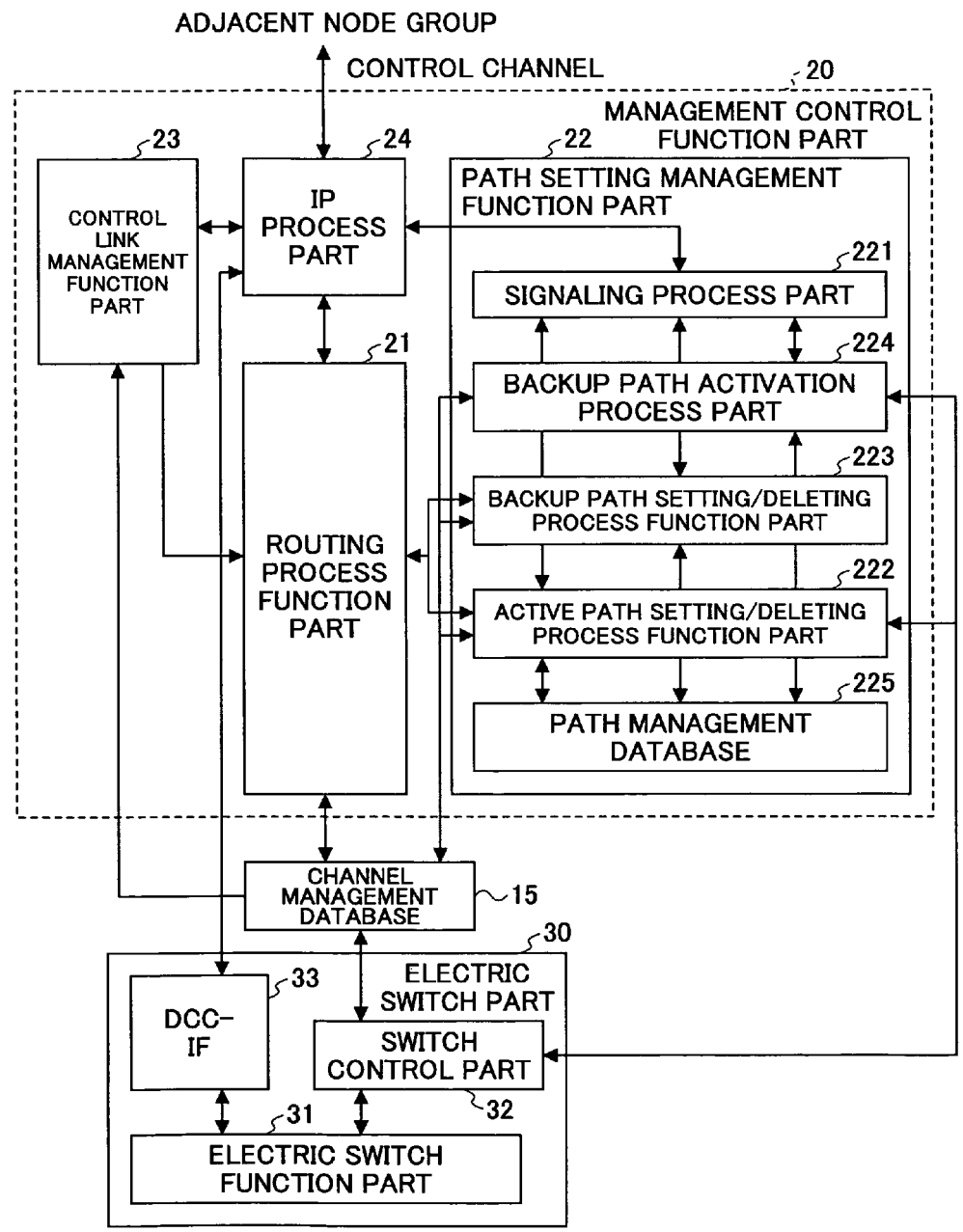
FIG. 24 is a figure showing another configuration example of the path switching apparatus.

FIG. 24 shows another configuration example of the path switching apparatus of the present invention. The path switching apparatus of this embodiment includes an electrical switch part 30 instead of the optical switch part 10 of the embodiment 1-6. The electrical switch part 30 includes an electrical switch function part 31, a switch control part 32 for controlling the electrical switch function part 31, and a digital cross-connect interface (DCC-IF) 33 for exchanging a control signal with the management control function part 20, and realizes digital cross-connection SONET OC-48 links by 32×32.

The control link is formed by using the DCC channel of the SONET OC-48. The control signals are, for example, a OSPF/IS-IS protocol packet for obtaining a network topology, a RSVP-TE/CR-LDR protocol packet for setting/releasing a path set between packet switches, and a LMP protocol packet for performing failure monitoring of each fiber link.

A configuration of the management control function part 20 is also the same. In this embodiment, it manages and controls VC-4 (155 M bit/s) channels defined in SONET instead of an optical channel.

As described above, according to the invention of the embodiments 2-1—2-3, automatization of backup path setting can be performed. In addition to that, reliable failure recovery for a single link failure can be realized while minimizing the amount of facilities for backup paths, and occurrence rates of an idle state against multiple link failures can be differentiated according to service grades provided to users.

Embodiments 3-1—3-2

Embodiment 3-1

Figure 25:
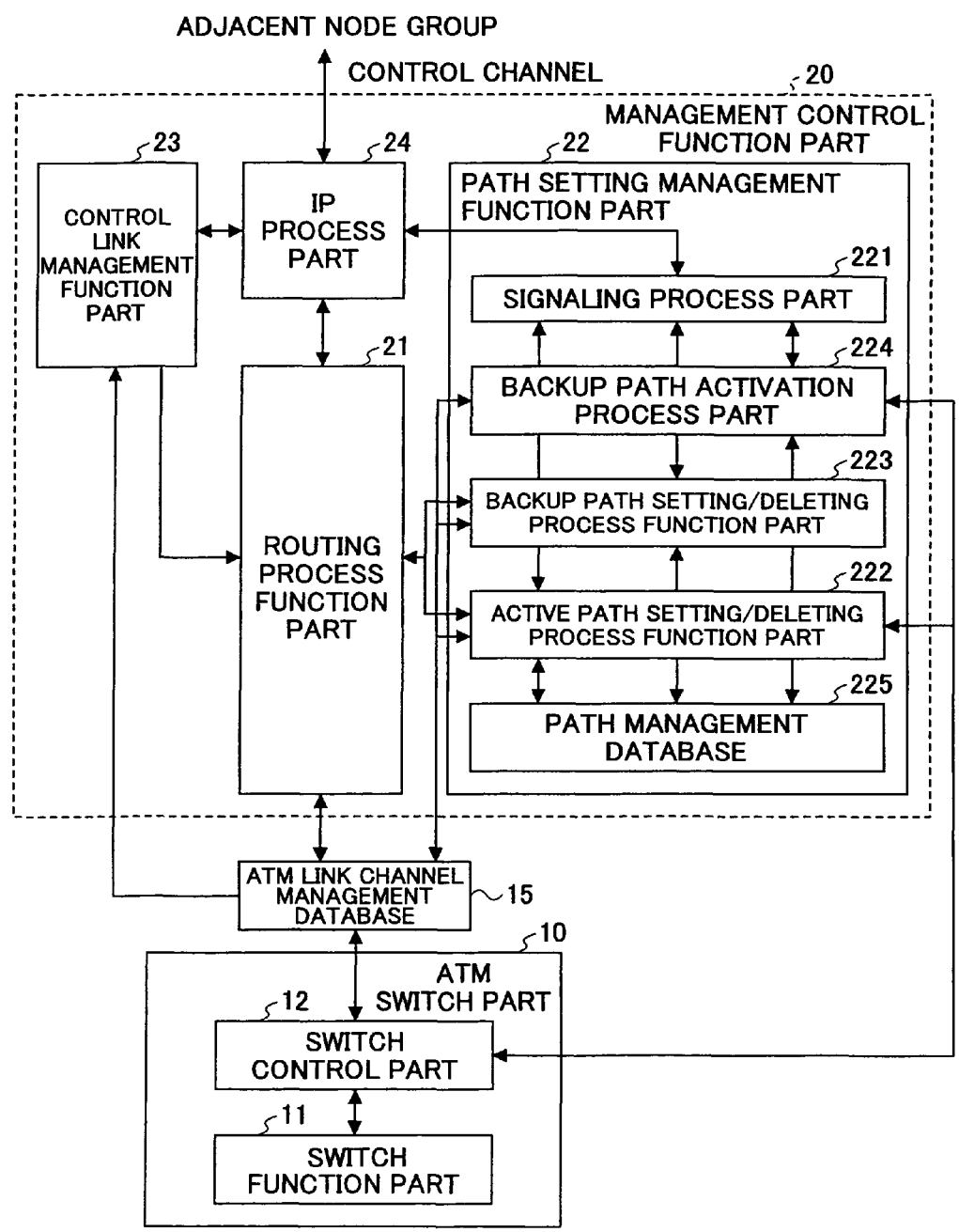
FIG. 25 is a figure showing a configuration example of a path switching apparatus of an embodiment 3-1.

FIG. 25 shows a configuration example of a path switching apparatus of the embodiment 3-1. This apparatus forms an ATM switch for realizing switching of virtual paths (VP) defined on an ATM network.

In the figure, the path switching apparatus includes an ATM switch part 10, a management control function part 20 for managing and controlling it, and an ATM link channel management database 15. The ATM switch part 10 includes an switch function part 11 and a switch control part 12 for controlling the switch function part 11. This configuration is almost the same as the path switching apparatuses of the embodiments 1-5 and 2-1, but a point is that, instead of an optical path, VP is dealt with differently. Also, functions of each part are the same as those of the embodiment 2-1 except for the point that, instead of an optical path, VP is dealt with.

The management control function part 20 includes function parts for processing control signal protocols, and includes a routing process function part (OSPF/IS-IS protocol process function) 21 for realizing setting/releasing/switching/routing of VPs, a path setting management function part (RSVP-TE/CR-LDR protocol process function) 22 for performing VP setting/releasing signaling, a control link management function part (LMP protocol process function) 23 for performing failure monitoring of a control link network in which control signals are transmitted, and an IP process part 24.

The routing process function part 21 has functions for defining a cost for each ATM link, and searching for a route for which an ATM link cost accumulated between a source node and a destination node of a VP to be established is minimum. Dijkstra's algorithm can be applied for the search algorithm.

The path setting management function part 22 includes a signaling process part 221 that is a core of the RSVP-TE protocol, an active path setting/deleting process part 222, a backup path setting/deleting process part 223, a backup path activation process part 224 and a path management database 225. The signaling process part 221 may be similarly configured by using a core of a CR-LDP protocol. The active path setting/deleting process part 222, the backup path setting/deleting process part 223 and the backup path activation process part 224 are connected to the ATM link channel management database 15. The active path setting/deleting process part 222 and the backup path setting/deleting process part 223 are connected to the routing process function part 21. The active path setting/deleting process part 222 and the backup path activation process part 224 are connected to the switch control part 12. When setting an active path, signaling information is input to and output from the active path setting/deleting process part 222. In the same way, when setting a backup path, signaling information is input and output to and from the backup path setting/deleting process part 223.

Figure 26:
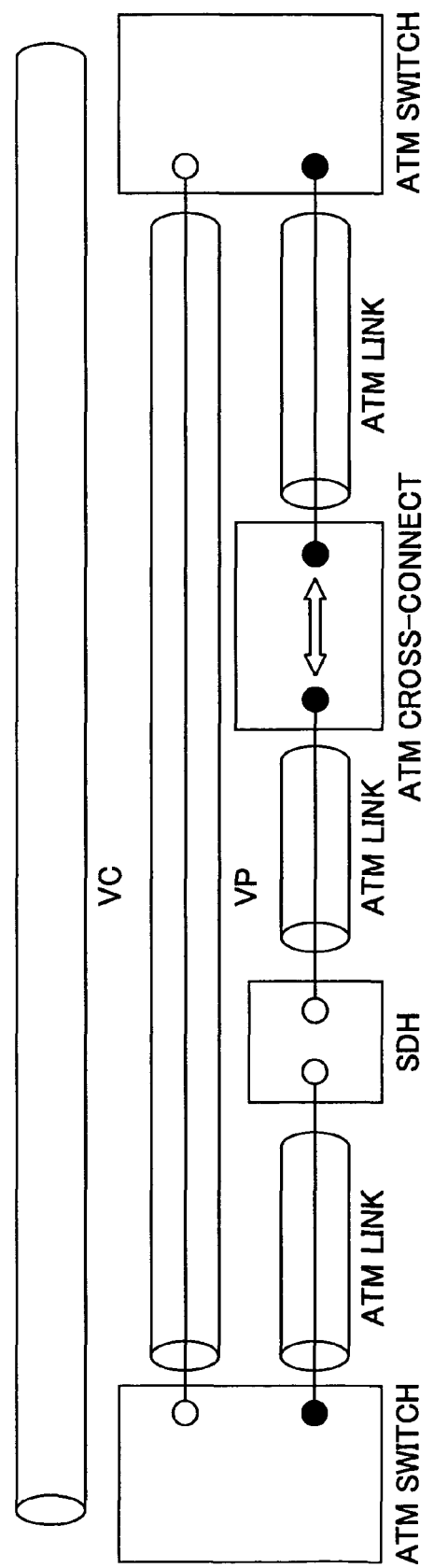
FIG. 26 is a figure showing a management model of a communication network to which the present embodiment is applied.

In the ATM link channel management database 15, a database for managing ATM link channels according to a management model of FIG. 26 is constructed. In the ATM network, as shown in FIG. 26, three layers of a VC layer, a VP layer and an ATM link layer are separated and managed.

In addition, the ATM link channel management database 15 includes a risk classification database holding risk classification number information of the path switching apparatus and each link connected to the path switching apparatus, and risk classification number information registered for ATM links that are accommodated in the path switching apparatus.

In this embodiment, it is assumed that failure recovery processes are performed for each VP, and that a bandwidth that accommodates VPs set in a link connecting between two ATM switches is "channel". It is assumed that a VP identifier (VPI) is set as a means for identifying "channel" for accommodating each VP.

In the present embodiment, VPIs of bandwidths M used for recovery of a backup path and channels are bundled for the sake of management, and are managed as a channel group (a VPI group). For keeping bandwidths of backup paths, a VPI group of each link is designated.

The backup path setting/deleting process part 223 collectively manages M (M≦L) backup path bandwidths as a VPI group in L backup path bandwidths kept as bandwidths for accommodating backup paths connected to the same nodes. Thus, an identification number is assigned for identifying each VPI group, and the backup path setting/deleting process part 223 selects channels that become members of the VPI group, and outputs the identification information of the channels to a database by linking the identification information with corresponding VPIs.

The signaling process part 221 outputs a backup path activation signal communicated from an adjacent node to the backup path activation process part 224, and outputs a backup path activation signal sent from the backup path activation process part 224 to an adjacent node. In addition, at the time when keeping a backup path bandwidth, when the signaling process part 221 receives, from an adjacent path switching apparatus, identification information of VPIs or a VPI group to be kept and identification information indicating that the path is a backup path, the signaling process part 221 distributes the information to the backup path setting/deleting process part 223. The backup path setting/deleting process part 223 searches for an output port of the backup path by referring to a routing table of the routing process function part 21, and outputs identification number information of VPIs or a VPI group to be kept in an output side of the backup path to the signaling process part 221 so as to notify an adjacent node of the identification number information.

The backup path activation process part 224 inputs/outputs a backup path activation signal with an adjacent node via the signaling process part 221. In addition, the backup path activation process part 224 performs actual backup path activation processes to drive the switch.

According to such a configuration, backup path setting can be performed only by designating, for each link, a VPI group that accommodates backup paths. In addition, since the ATM link channel management database 15 is shared with the active path setting/deleting process part 222, the apparatus can be controlled such that an active path is not set as a VPI forming the VPI group accommodating backup paths. Accordingly, each node can set a VPI to be "backup reserved" as a backup resource in an autonomous and distributed manner for each link.

Figure 27:
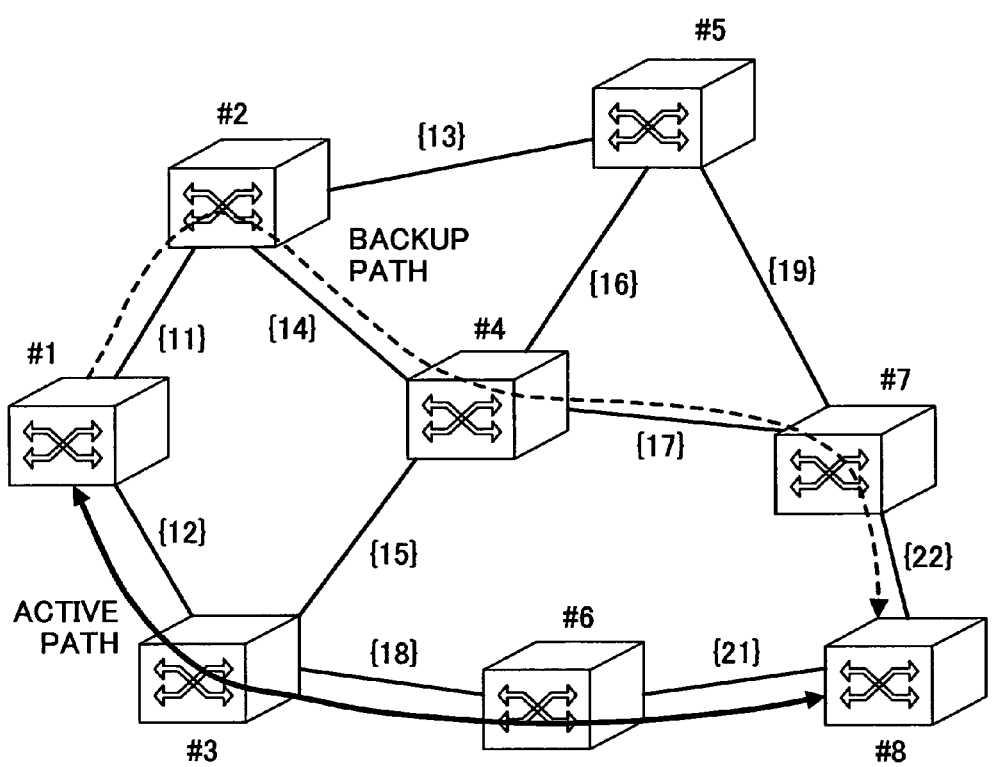
FIG. 27 is a figure showing a configuration example of a communication network to which the present embodiment is applied.

FIG. 27 shows a configuration example of a communication network to which the present embodiment is applied. Bandwidth is kept in nodes #1-#3-#6-#8 as an active path, then, the path is opened along the route. On the other hand, a bandwidth is only reserved in nodes #1-#2-#4-#7-#8 as a backup path, and actual connection setting is not performed until the active path is disconnected due to a certain failure for the active path.

For the VPI group that accommodates a backup path, risk classification number information that is assigned to the active path corresponding to the accommodated backup path is recorded. In this embodiment, {12, 18, 21} is assigned as risk classification number information that is a failure scenario of a route of the active path. At this time, risk classification number information {12, 18, 21} is attached as attribute information of the VPI group that accommodates the backup path for the active path. The risk classification number information is communicated one by one from a source-side node to a destination-side node when setting the backup path. Each node registers the risk classification number information in the ATM link management database 15 via its own signaling process part 221. As a result, the risk classification number information is associated with identification number information of the VPI group that accommodates the backup path, and is stored in each ATM link management database 15 in every node on the backup path route.

Figure 28:
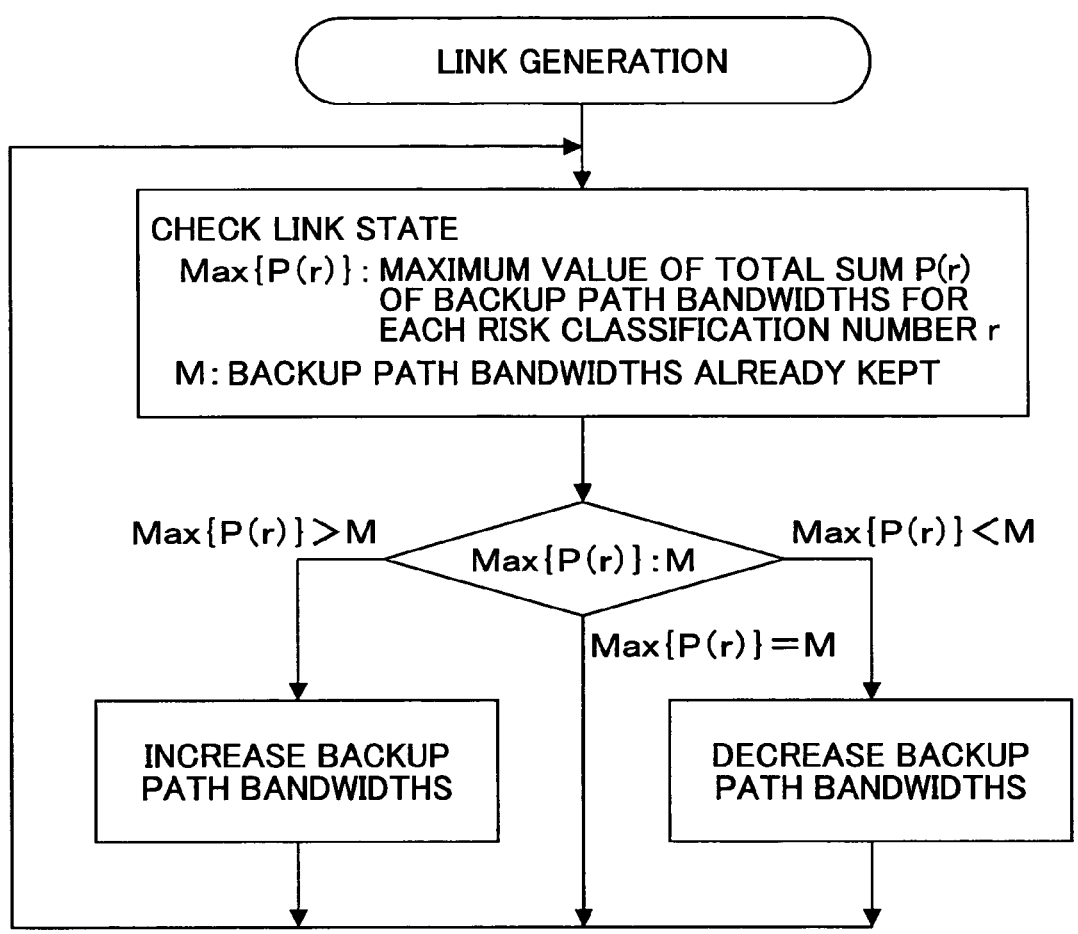
FIG. 28 is a flowchart showing a backup path setting process sequence in the backup path setting/deleting process function part 223 according to the embodiment 3-1.

FIG. 28 shows a backup path setting process sequence in the backup path setting/deleting process part 223 according to the embodiment 3-1. Assuming that a total sum of backup path bandwidths registered in a VPI group is b, a total sum of backup paths to be switched to the VPI group when a switching operation from active paths to backup paths occur is P(r) for a switching factor of a risk classification number r, and a maximum value of the sum of backup paths P(r) obtained for the risk classification number r is Max {P(r)}, the backup path setting/deleting process part 223 sends, to the signaling process part 221, a command for setting bandwidths M of backup paths forming the VPI group to be equal to or greater than Max {P(r)} and equal to or less than b. For example, if the backup path bandwidths M forming the VPI group becomes smaller than Max {P(r)}, the backup path bandwidths are increased, if the backup path bandwidths M forming the VPI group becomes larger than Max {P(r)}, the backup path bandwidths are decreased; if they are the same, no process is performed.

Accordingly, setting of the backup path is performed in consideration of the risk classification number information assigned to the active path. As to the VPI group that accommodates the backup paths, necessary backup path bandwidths can be kept while checking backup path bandwidths that form the VPI group whenever necessary.

For example, as shown in FIG. 29, it is assumed that the current backup path bandwidth M that is already kept for the VPI group is 800 Mbit/s, and that 6 backup paths A-F are set (assuming b=1000 Mbit/s). In the VPI group, there are three backup paths A, B and D to be switched to the VPI group when a single failure of a risk classification number {12} occurs, and Max {P(r)} is 800 Mbit/s when r=12. Therefore, Max {P(r)}=M, so that 100% recovery can be achieved against a failure of the risk classification number {12} in this state.

For example, in a link section #24 between nodes #2-#4 shown in FIG. 27, it is assumed that, as shown in FIG. 30, a seventh backup path X for an active optical path having risk classification numbers {12, 18, 21} will be added to the currently kept backup path bandwidth (M=800 Mbit/s) of the VPI group. In this case, since Max {P(r)} is 1000 M bit/s when r=12, the 800 M bit/s is not enough for restoring all active paths for the risk classification number {12}. Thus, as shown in a sequence of FIG. 28, the backup path bandwidth forming the VPI group is increased to 1000 M bit/s. Accordingly, 100% recovery can be realized for a single failure for the four paths that pass through a link of the risk classification number {12}.

As mentioned above, in the present embodiment, the backup path is set in consideration of risk classification number information added to the active path, so that backup path resources can be reduced as much as possible while realizing 100% recovery for a single failure. In addition, according to the backup path bandwidth necessary for a VPI group, backup path bandwidth that belongs to the VPI group can be dynamically added/deleted.

Embodiment 3-2

In this embodiment, as information stored in the channel management database 15, attribute information of failure service classes is added to the VPI group that accommodates backup paths. By providing paths having various failure service classes, path non-available rates due to multiple failures are differentiated so as to delicately serve failure service grade needs for users.

Figure 31:
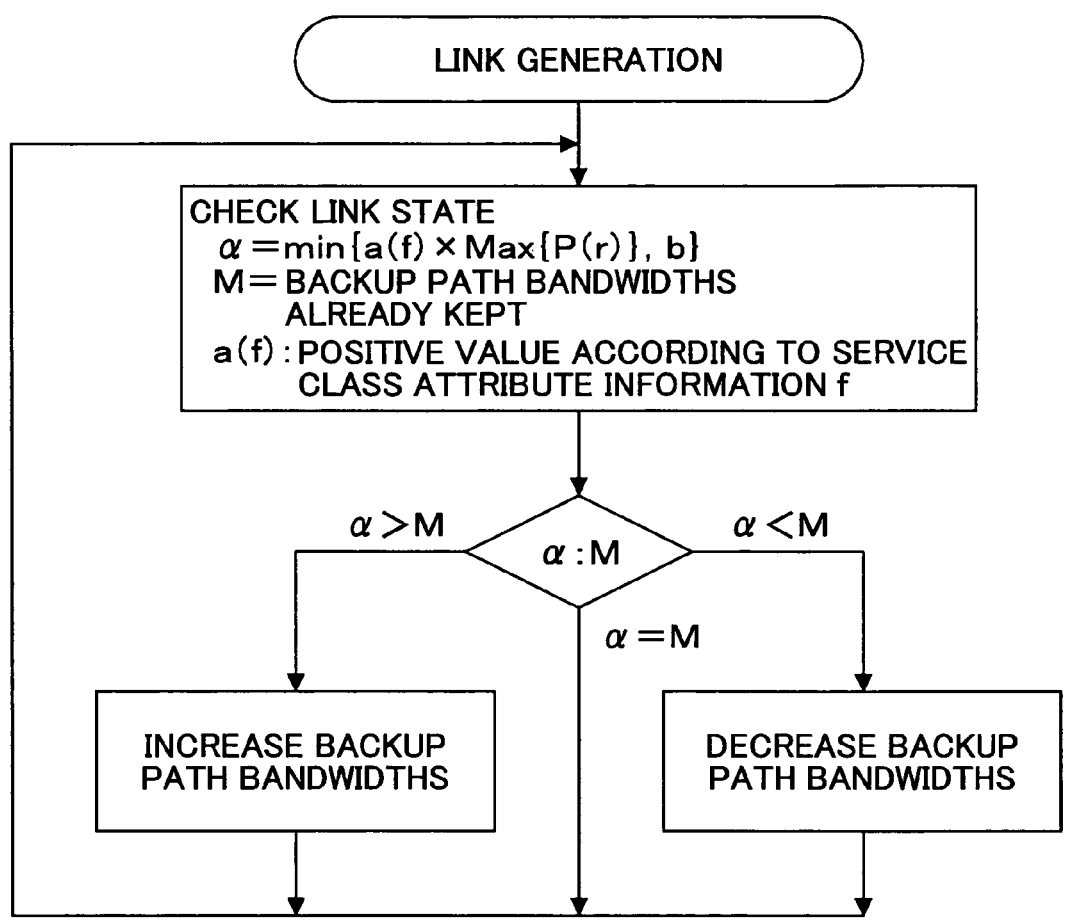
FIG. 31 is a flowchart showing a backup path setting process sequence in the backup path setting/deleting process function part 223 according to the embodiment 3-2.

FIG. 31 shows a backup path setting process sequence of the backup path setting/deleting process part 223 in the embodiment 3-2. In this embodiment, limitations are applied in processes such that only a backup optical path for an active path of a failure service class the same as (or smaller than) a failure service class held by the VPI group is accommodated in the VPI group.

Figure 32:
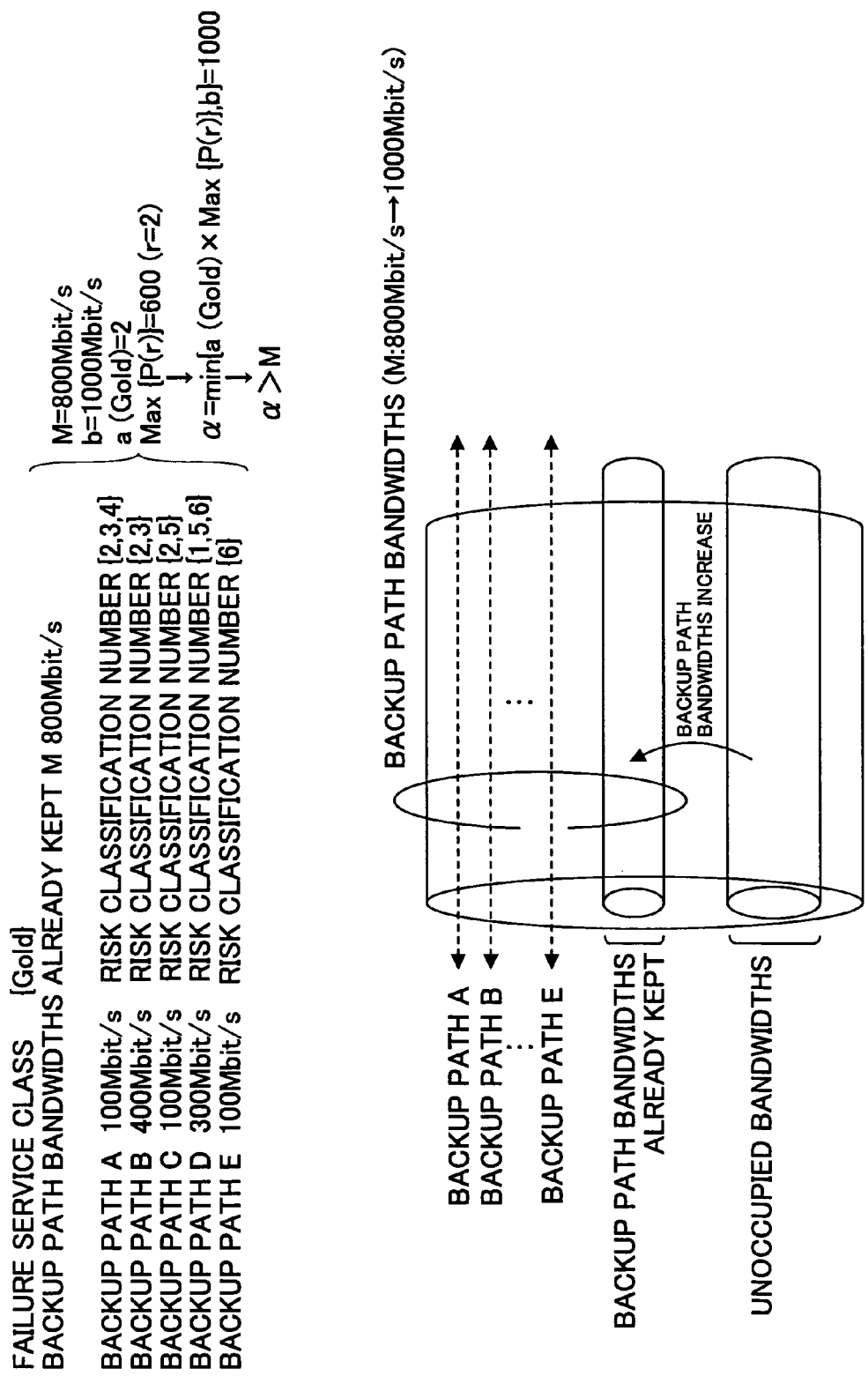
FIG. 32 is a figure for explaining an example 1 of the backup path setting process sequence according to the embodiment 3-2.

Instead of the backup path bandwidth Max {P(r)} minimally required for the VPI group, a positive value a(f) according to failure service class attribute information f is defined. Assuming that α is a backup path bandwidth necessary for a VPI group of the failure service class attribute f, min{a(f)×Max{P(r)}, b} is used as α. For example, as shown in FIG. 32, it is assumed that the backup path bandwidth M of the VPI group is 800 Mbit/s, and that five backup paths A-E are set (b=1000 Mbit/s). In the VPI group, there are three backup paths A, B and C that will be switched to the VPI group when a single failure of a risk classification number {2} occurs, so that Max{P(r)} is 600 Mbit/s when r=2. In the case of the embodiment 3-1, even if the current backup path bandwidth 800 Mbit/s is decreased by 200 Mbit/s for the three paths that pass through the link of the risk classification number {2}, 100% recovery can be realized for a single failure.

On the other hand, according to the present embodiment, assuming that a value a(f) corresponding to a failure service class attribute "Gold" is 2, min{2×600,1000}=1000 Mbit/s is used as the backup path bandwidth α minimally required for the VPI group. The necessary backup path bandwidth a does not exceed the total sum b (=1000) of the backup path bandwidths. In this case, the backup path bandwidth of 800 Mbit/s is not enough for restoring the active paths of the risk classification number {2} with the failure service class "Gold". Thus, as shown in the sequence shown in FIG. 31, the backup path bandwidth forming the VPI group is increased to 1000 Mbit/s. Accordingly, shared restoration for the failure service class "Gold" can be realized. That is, even if failures occur for a larger number of active paths, the probability of recovery becomes high for active paths to which a high failure service class is set, so that the path non-available rate due to multiple failures can be decreased.

Figure 33:
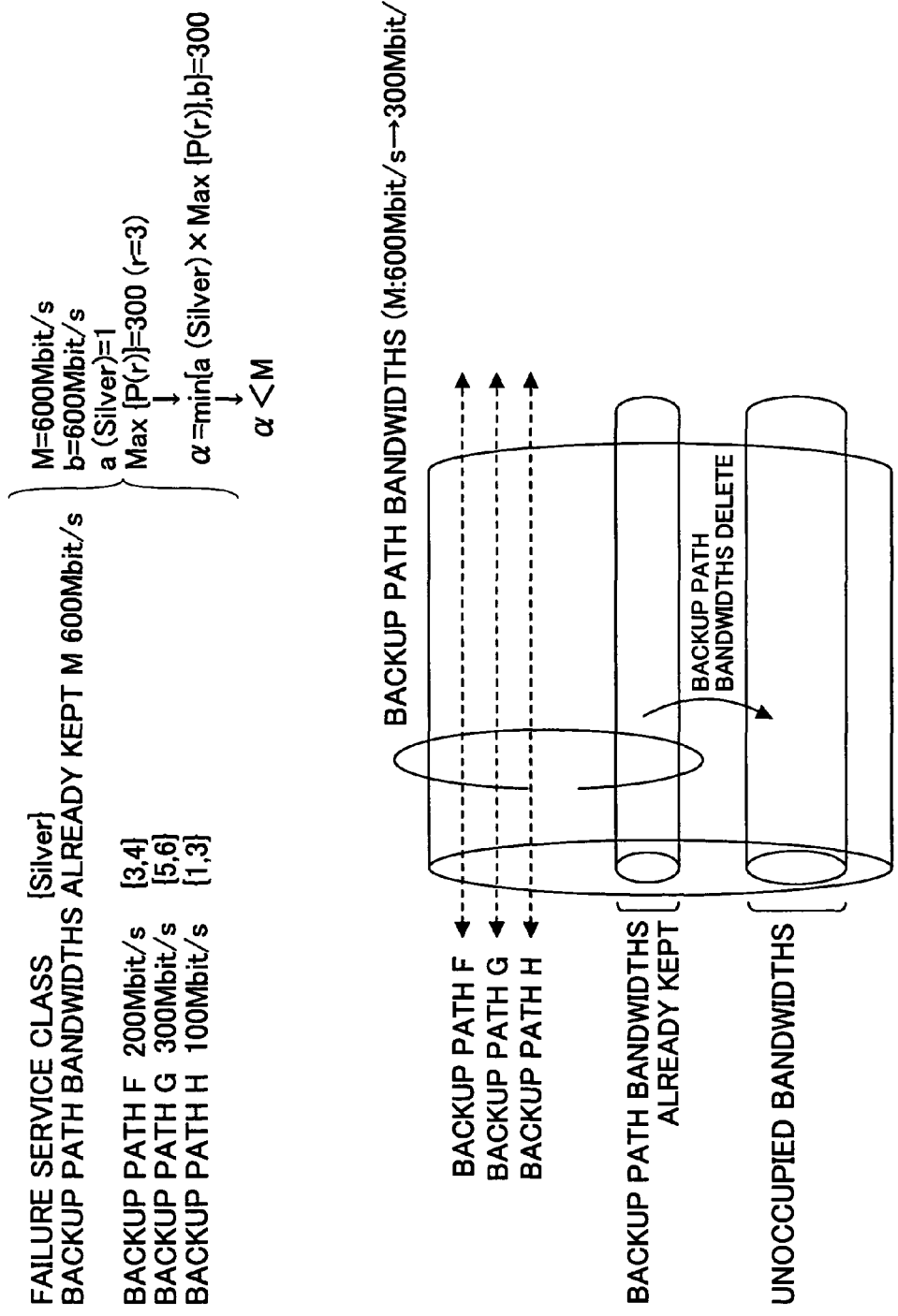
FIG. 33 is a figure for explaining an example 2 of the backup path setting process sequence according to the embodiment 3-2.

In addition, as shown in FIG. 33, assuming that the backup path bandwidth M of the VPI group is 600 Mbit/s, and that three backup paths F-H are set (B=600 Mbit/s). In the VPI group, there are two backup paths F and H that will be switched to the VPI group when a single failure of a risk classification number {3} occurs, so that Max{P(r)} is 300 Mbit/s when r=3. On the other hand, assuming that a value a(f) corresponding to a failure service class attribute "Silver" is 1, a number a of channels minimally required for the VPI group becomes min{1×300, 600}=300. Therefore, as shown in a sequence of FIG. 31, even if the backup path bandwidth of the VPI group is decreased from the current 600 Mbit/s to 300 Mbit/s, shared restoration can be realized for the failure service class "Silver".

Although VP of ATM is taken as an example in the abovementioned descriptions in the embodiments, the present invention can be also applied to failure recovery for a Label Switched Path of a Multi Protocol Label Switch router defined by a similar concept.

As described above, according to the invention of the embodiments 3-1—3-2, automatization of backup path setting can be performed. In addition to that, reliable failure recovery for a single link failure can be realized while minimizing an amount of facilities for backup paths, and occurrence rates of an idle state against multiple link failures can be differentiated according to service grades provided to users.

Embodiments 4-1—4-4

In the M:N shared restoration method, to prevent service interruption as much as possible, it is necessary to quickly perform recovery of disconnection of an active optical path due to occurrence of a failure in a network. In the embodiments 4-1—4-4, technologies for performing recovery quickly are described.

In the M:N shared restoration method, M backup optical channels are defined for each link section, and N active optical paths share the backup optical channel resources as own backup resources. Actually, until switching is performed after a failure occurs, a database that manages resources of M backup optical channels is in a state in which only identification number information of active optical paths that use the M backup optical channel resources as backup optical path resources is registered. That is, until an active path is switched to a backup optical path after a failure occurs, an optical channel that accommodates the backup optical path is not determined.

In an optical communication network of an autonomous and distributed type, for realizing high-speed recovery based on the M:N shared restoration method, it is necessary to speed up activation of the backup optical path associated with occurrence of a failure.

However, in the M:N shared restoration method, since channels (wavelength channel in the case of an optical network) in each link section are not determined until a failure occurs, following problems arise.

Figure 34:
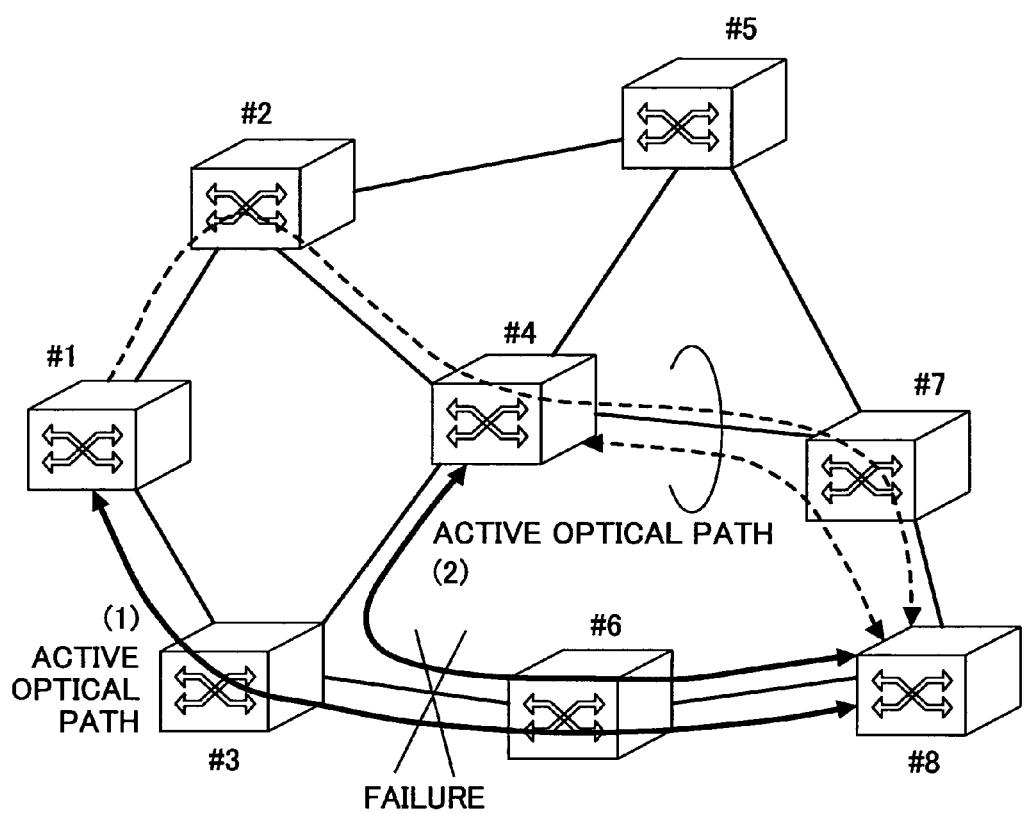
FIG. 34 is a figure for showing a configuration example of a network.
Figure 35:
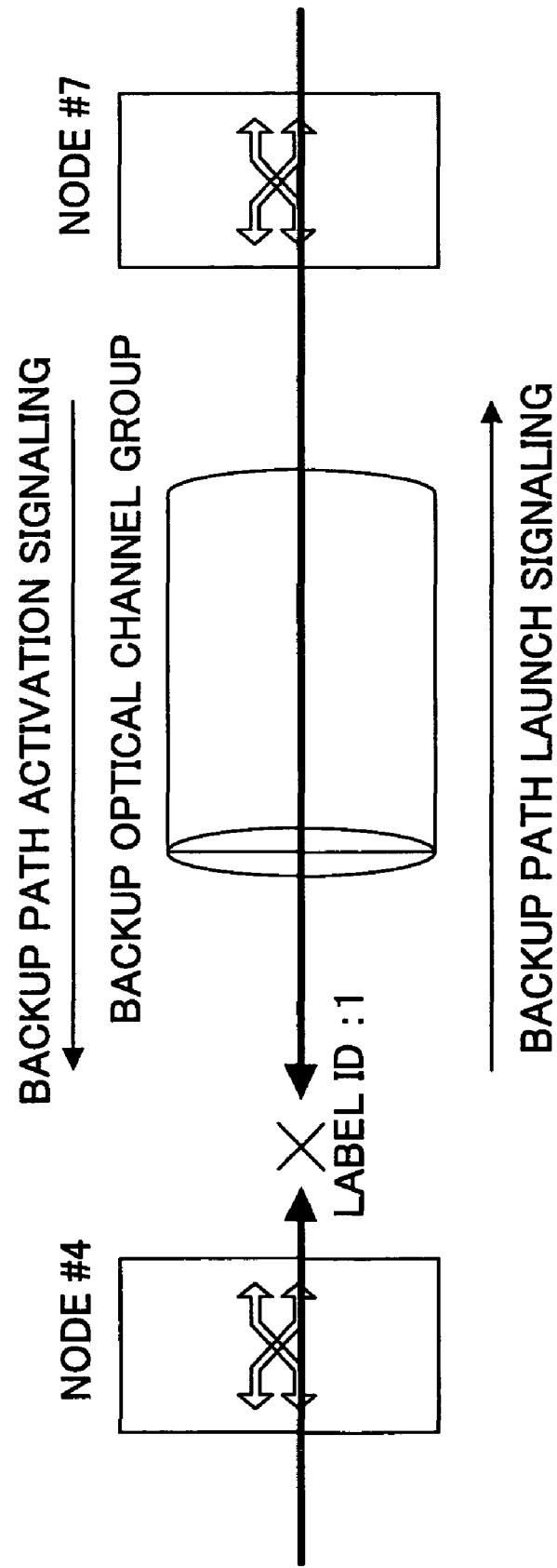
FIG. 35 is a figure for showing an example of conflict.

For example, as shown in FIG. 34, under circumstances where a bandwidth is kept in nodes #1-#3-#6-#8 as an active path (1) and a bandwidth is kept in nodes #4-#3-#6-#8 as an active path (2), when link disconnection between nodes #3-#6 occurs, switching operations for the active optical paths (1) and (2) that pass through the link section occur. Here, assumed that a switching signaling for the active optical path (1) occurs in nodes #1-#2-#4-#7-#8, and a switching signaling for the active optical path (2) occurs in nodes #8-#7-#4. In this case, as shown in FIG. 35, between nodes #4-#7, a scramble for the same optical channel by switching signaling from both sides of the source-side node and the destination-side node occurs with a probability of 1/2. This similarly occurs for nodes #7-#8. When such collision occurs, a process for resetting an optical channel between the two nodes becomes necessary by collision avoiding processes, so as to inhibit realization of high-speed switching. Technologies for solving this problem are described in each of following embodiments.

Embodiment 4-1

High-speed Path Switching Method

Figure 36:
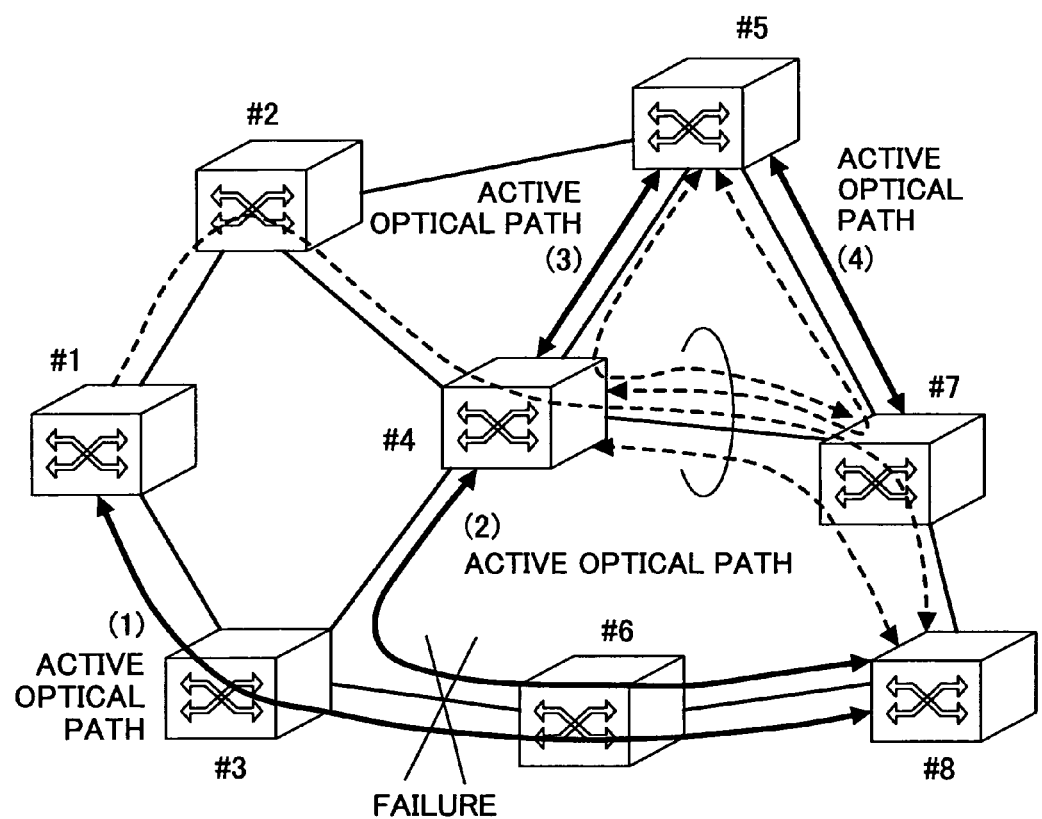
FIG. 36 is a figure showing a configuration example of an optical communication network to which a high-speed path switching method is applied.

FIG. 36 shows a configuration example of an optical communication network to which the high-speed path switching method of the present embodiment is applied. An active optical path (1) keeps a bandwidth in nodes #1-#3-#6-#8, an active optical path (2) keeps a bandwidth in nodes #4-#3-#6-#8, an active optical path (3) keeps a bandwidth in nodes #4-#5, and an active optical path (4) keeps a bandwidth in nodes #5-#7. At this time, when link disconnection occurs between nodes #3-#6, switching operation occurs in active optical paths (1) and (2) that pass through the link section. At this time, assumed that a switching signaling for the active optical path (1) occurs in nodes #1-#2-#4-#7-#8, and that a switching signaling for the active optical path (2) occurs in nodes #8-#7-#4.

On the other hand, in a link between nodes #4-#7, optical channels of 32 waves are defined in which an optical channel group kept for backup optical path setting has 2 waves. In the optical channel group, backup optical paths are registered for four active optical paths (1)-(4) in total. That is, the optical channel group supports a 2:4 shared restoration method.

Figure 37:
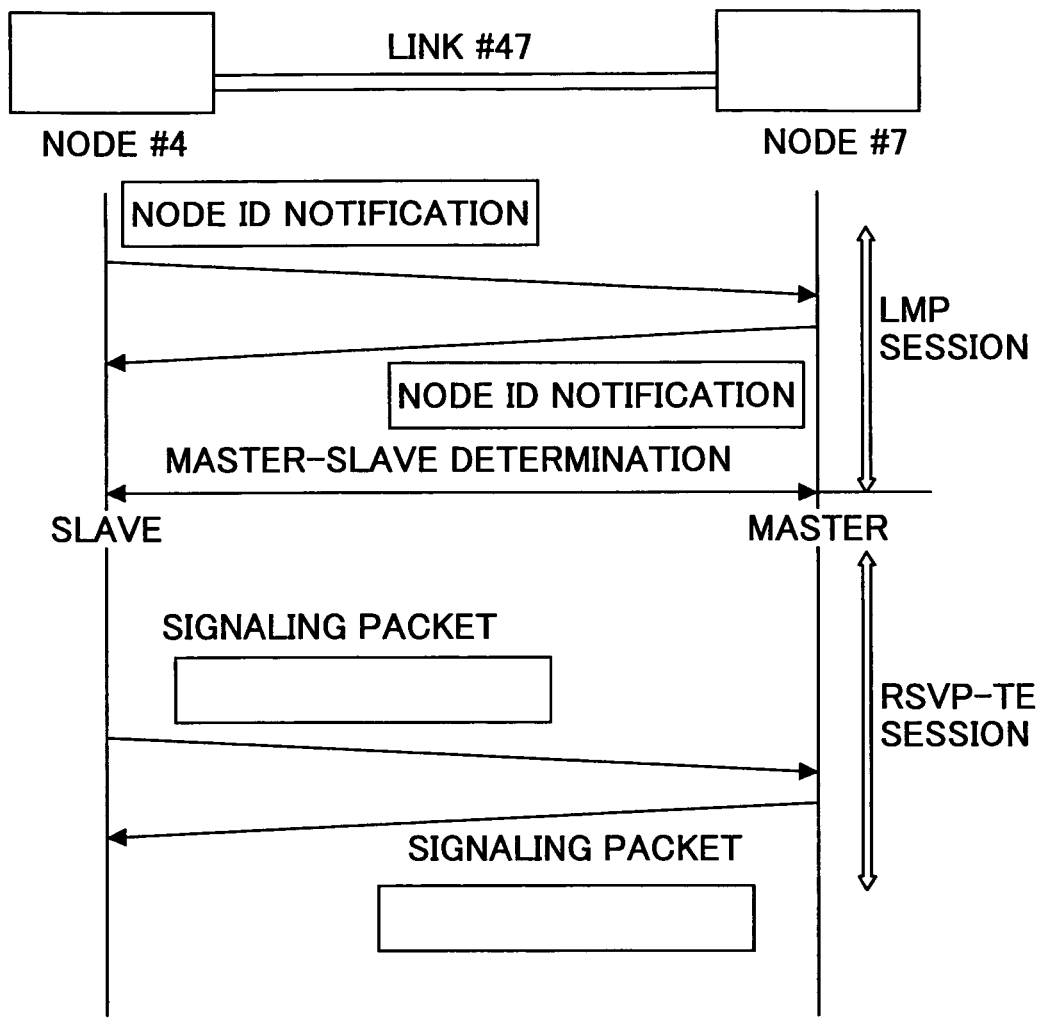
FIG. 37 is a figure showing a signaling sequence in the high-speed path switching method in an embodiment 4-1.

FIG. 37 shows a signaling sequence in the high-speed path switching method of the present embodiment. Here, the node #4 and the node #7 that are adjacent to each other share roles of a master node and a slave node as a result of communications using the OSPF or LMP protocol. In the present embodiment, a node having a larger node identification number between the two nodes is determined to be the master node and a node having a smaller node identification number is determined to be a slave node. Or, the reverse order may apply. For a signaling sequence, the RSVP-TE protocol is used.

Figure 38:
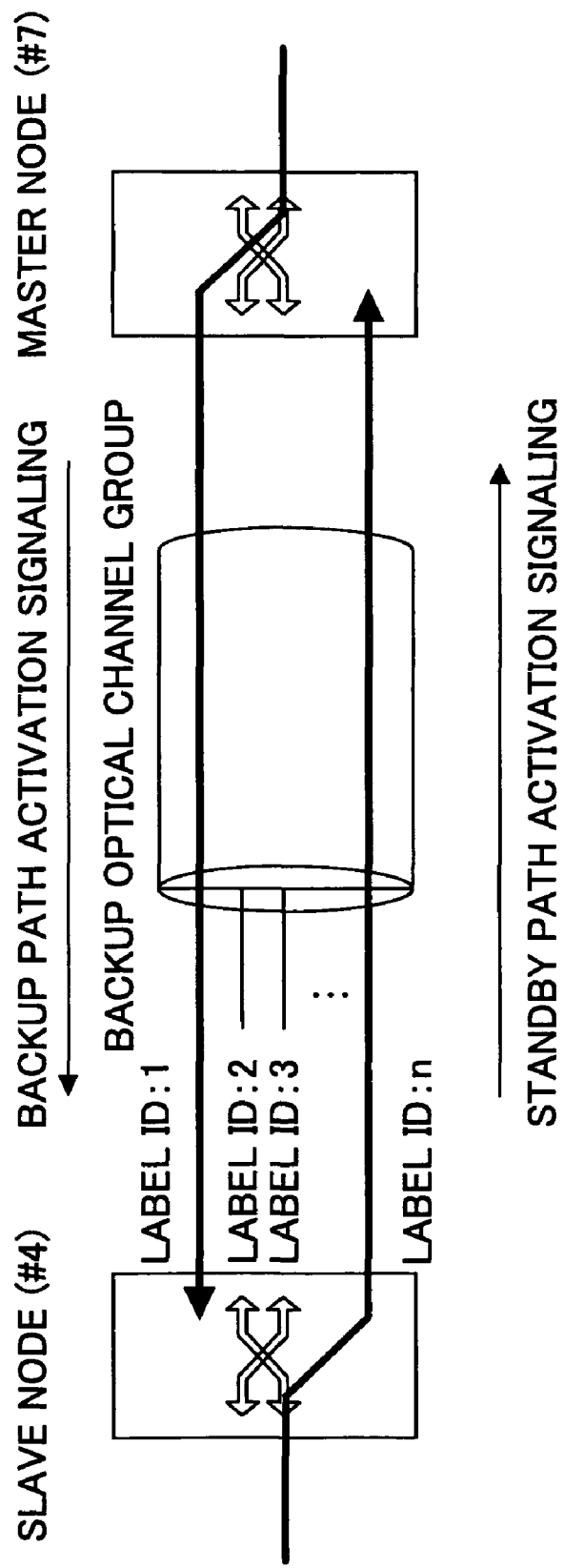
FIG. 38 is a figure showing a conflict control example in the high-speed path switching method in an embodiment 4-1.

Here, assumed that a backup optical path activation message associated with a failure is input to each of the nodes #4 and #7. At this time, if any process is not performed, contention for a same optical channel occurs with a predetermined probability. Thus, as shown in FIG. 38, when the backup optical path activation message is sent from the master node (#7) to the slave node (#4), an optical channel that has a smaller (or larger) identification number is activated. On the other hand, when the backup optical path activation message is sent from the slave node (#4) to the master node (#7), an optical channel that has a larger (or smaller) identification number is activated. Accordingly, even when backup optical path activation messages are sent in reverse directions to each other, backup optical paths can be activated quickly while preventing occurrence of contention.

When the backup optical path activation message is sent from the master node (#7) to the slave node (#4) one after another, an optical channel that has a smaller (or larger) identification number is activated one after another in the order of arrival of the message. On the other hand, when the backup optical path activation message is sent from the slave node (#4) to the master node (#7) one after another, an optical channel that has a larger (or smaller) identification number is activated one after another in the order of arrival of the message. Accordingly, even when backup optical path activation messages are sent in reverse directions to each other one after another, backup optical paths can be activated quickly while preventing occurrence of contention.

Embodiment 4-2

Path Switching Apparatus

Figure 39:
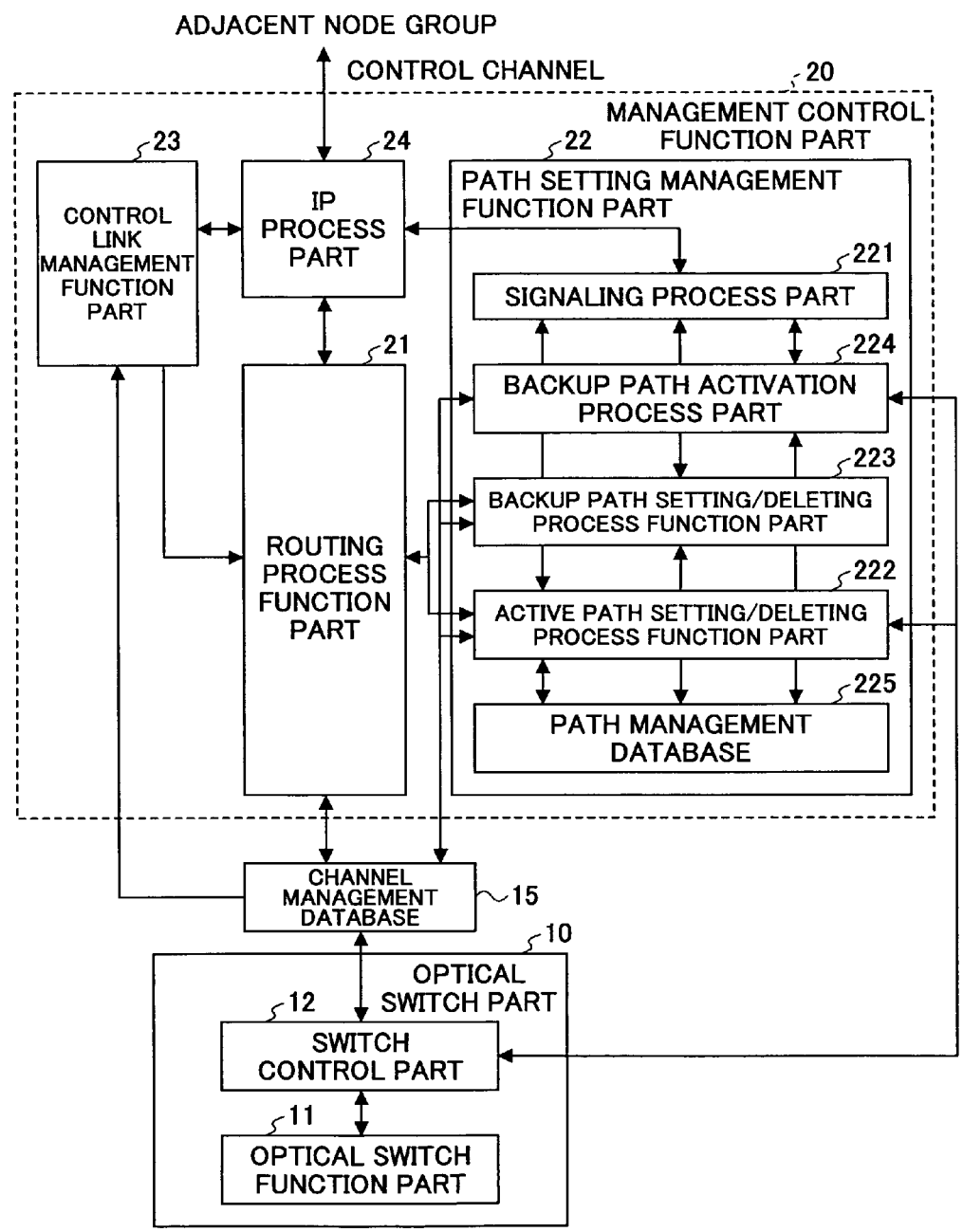
FIG. 39 is a figure showing a path switching apparatus of an embodiment 4-2.

FIG. 39 is a block diagram of the path switching apparatus of this embodiment. This configuration is the same as that of the path switching apparatus described in the embodiment 1-5. This embodiment is different from the embodiment 1-5 in that the backup optical path activation process part 224 and the like activate backup optical paths using the method described in the embodiment 4-1.

Embodiment 4-3

Path Switching Apparatus

Figure 40:
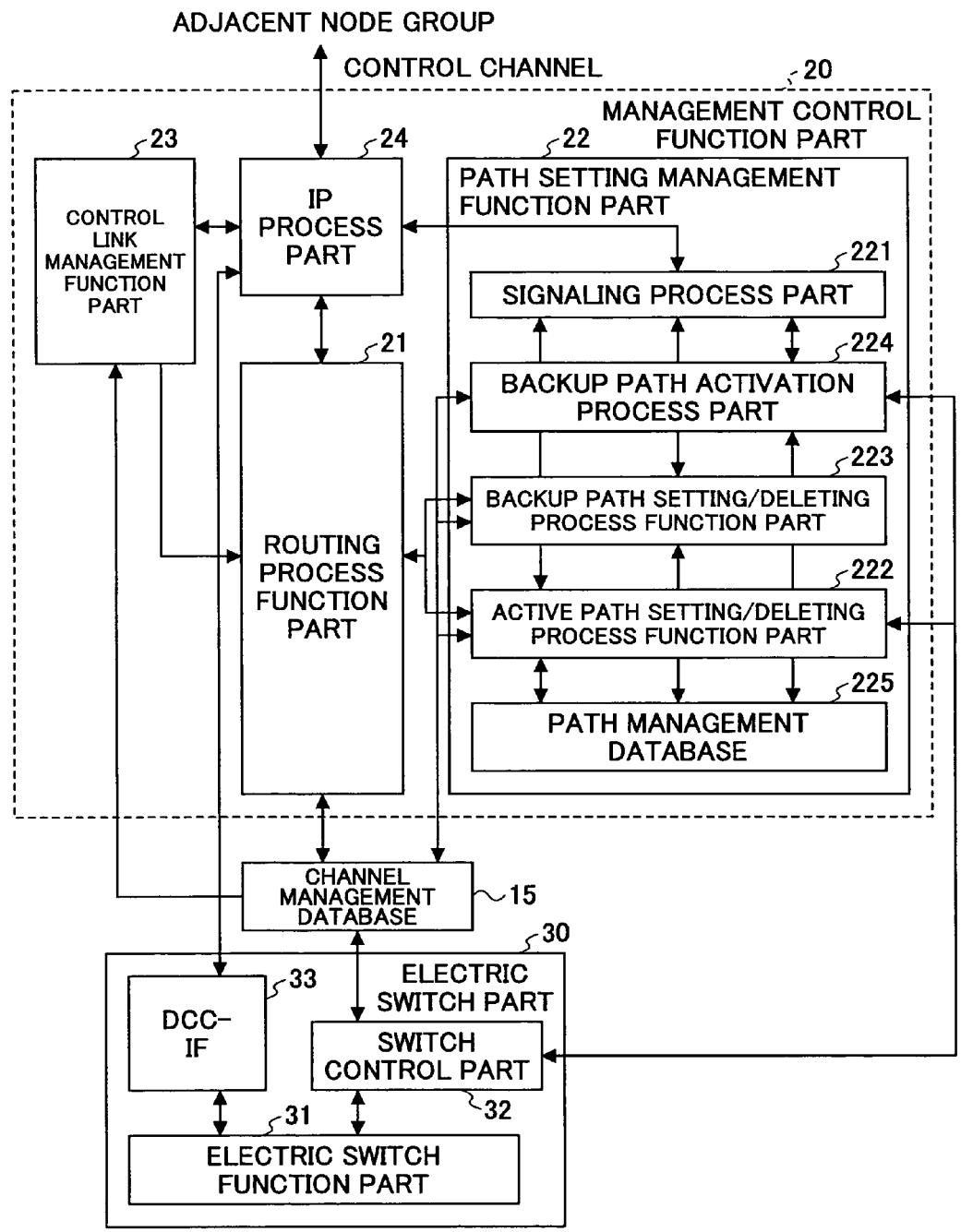
FIG. 40 is a figure showing a path switching apparatus of an embodiment 4-3.

FIG. 40 is a block diagram of the path switching apparatus of the present embodiment. The path switching apparatus of this embodiment includes an electrical switch part 30 instead of the optical switch part 10 of the embodiment 4-2. The electrical switch part 30 includes an electrical switch function part 31, a switch control part 32 for controlling the electrical switch function part 31, and a digital cross-connect interface (DCC-IF) 33 for exchanging a control signal with the management control function part 20, and realizes a digital cross-connection for 32×32 SONET OC-48 links.

The control link is formed by using the DCC channel of the SONET OC-48. The control signals are, for example, an OSPF/IS-IS protocol packet for obtaining a network topology, a RSVP-TE/CR-LDR protocol packet for setting/releasing a path set between packet switches, and a LMP protocol packet for performing failure monitoring of each fiber link.

The configuration of the management control function part 20 is the same as that of the embodiment 4-2. In this embodiment, the VC-4 (155 Mbit/s) defined in SONET instead of the optical channel is managed and controlled.

Embodiment 4-4

Path Switching Apparatus

Figure 41:
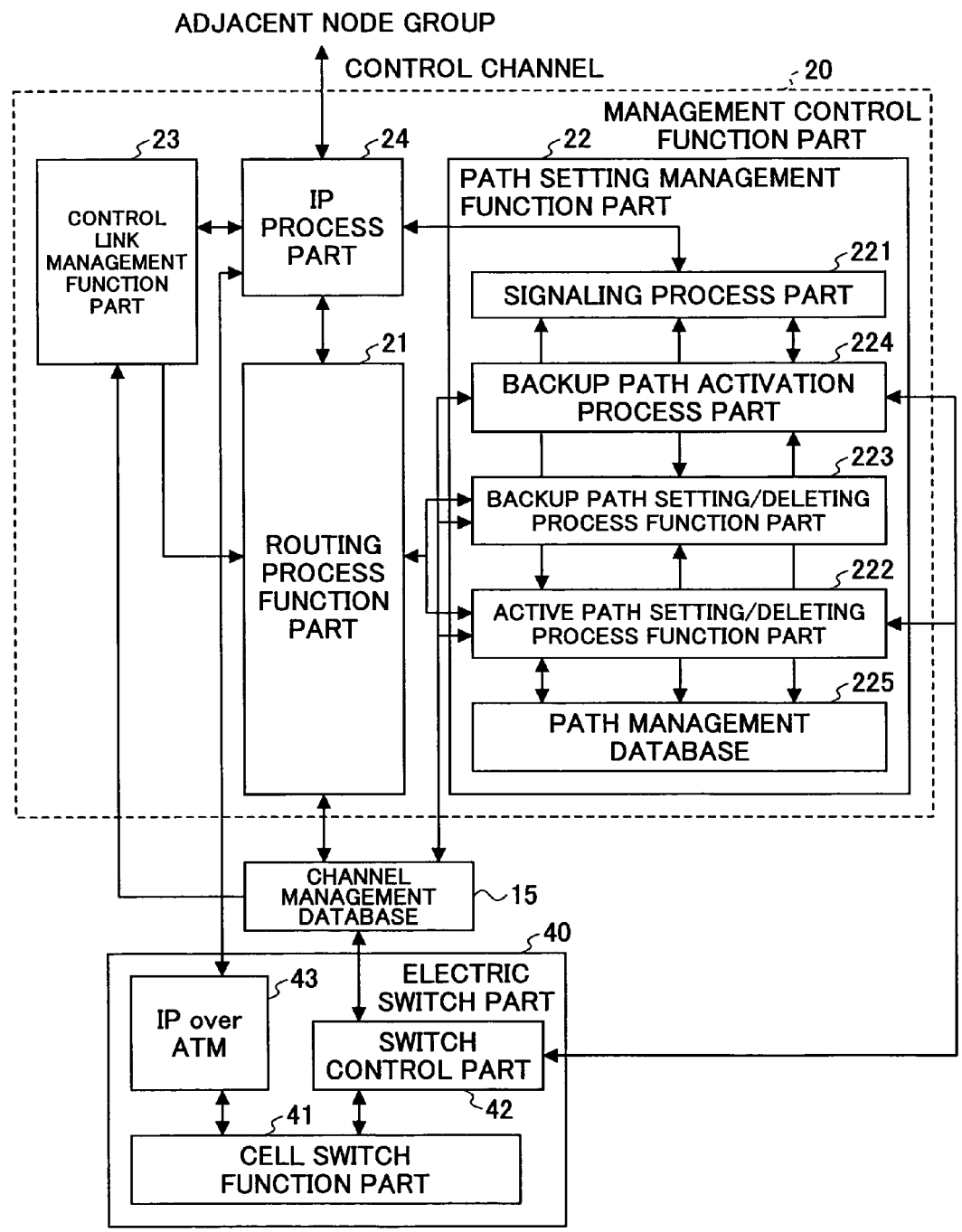
FIG. 41 is a figure showing a path switching apparatus of an embodiment 4-4.

FIG. 41 is a block diagram of a path switching apparatus in this embodiment. The path switching apparatus of this embodiment includes an electrical switch part 40 instead of the optical switch part 10 of the embodiment 4-2. The electrical switch part 40 includes a cell switch function part 41, a switch control part 42 for controlling the cell switch function part 41, and a control signal interface (IP over ATM) 43 for exchanging a control signal with the management control function part 20, and can accommodate 32 input/output SONET OC-48 links, and realizes cell switching among them.

The control link is formed by using a common signaling network of a communication carrier. The control signals are, for example, an OSPF/IS-IS protocol packet for obtaining a network topology, a RSVP-TE/CR-LDR protocol packet for setting/releasing a path set between packet switches, and a LMP protocol packet for performing failure monitoring of each fiber link.

The configuration of the management control function part 20 is the same as that of the embodiment 4-2. In this embodiment, instead of the optical channel, the management control function part 20 manages and controls VPIs defined between ATM switches. The VPI defined for each link between nodes corresponds to a channel that accommodates an optical path or an electrical path. That is, as shown in the figure, to correlates VPIs between input and output in each node apparatus corresponds to cross-connection operation for optical paths or electrical paths.

This embodiment can be applied to a label switch router that can provide a virtual path for IP packet traffic by using layer 2.5 MPLS technology, and in the same way, applied to an Ether over MPLS switch that can provide a virtual path for an Ether frame.

As mentioned above, according to the high-speed path switching method and the path switching apparatus of the embodiments 4-1—4-4, a state in which contention for the same optical path caused by switch signaling in reverse directions to each other can be avoided in a distributed control communication network that adopts a M:N shared restoration method, so that backup optical paths can be activated quickly.

Embodiments 5-1, 5-2

Next, technologies for performing failure switching with a backup path having a long route length is described in the pre-assign restoration method.

In the pre-assign restoration method, as to an active path and a backup path defined for transferring one path trunk, routes for the active path and the backup path are selected such that the routes are different from each other except for a source node and a destination node. Further, bandwidth reservation is performed beforehand for the route of the backup path before a failure of the active path occurs, and the backup path bandwidth is shared with a backup path defined to recover other active paths.

For example, in FIGS. 42A and B, nodes #1-#2, nodes #2-#3, nodes #1-#4, nodes #2-#5, nodes #3-#6, nodes #4-#5 and nodes #5-#6, respectively are connected by links of risk classification numbers {11}, {12}, {13}, {14}, {15}, {16} and {17}. Assuming that, when an active optical path A between nodes #1-#2-#3-#6 passes through a link of risk classification numbers {11, 12, 15}, a backup optical path A for the active optical path A is set on a route passing through links of risk classification numbers {13, 16, 17} when an active optical path B between nodes #2-#3 passes through a link of a risk classification number {12}, a backup optical path B of active optical path B is set in a route passing through links of risk classification numbers {14, 17, 15} and that when an active optical path C between nodes #2-#5 passes through a link of a risk classification number {14}, a backup optical path C of the active optical path C is set in a route passing through links of risk classification numbers {12, 15, 17}.

Here, in bandwidth sharing for backup optical paths, a backup optical channel is shared such that a single failure of any one of links of risk classification numbers {11}, {12}, {14} and {15} that the active optical path passes through does not hinder recovery. As described so far, in the restoration method, since a maximum number of active optical paths that pass through the link of the risk classification number {12} is 2, it is adequate if the paths can be switched to backup optical paths when the failure of the link occurs, so that two is adequate for the number of the backup optical channels. The restoration method enables a network facility amount for accommodating backup paths to be largely decreased by making the most of it.

By the way, when switching an active path to a backup path, it is necessary to quickly switch the failed active path to the backup path while performing physical cross-connection setting (switching process) with reliability in nodes on the backup path route. There are three failure notification methods as shown in FIGS. 43A, B and C at that time.

Figure 43A:
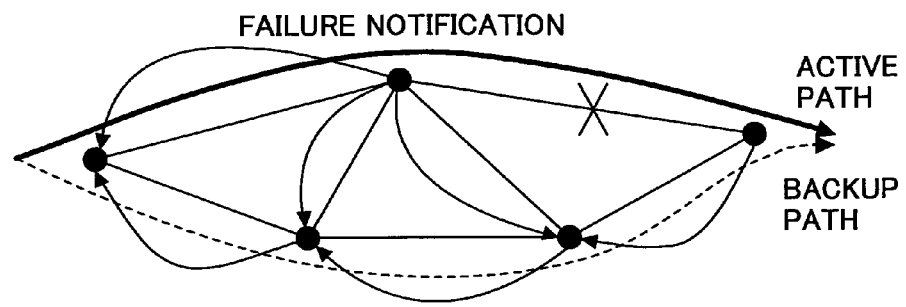
FIGS. 43A, B and C are figures showing conventional failure notification methods.

As shown in FIG. 43A, a first method is a method for flooding the whole network with the failure notification from a node of a failure detected point. There are many cases where the failure notification can be sent to each node on a backup path from the node of the failure detected point in the shortest route, so that realization of a quick failure switching operation can be expected. However, this method assumes that the failure notification is sent to the whole network when the failure occurs, so that the failure notification needs to be transferred to nodes for which actual failure switching operation is unnecessary. For this reason and the like, the method includes an inefficient aspect.

Figure 43B:
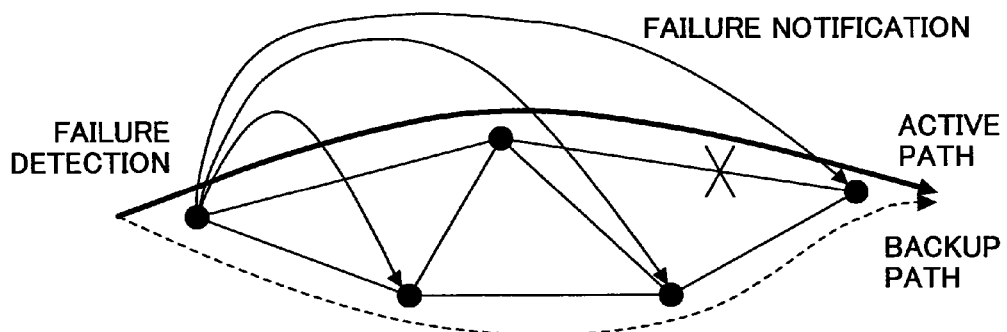

As shown in FIG. 43B, a second method is a method for notifying a switching point node of the active path-backup path of a failure occurrence from a node of the failure detected point (the nodes are the same in the figure), and multicasting the failure notification from the switching point node to each node on the backup path. According to this method, it is also assumed that each channel of each link to which the backup path is to be assigned is determined beforehand.

Figure 43C:
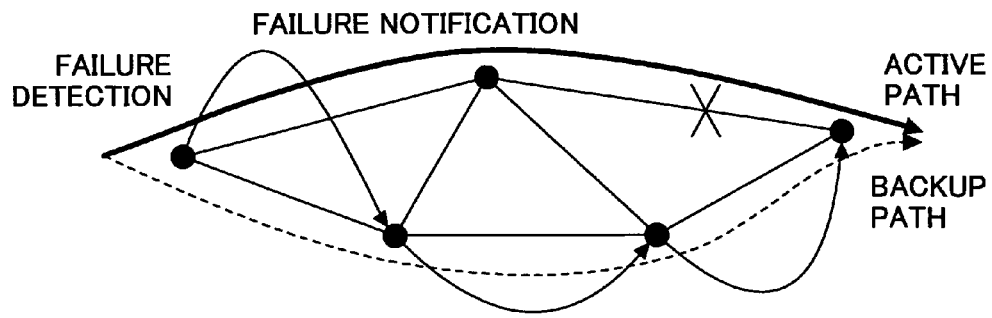

As shown in FIG. 43C, a third method is a method for notifying a switching point node of the active path-backup path of a failure occurrence from a node of the failure detected point (the nodes are the same in the figure), and transferring the failure notification from the switching point node to each node on the backup path in an order of the route.

In the third method, the failure recovery operation is prone to become slow compared with the first method since the failure occurrence needs to be sent from the failure detected point to the switching point node. However, as to failure detection of a SDH path or an optical path, it is not necessarily limited to a node adjacent to the failure occurrence point, so that the detection can be performed at the switching point to the backup path. Especially, in a case of the SDH path, there is a function for sending an alarm indication signal (AIS) to destination-side nodes when a failure occurs, and also in a case of the optical path, a failure can be detected by the same function or power interruption of an optical path signal itself. Therefore, as to failure recovery for the SDH path and the optical path, switching to the backup path can be performed at a relatively high speed even by the third method.

In addition, compared with the second method, according to the third method, as to channels to which the backup path is assigned in each link, since the channels can be determined in an order from a source-side node to a destination-side node (or the reverse direction) while transferring the failure notification, a flexible operation can be realized.

By the way, in the case where failure switching from the active path to the backup path is performed after performing the failure notification of the third method, there are circumstances that a predetermined delay cannot help occurring. That is caused by a fact that setting of a backup path in a cross-connect apparatus is merely a "reservation" for a switching destination channel and that the backup path is not physically connected. That is, it is necessary to transfer the failure notification associated with occurrence of a failure along a route of a backup path reserved beforehand node by node, and to actually perform connection setting of the backup path in each node, so that time for doing this operation is necessary. More particularly, the time is a cumulative sum of (1) a transmission delay of the failure notification in the backup path that is determined by transmission speed of an optical signal, and (2) a transferring delay of the failure notification in each node. The former delay is accumulated in a ratio of 5 milliseconds per 1000 km, and the latter delay is accumulated about 1-10 milliseconds per 1 node. Therefore, for example, in the restoration method that requires failure recovery within 50 milliseconds, it becomes difficult in effect to make settings such that a route of a backup path includes no less than several nodes, which causes the network scale to be limited. From a viewpoint of this, embodiments on technology to perform switching quickly are described in the following.

Embodiment 5-1

High-speed Path Switching Method

Figure 44A:
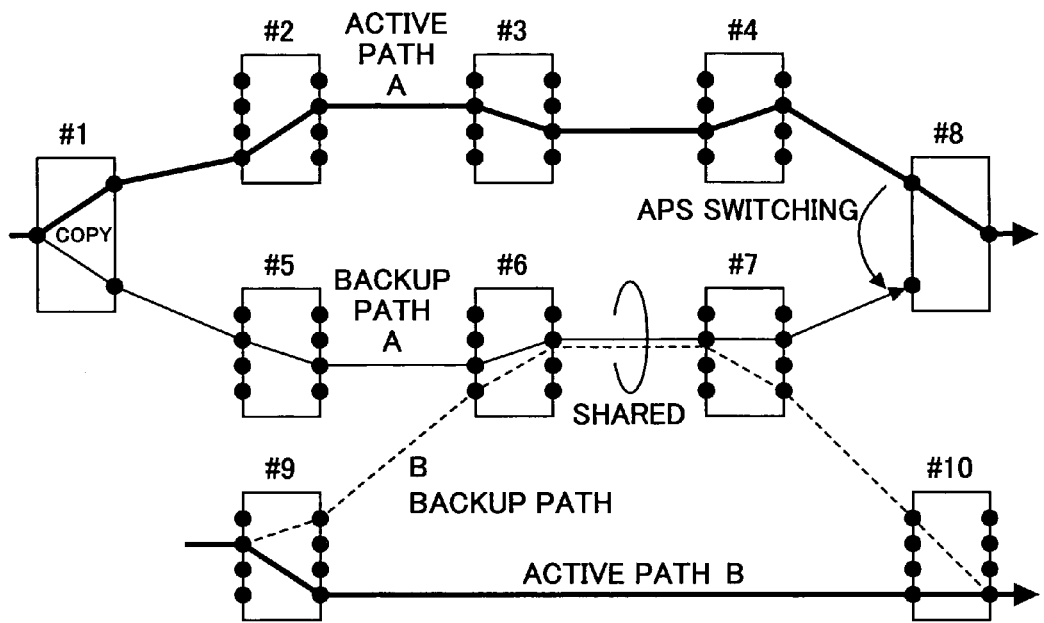
FIGS. 44A and B are figures for explaining a high-speed path switching method of an embodiment 5-1.

FIGS. 44A and B are figures for describing the high-speed path switching method of this embodiment. In FIG. 44A, assuming that an active path A is set between nodes #1-#2-#3-#4-#8, a backup path A is set between nodes #1-#5-#6-#7-#8, an active path B is set between nodes #9-#10, and a backup path B is set between nodes #9-#6-#7-#10.

In this embodiment, as to the backup path A for which a large delay (for example, equal to or greater than 20 milliseconds) is expected in the switching process in transferring the failure notification, physical connections are established in each node on a route of the backup path A as shown in FIG. 44A (shown by solid lines in the figure). Such a backup path is called "hot state backup path". On the other hand, physical connections are not performed in each node on the route of the backup path B, so that backup path bandwidth is only reserved (shown as dotted lines in the figure).

The hot state backup path is set when a route length exceeds a predetermined length or when a number of passing nodes exceeds a predetermined number. In a source node #1 of the backup path A, the same data (only a payload part of a SDH frame in the SDH transmission system) as one in the active path A is copied, and the data are transferred to a destination node #8. When a failure occurs in the active path A, the active path A is switched to the backup path A by APS (Automatic Protection Switching) in the destination node #8. At this time, since connectivity of the backup path A is ensured between the source and the destination along the backup path, the switching from the active path A to the backup path A can be performed quickly and independent of the backup path route length by only performing a switching process in the destination node when a failure occurs in the active path A. This applies to a reverse direction path in which the node #8 is a source and the node #1 is a destination.

Figure 45:
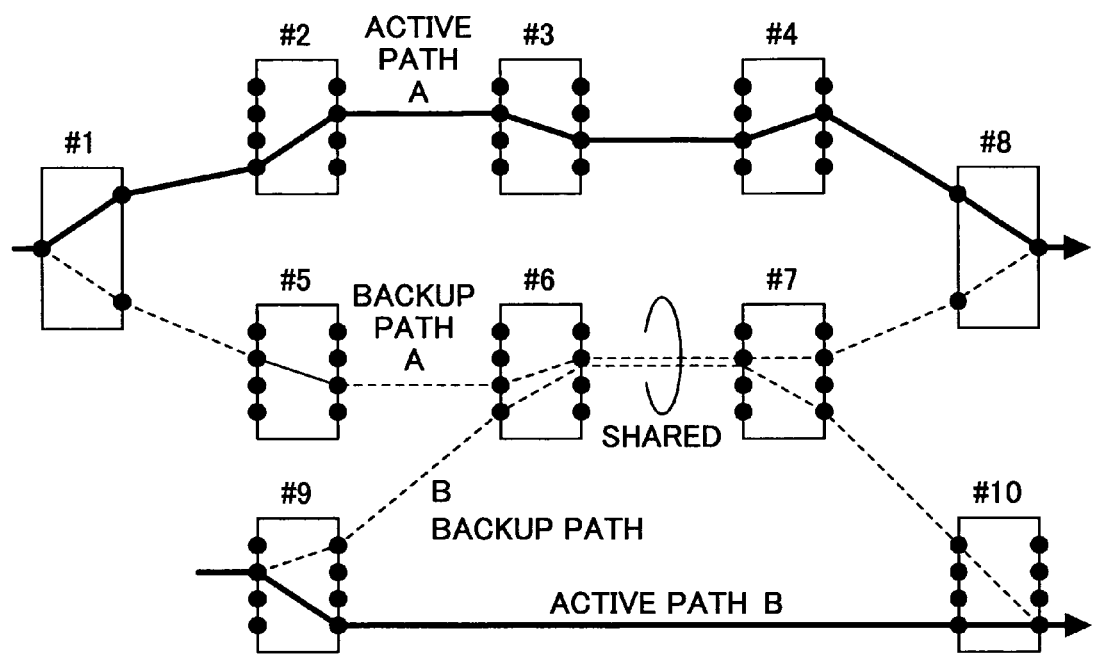
FIG. 45 is a figure showing an example of a conventional path switching method.

In a regular restoration method, as shown in FIG. 45, as to the backup path A from a source node #1 to a destination node #8 and the backup path B from a source node #9 to a destination node #10, a backup path bandwidth is only reserved, and physical connections are not performed in each node on the route until a failure switching occurs. Therefore, the backup path A and the backup path B share bandwidth between nodes #6-#7, and are treated equally.

On the other hand, the present embodiment allows bandwidth allocated to the hot state backup path to be released as means for restoring another active path. That is, when the backup path B is set between nodes #6-#7, a sharing effect of a backup band can be obtained in the same way as the conventional pre-assign restoration method in that the bandwidth between the nodes #6-#7 is shared by the backup path A and the backup path B. A concrete example is described below.

In the conventional 1+1 protection method, since the same data are transmitted in the active path and in the backup path, the conventional 1+1 protection method is the same as the hot state backup path of this embodiment in that failure switching for the active path can be supported by APS switching at an end node. But, the conventional 1+1 protection method is different from the present invention in that, since both the active path and the backup path are used as "active" in effect, bandwidth that is allocated to the backup path cannot be shared with other backup paths.

In addition, as to the conventional M:N protection method, copied data of the active path are not transmitted over the backup path, and bandwidth allocated to the backup path is shared by plural backup paths for restoring plural active paths. These active paths are assumed to be established between the same start and end nodes. Thus, it is not assumed to share bandwidth between arbitrary sections of the backup path as in the present embodiment.

Figure 44B:
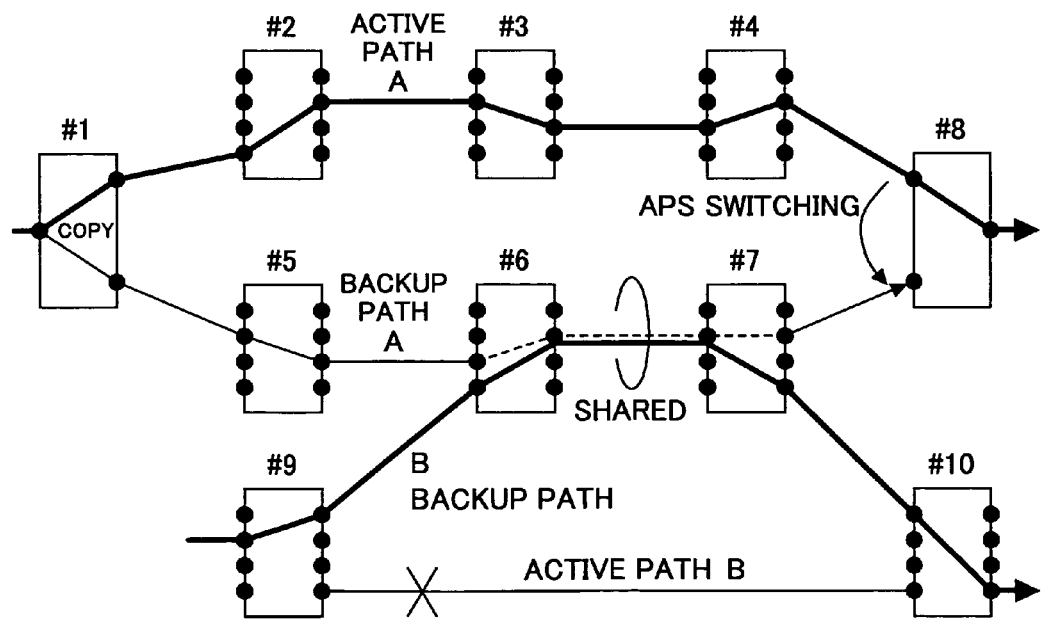

Next, an operation example of the path switching method of the present invention is provided with reference to FIGS. 44A and 44B. First, as shown in FIG. 44A, in a default state in which active paths A and B and backup paths A and B are set, the backup path A having long route length is set as the hot state backup path that is physically connected. On the other hand, as to the backup path B, a bandwidth is only reserved and the path is not physically connected. Here, between nodes #6 and #7, the backup paths A and B share the same optical channel, but only the backup path A is actually connected between the nodes #6 and #7.

If a failure occurs in the active path A in this state, as shown in FIG. 44A, switching from the active path A to the backup path A is performed by APS switching. At this time, switching from the active path A to the backup path A ends, so that the backup path A can be used as an active path. At this time, information indicating that the backup path A has been switched to an active path is sent from the start node #1 of the active path A to each node on the route of the backup path A in an order of the nodes on the route. This method is the same as the conventional failure notification method shown in FIG. 43C. But, since failure switching has already been ended, transfer delay of failure notification does not cause any problem. By this notification, as to the backup path B, use of the bandwidth that the backup path B shares with the backup path A between the nodes #6 and #7 is prevented, and a state in which the active path that is switched from the backup path A is physically connected is kept.

On the other hand, in a default state shown in FIG. 44A, when a failure occurs in the active path B, the physical connection between the nodes #6 and #7 in which the bandwidth is shared with the backup path A is switched to the backup path B. This state is shown in FIG. 44B. Accordingly, the connection of the backup path A is disconnected temporarily.

When the failure of the active path B is restored so that changeover from the backup path B to the active path B occurs, physical connection of the backup path A is automatically reinstated so that the backup path A functions as the hot state backup path.

As mentioned above, for a backup path having a short route length, the failure recovery process is performed by the failure notification, and on the other hand, for a backup path having a long route length, APS switching is realized and backup path bandwidth (optical channel) is shared with the backup path having a short route length. Accordingly, failure recovery can be completed within a predetermined time for all optical paths against any failure occurrence. At the same time, backup path bandwidth sharing effects the same as the effects of the restoration method that does not use the hot state backup path can be expected, so that compatibility between economy and speed of failure recovery can be achieved.

Embodiment 5-2

Path Switching Apparatus

Figure 46:
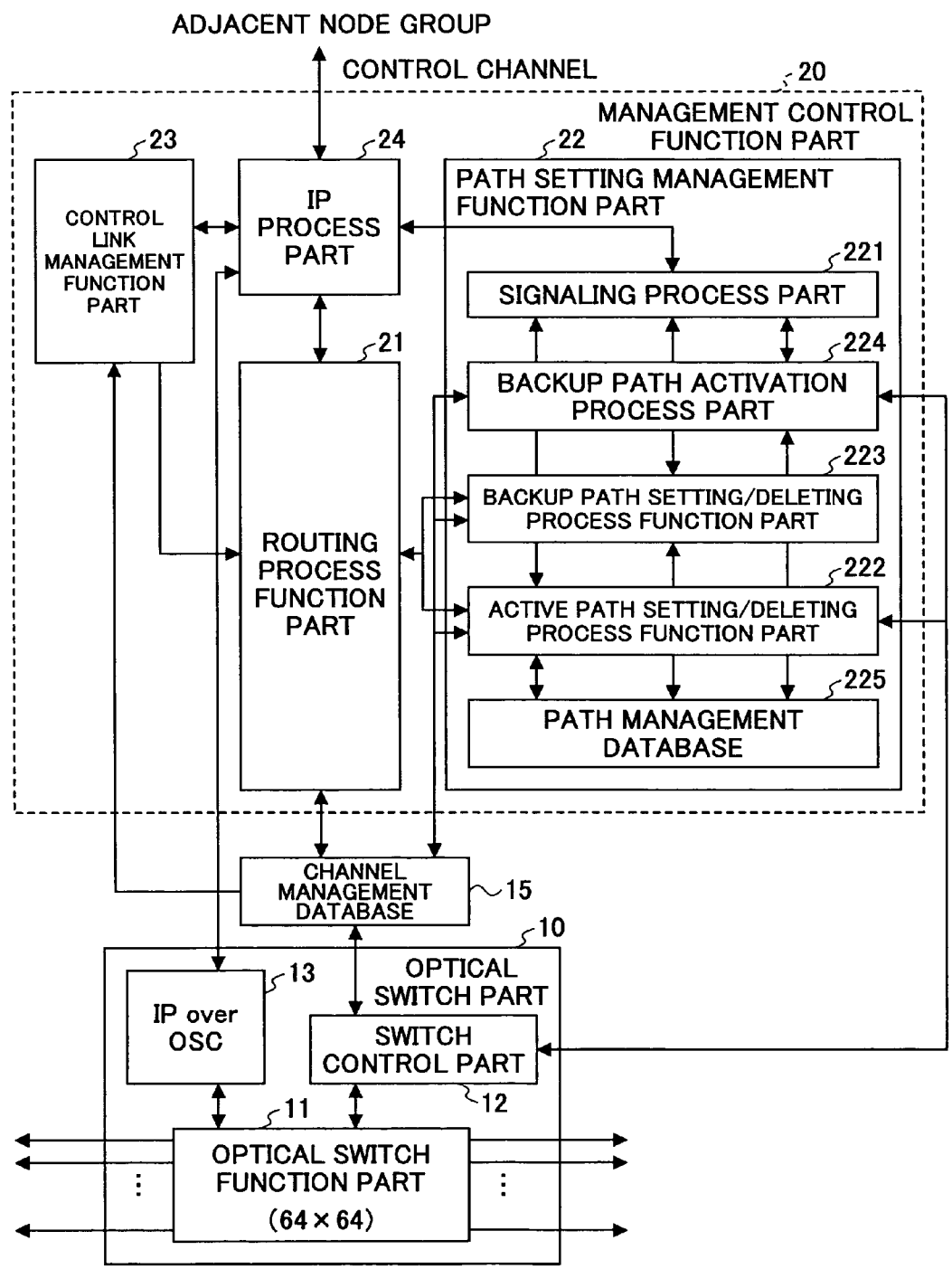
FIG. 46 is a figure showing a path switching apparatus of an embodiment 5-2.

FIG. 46 is a block diagram of the path switching apparatus of the present embodiment. In the figure, the path switching apparatus includes an optical switch part 10 for realizing cross-connection for each optical path, a management control function part 20 for managing it and a channel management database 15. The optical switch part 10 includes an optical switch function part 11, a switch control part 12 for controlling the optical switch function part 11, and a control signal interface (IP over OCS) 13 for exchanging a control signal with the management control function part 20.

The configuration and the operation of the management control function part 20 are almost the same as those of the embodiment 1-5 excluding the path management part 225.

The path management part 225 manages backup paths by distinguishing hot state backup paths from backup paths that are not the hot state backup paths. In addition, the path management part 225 includes means for allowing release of bandwidth occupied by the hot state backup paths as means for restoring other active paths.

In the means, path trunk identification number information and input and output interface numbers are included as attribute information of the hot state backup path, the means indicate that the path is physically connected in each node excluding the start and end nodes, and bandwidth sharing with other backup paths is allowed.

The path setting management function part 22 includes means for sending and receiving identification information indicating whether a backup path that is set between own node and an adjacent node is a hot state backup path. Accordingly, high speed failure recovery with the above-mentioned method can be performed autonomously and in a distributed manner in the whole network.

In addition, when the path setting management function part 22 sends or receives, along a route of a backup path, a switching message for switching an active path to a backup path when a failure occurs, the path setting management function part 22 includes means for accessing the path management part 225 to obtain channel bandwidth information accommodating the hot state backup path, and select a switching destination of the backup path to generate a switching message including the channel bandwidth. Accordingly, in the case shown in FIG. 44B, the setting of the hot state backup path that is physically connected can be released temporarily, and another backup path to be activated by a failure recovery process can be newly set. This enables the hot state backup path to switch rapidly, and enables bandwidth sharing the same as that of the restoration method that does not use the hot state backup path. In this method, it is assumed that bandwidth sharing between hot state backup paths is not performed.

In addition, when a failure occurs in the active path, the path setting management function part 22 transfers a message, along path switching apparatuses on a route of a hot state backup path that restores the active path, for requesting not to release bandwidth of the hot state backup path for failure recovery for other paths when a failure occurs in the active path. Accordingly, when the hot state backup path is used as an active path, the bandwidth of the hot state backup path can be prevented from being used by other backup paths.

As mentioned above, according to the path switching method and the path switching apparatus of the present embodiments 5-1 and 5-2, by sharing the backup path bandwidth for plural backup paths (hot state backup path and normal backup path), amount of equipment required for the whole network can be decreased. Further, as to the backup path having a long route length, switching from an active path to the backup path can be performed rapidly, which is difficult by the normal restoration method.

Embodiment 6

In the restoration method described with FIGS. 42A and B, the bandwidth sharing of the backup paths is performed for achieving 100% failure recovery for a single link failure. Thus, when multiple failures occur in a network, contention for bandwidth may occur in a section in which bandwidth sharing of backup paths is performed so that there may be a case where the failure recovery fails.

Figure 47:
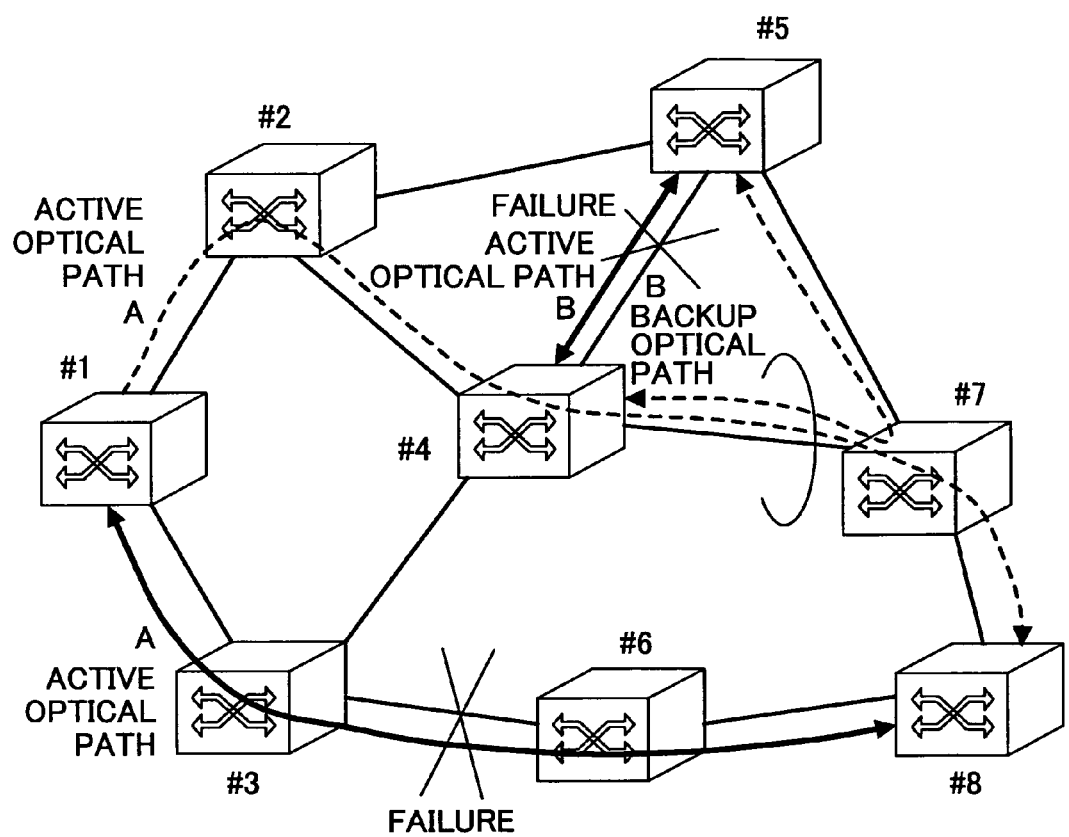
FIG. 47 is a figure showing a state when multiple failures occur.

For example, in an example shown in FIG. 47, assumed that failures occur at the same time in a link between the nodes #3-#6 and in a link between nodes #4-#5 when an active optical path A is set among nodes #1-#3-#6-#8, the corresponding backup optical path A is set among nodes #1-#2-#4-#7-#8, an active optical path B is set between nodes #4-#5, and the corresponding backup optical path B is set among nodes #4-#7-#5. When two backup optical paths between nodes #4-#7 share one backup optical channel, backup optical channels are lacking for recovering from such multiple failures so that contention for keeping bandwidths occurs.

As to the restoration method, various investigations are performed for the contention control when multiple failures occur. For example, in a document 6 (T. Yahara, R. Kawamura, "Virtual path self-healing scheme based on multi-reliability ATM network concept", IEEE Globcom '97, vol. 3, pp. 3-8, 1997), a method is proposed in which backup paths are classified into plural classes so that coordination can be available even when conflict occurs during switching to a bandwidth-shared backup channel. For example, it is a method in which priority classes of backup paths are defined, and a backup path having a higher priority class is restored according to priority when the multiple failures occur. Accordingly, failure recovery is efficiently performed in decreasing order of the priority.

In addition, a method is proposed in which priority order of failure recovery is provided to every path to be failure-recovered, so that coordination is available even when the conflict occurs during switching to a backup system that shares bandwidth. In this method, backup paths are switched to the backup system in a descending order of priority when the failure occurs. Accordingly, failure recovery is efficiently performed when multiple failures occur.

By the way, contention control performed when multiple failures occur in the restoration method attaches importance to coordination when contention occurs. For example, a backup path having a higher priority is restored by priority. But, the contention control in the restoration method is not based on a viewpoint of recovering multiple failures as much as possible. In addition, both are controlled by a network management system that performs path management in a concentrated manner, so that there is a problem in speed of the failure recovery process, which leads to limiting the network scale.

In view of the above-mentioned points, a technology is described for efficiently performing failure recovery by distributed control when multiple failures occur.

Figure 48:
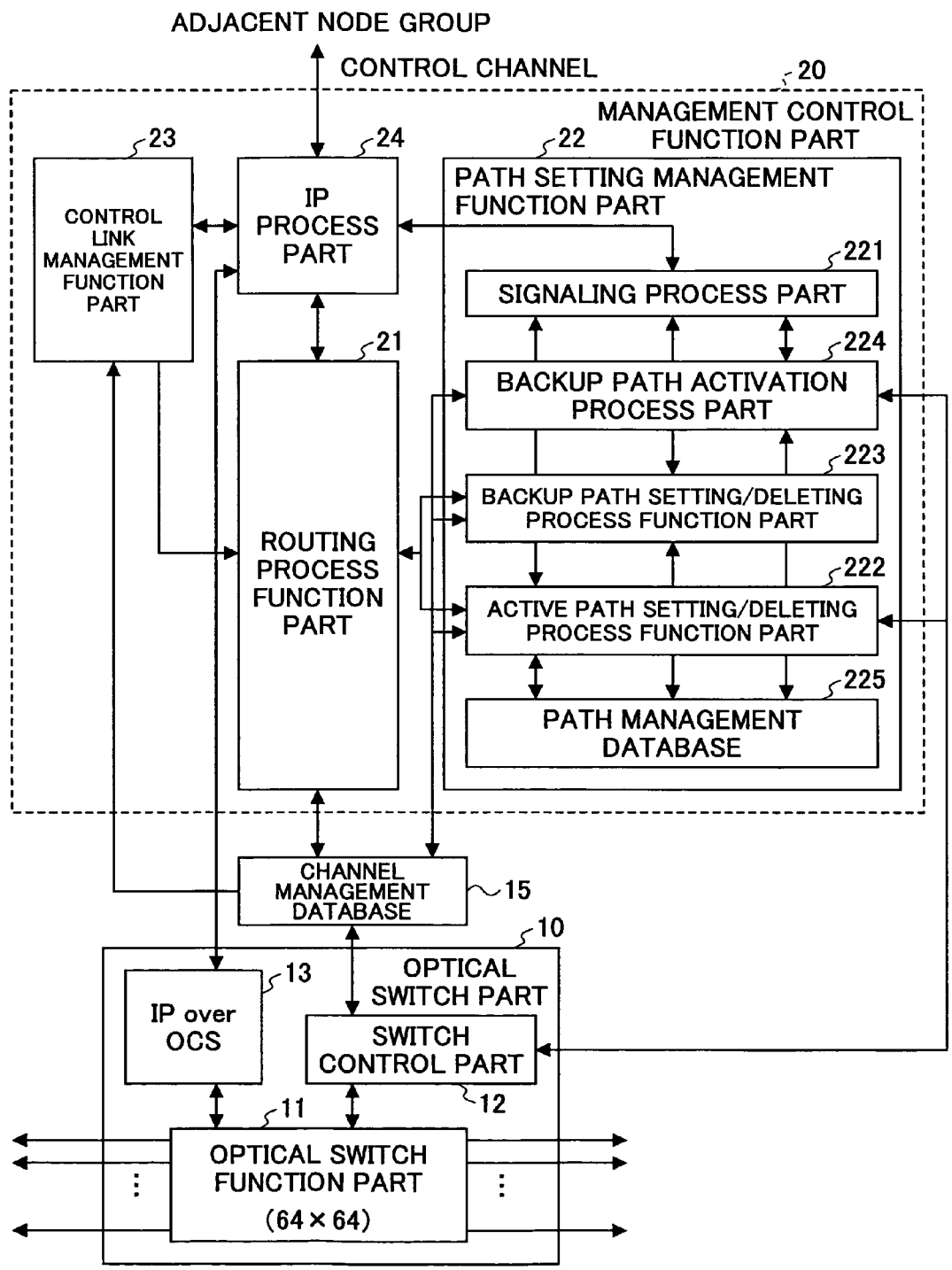
FIG. 48 is a figure showing a configuration example of a path switching apparatus including the path management apparatus of an embodiment 6.

FIG. 48 is a block diagram of a path switching apparatus including the path management apparatus of the present embodiment. In the figure, the path switching apparatus includes an optical switch part 10 for realizing cross-connection for each optical path, a management control function part 20 for managing and controlling it and a channel management database 15. The optical switch part 10 includes a 64×64 optical switch function part 11, a switch control part 12 for controlling the optical switch function part 11, and a control signal interface (IP over OCS) 13 for exchanging a control signal with the management control function part 20. Instead of the optical function part 11, a switch function part that inputs and outputs 8 SDH links of 2.5 Gbit/s and that can perform cross-connection processes for each VC-4 (150 Mbit/s) can be used.

The configuration and the operation of the management control function part 20 are almost the same as those of the embodiment 1-5 excluding the path management apparatus 225.

The path management apparatus 225 of the present embodiment has a function for sending, via the backup path activation process part 224 and the signaling process part 221, a setting state of a backup path to each node which the backup path passes through. In addition, when the path management part 225 detects a backup path that cannot be activated (failure recovery unavailable) due to the fact that an optical channel that accommodates the backup path fails or the optical channel is used by another-backup path, the path management part 225 notifies nodes through which the backup path passes with a "backup path activation impossible message". Further, the path management apparatus 225 may ascertain the activation possibility for each section of two nodes through which the backup path passes so as to include the information in the "backup path activation impossible message".

Figure 49A:
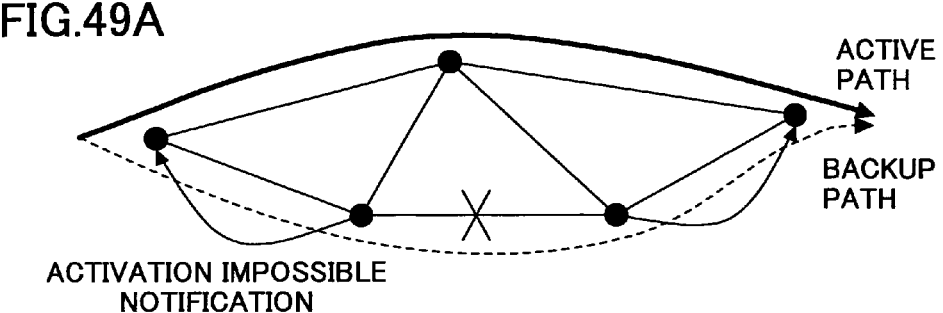
FIGS. 49A, B and C are figures showing notification methods for a backup path activation-impossible message.

FIGS. 49A, B and C show methods for transferring the backup path activation impossible message. In a first method, as shown in FIG. 49A, the "backup path activation impossible message" is multicasted from a node that detects the activation impossibility of the backup path to nodes through which the backup path passes.

Figure 49B:
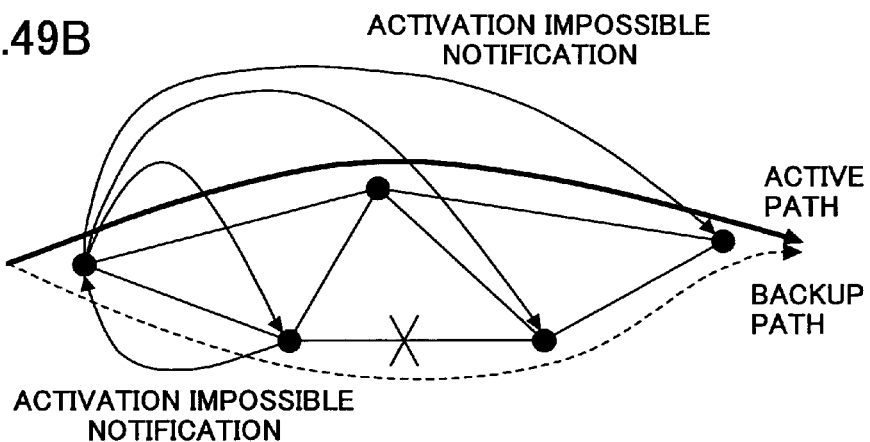

In a second method, as shown in FIG. 49B, the "backup path activation impossible message" is sent from a node that detects the activation impossibility of the backup path to a start node of the backup path, and the "backup path activation impossible message" is multicasted from the start node to each node to an end node of the backup path.

Figure 49C:
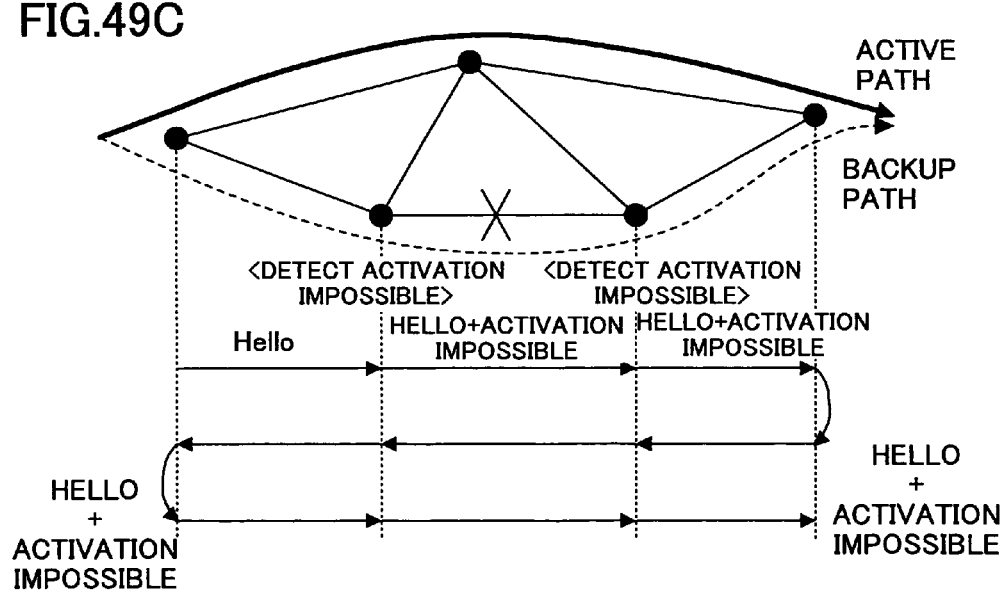

In a third method, as shown in FIG. 49C, a backup path management message (Hello message of a standard specification in RSVP-TE protocol in the figure) is used in which the message is transferred periodically from a start node of the backup path to the end node (or reverse of this direction) for normality checking. A node that detects the activation impossibility of the backup path adds the "backup path activation impossible message" to the Hello message so that the message can be communicated to every node through which the backup path passes.

The path management apparatus in a node that receives the "backup path activation impossible message" transferred in the above-mentioned way can ascertain, as management attribute information of the backup path, whether the backup path can be activated, so that performing useless switching processes for a backup path that cannot be activated can be avoided. Accordingly, useless contention in which plural backup paths including the backup path that cannot be activated try to keep bandwidth can be avoided.

In addition, since it can be known beforehand that failure recovery by a reserved backup path is impossible, it becomes possible to quickly take a measure such as recovering an active path via another route.

In addition, each node through which the backup path passes can know that the backup path cannot be activated when a channel that accommodates the backup path fails or is already used for another backup path in another node section, for example. Thus, a channel of the backup path can be used for another backup path so that there is a high probability that the other backup path can be restored even when multiple failures occur as described in the following.

Figure 50:
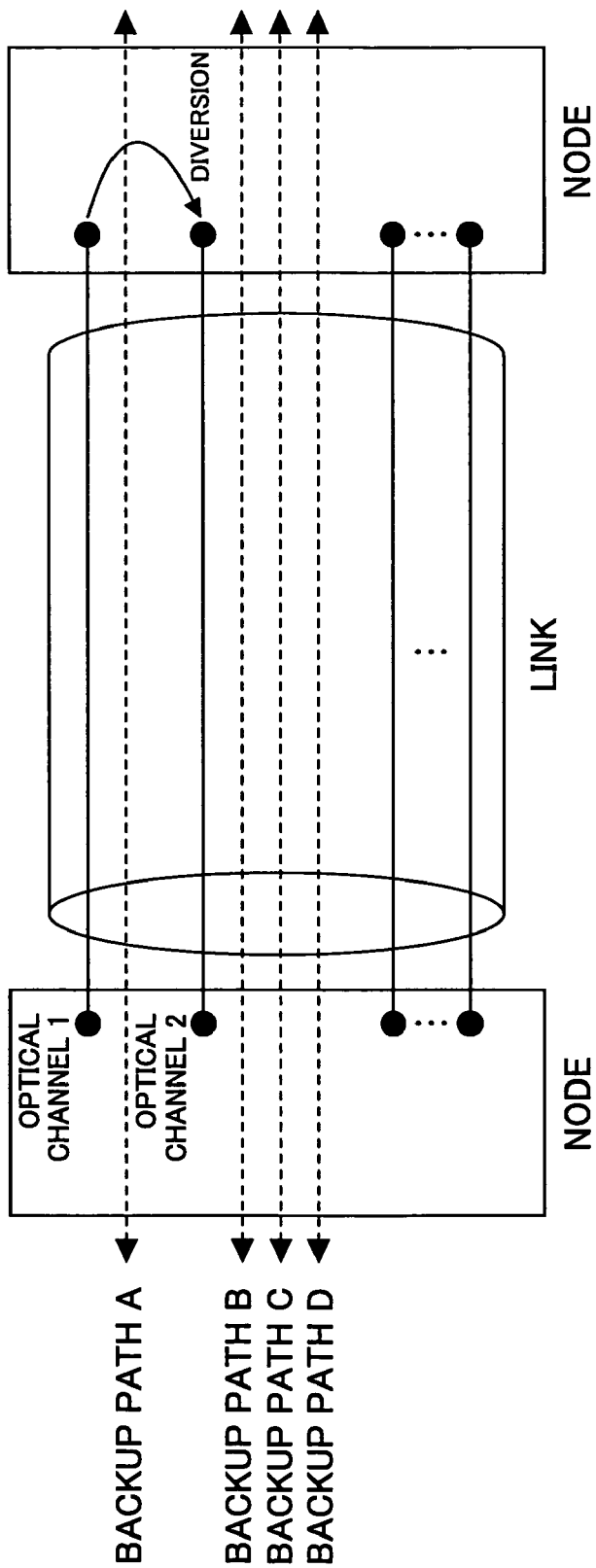
FIG. 50 is a figure showing a management example in the path management apparatus of the embodiment 6.

FIG. 50 shows a path management example in the path management apparatus of the present embodiment. In the figure, assuming that an optical channel 1 is assigned solely to a backup path A of a failure service class 1, and an optical channel 2 is shared by backup paths B, C and D of a failure service class 2. When the backup path A cannot keep an optical path in another node section due to the fact that a failure occurs or the optical channel is used by another backup path, the backup path A cannot be activated, so that the optical channel 1 that accommodates the backup path A in the node is not used. At this time, assumed that multiple failures occur in a section corresponding to the backup paths B and C so that it becomes necessary to keep an optical channel at the same time so that contention for a shared optical channel 2 occurs. In this situation, if it is communicated by the methods shown in FIGS. 49A-49C that activation of the backup path A is already impossible, the optical channel 1 that accommodates the backup path A can be diverted for an optical channel for accommodating the backup path B or the backup path C. Accordingly, simultaneous recover by the backup paths B and C can be performed for multiple failures.

Figure 51:
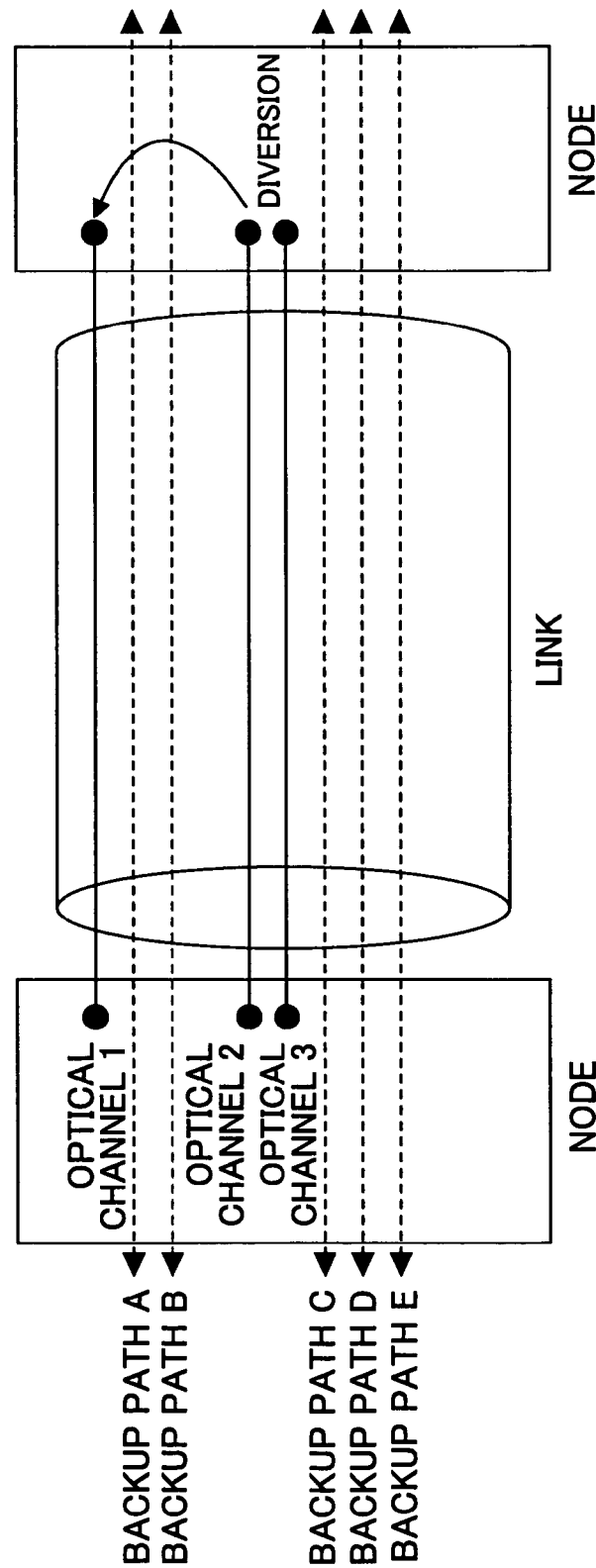
FIG. 51 is a figure showing another management example in the path management apparatus of the embodiment 6.

FIG. 51 shows another path management example in the path management apparatus of the present embodiment. In the figure, it is assumed that backup paths A and B of the failure service class 1 share the optical channel 1, and the backup paths C, D and E of the failure service class 2 share the optical channels 2 and 3. Here, assumed that the backup paths A and B try to keep the optical channel 1 simultaneously due to occurrence of multiple failures. At this time, for both of the backup paths A and B to be restored, the optical channel 2 or the optical channel 3 that accommodates the backup paths C, D and E of a lower failure service class is diverted for an optical channel for accommodating the backup path A or the backup path B. Accordingly, simultaneous recovery by the backup paths A and B can be performed for multiple failures.

As described above, according to the path management apparatus of the present embodiment, for a backup path that cannot keep a channel that accommodates the backup path at another node section, activation of the backup path is made impossible, and the impossibility of activation of the backup path is communicated to nodes through which the backup path passes, so that useless contention between plural backup paths including the backup path that cannot be activated when multiple failures occur is avoided.

Further, according to the notification of the activation impossible backup path, by performing path management in which the channel for the activation impossible backup path is diverted or a channel for a backup path of a lower failure service class is diverted, it becomes possible to increase activation success probability when multiple failures occur.

Embodiment 7-1, 7-2

Figure 5:
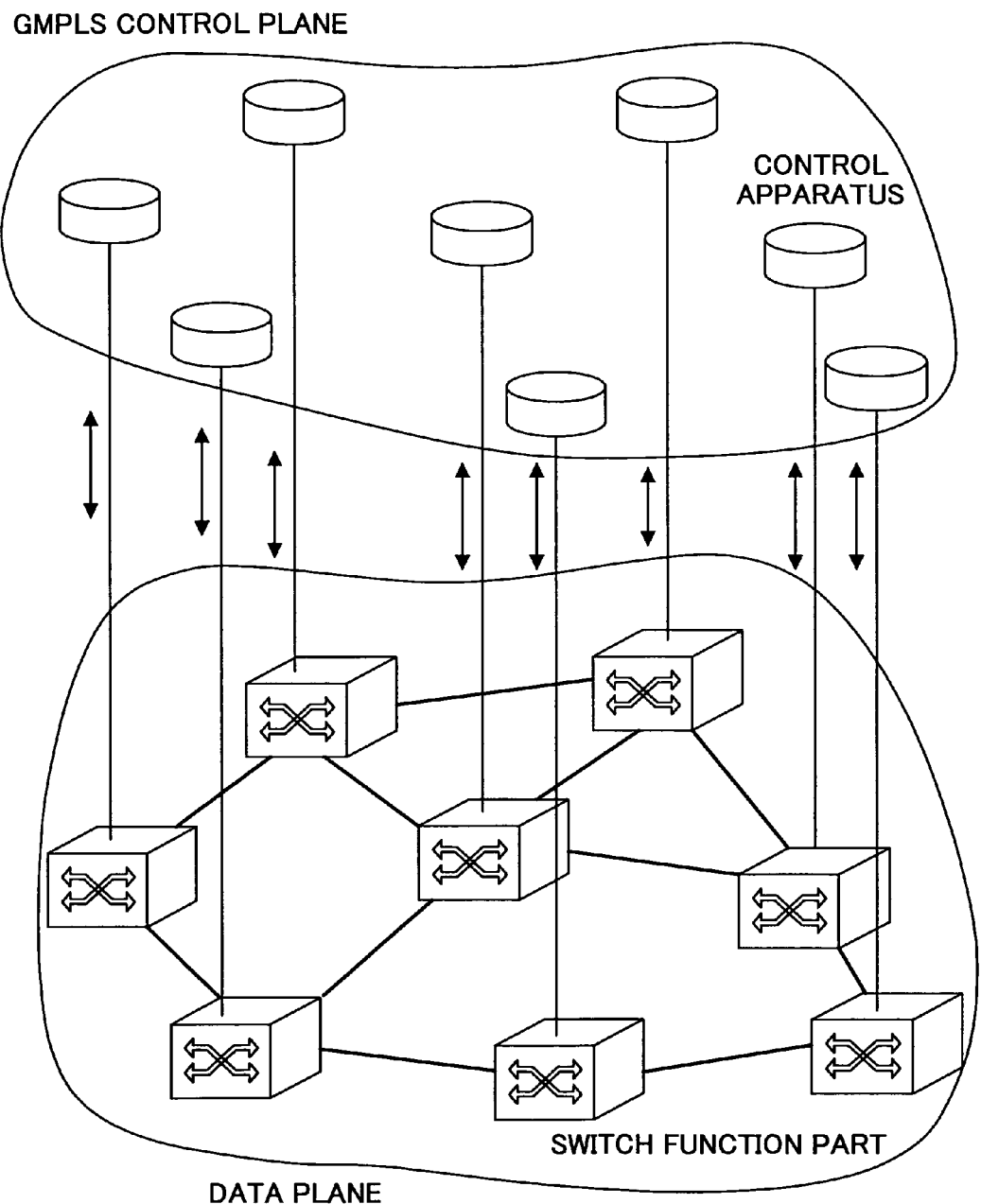
FIG. 5 is a figure showing a network using optical routers.

As shown in FIG. 5, a network using optical routers is configured such that a data plane formed by switch function parts for transferring user information and a control plane formed by control apparatuses for transferring control signals of the communication network are separated.

The data plane is a highly reliable network based on the SDH or OTN (Optical Transport Network) technique. On the other hand, the control plane is a network based on Ether switches or IP routers. Generally, the network configuration of the control plane has higher redundancy than the data plane.

In IETF (Internet Engineering Task Force) that is a standardization organization of GMPLS, standardization of Link Management Protocol (LMP) is in progress (IETF:draft-ietf-ccamp-lmp-07.txt) as a protocol for checking normality of the control plane.

Figure 52:
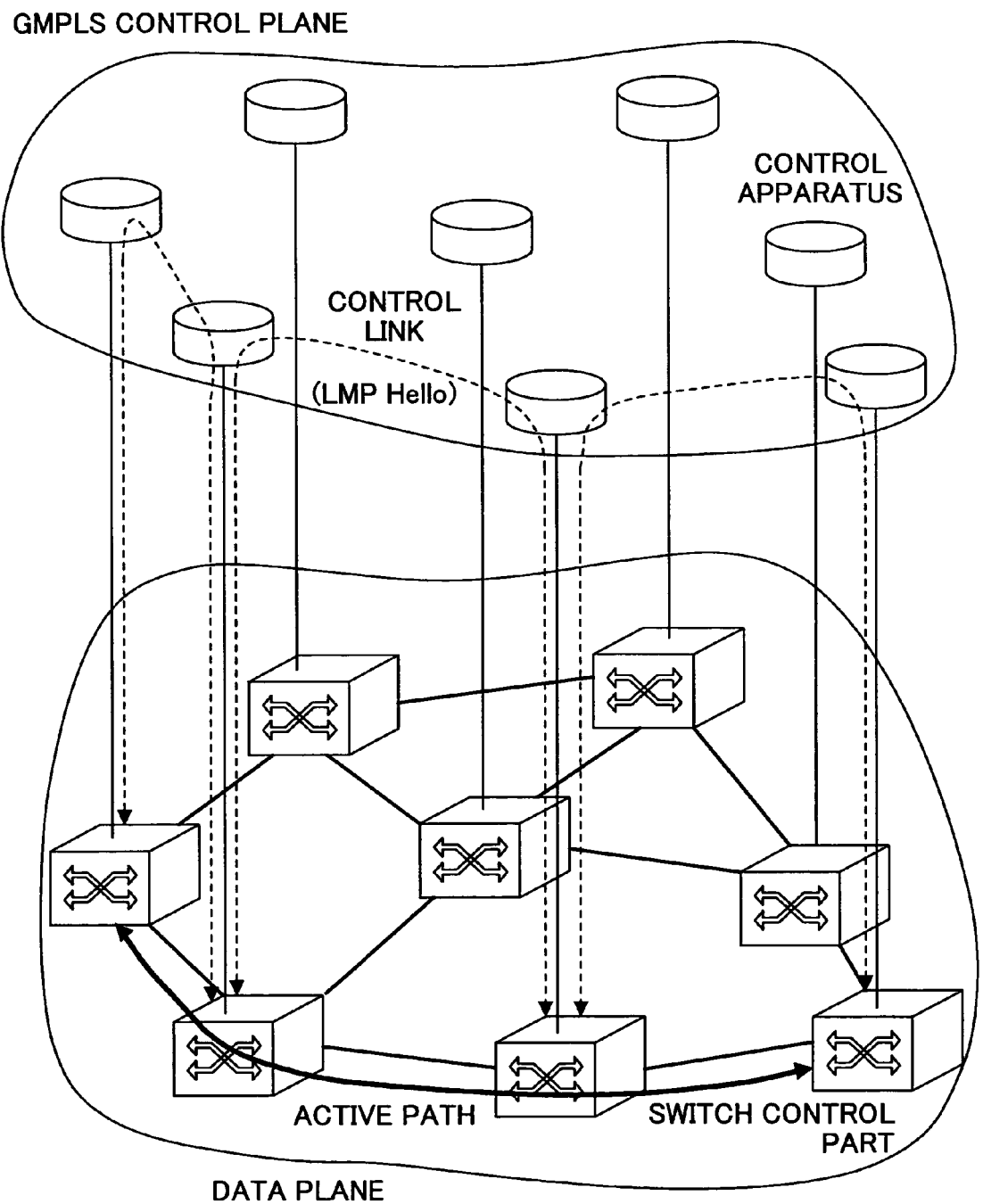
FIG. 52 is a figure showing an example of a signaling process.

As shown in FIG. 52, in LMP, a control channel is established between adjacent nodes in the data plane via control apparatuses in the control plane, and a hello packet for communicating only a sequence number is exchanged between the nodes via the control channel. When the exchange of the hello packet fails, abnormality of the control channel is detected. The exchange period of the hello packet is 10~100 msec in the standard, so that abnormality detection can be performed rapidly. In a state (LMP Degraded State) in which the control plane is abnormal, it is necessary in each node to prevent the failure of the control plane from adversely affecting the normal data plane. For example, it is necessary to eliminate unnecessary switching operations due to misidentifying disconnection of a path set in the data plane or control channel failure as link disconnection.

By the way, the path of the data plane is set by signaling processes via the control plane shown in FIG. 52. There are "hard state" and "soft state" as concepts for maintaining and managing the path that is set.

Figure 53:
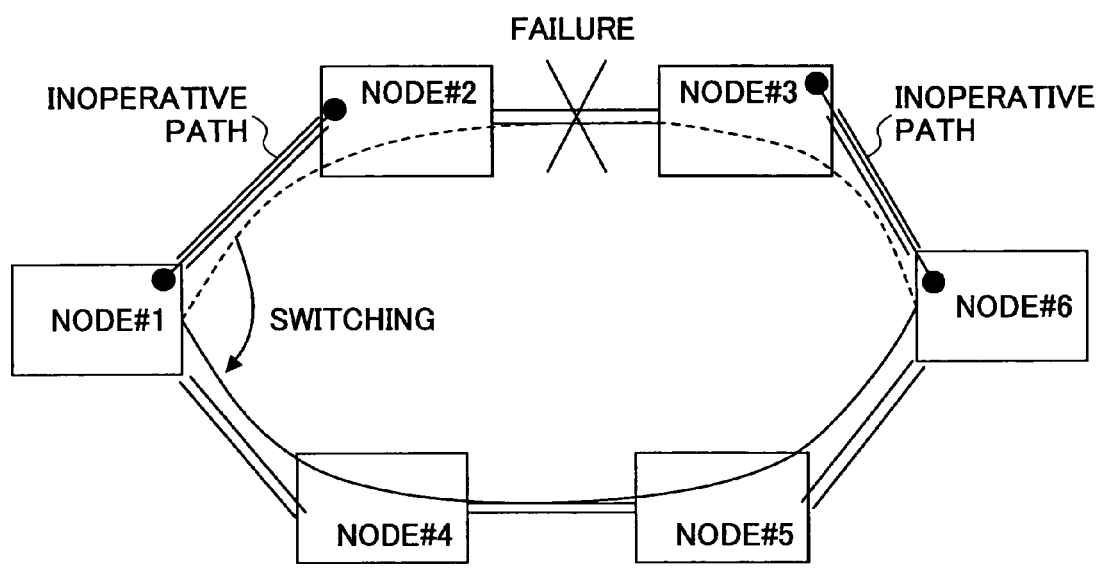
FIG. 53 is a figure showing a problem of the hard state.

In the hard state, as to a path that is once established, a path setting state is semipermanently stored in each node unless there is a clear disconnection instruction, and a cross-connection state for opening a path is kept. The advantage of the hard state is that maintaining and managing processes for the path state that is once set are unnecessary. Even when a failure occurs in the control plane, disconnection and unnecessary switching operations do not occur. On the other hand, when a large scale disaster that may cause an outage of a node occurs, it becomes difficult to quickly reestablish a network using the remaining normal network apparatuses. For example, as shown in FIG. 53, when a failure occurs in a section between nodes #2-#3 in a route of nodes #1-#2-#3-#6 so that the route is switched to a route of nodes #1-#4-#5-#6, a failure path disconnection instruction is not provided to the paths of nodes #1-#2 and nodes #3-#6, so that inoperative paths remain and a state in which network resources are uselessly consumed continues.

On the other hand, in the soft state, normality check for a path that is set is performed by periodic signaling processes via the control plane. For example, in the RSVP-TE protocol, the hello packet for checking normality of a path is periodically exchanged between path ends. When the normality is not confirmed within a predetermined time, a path setting state in each node is deleted, and a cross-connection state for opening the path is released. Accordingly, occurrence of inoperative paths is reduced so that a waste of network resources due to a path registration deleting error can be completely eliminated. In addition, it becomes possible to quickly and automatically delete failure paths that should be deleted even when a large scale disaster occurs, so that quick recovery by reestablishing the network can be realized and flexibility of network operations at the time of occurrence of abnormality can be increased.

There are merits and demerits in each of the hard state and the soft state. For example, in the hard state, postprocessing for setting of a path that is abnormally terminated is necessary. On the other hand, as for the soft state, since the setting status of the path that is abnormally terminated is automatically released, there is a merit that a software development amount necessary for software controlled abnormality processing can be largely decreased. However, in the soft state, a strict definition of the state (LMP Degraded State) of abnormality of the control plane is necessary, and highly reliable design for avoiding having the failure of the control plane adversely affecting the normal data plane is necessary. These are problems of the soft state.

For obtaining merits of both of the soft state and the hard state, a soft-hard state is defined as a middle state. The soft-hard state is a soft state in which the path setting is not as semipermanent as the hard state but the path setting is not deleted in a failure of several days. The soft-hard state is applied to so called legacy services such as the telephone, the digital private line, and the ATM private line. The conventional soft state is provided to a line that accommodates public IP traffic of a low quality class.

In the following, in each embodiment, a network control apparatus is described that provides a control function necessary for realizing such path management and that enables control for suppressing disconnection of a normal path set on the data plane and suppressing an unnecessary switching operation as adverse effects due to failure of the control plane.

Embodiment 7-1

First, an outline of a control method of the present embodiment is described.

In the network control apparatus of the present embodiment, a soft state is introduced for deleting path management information registered in the path management database when a normal check elapsed time exceeds a threshold. State transition from the soft state to the hard state is triggered by detecting a state (LMP Degraded State) of an abnormality in the control plane in a node.

A node that detects the LMP Degrade checks normality of the data link corresponding to the control link. If there is no abnormality in the data link, a path that passes through the data link is changed to the soft-hard state. Further, the event of the state transition is communicated to all nodes through which the path passes for transferring the path from the soft state to the soft-hard state. Accordingly, disconnection of a normal path set on the data plane and an unnecessary switching operation due to failure of the control plane can be suppressed.

Figure 54:
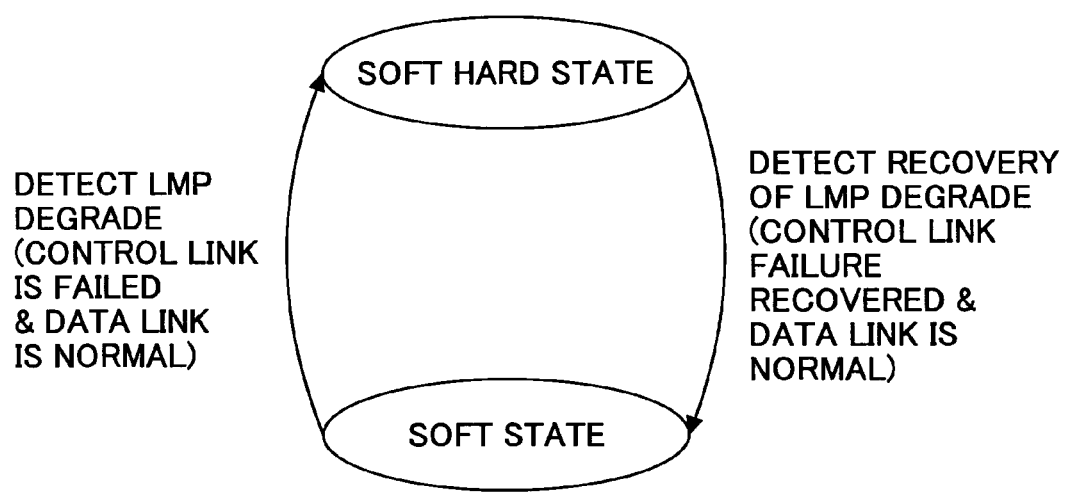
FIG. 54 is a figure showing state transition in a network control apparatus in embodiments 7-1 and 7-2.

Transition from the soft-hard state to the soft state is performed when recovery of the control link is verified and normality of the data link is verified. Also in this case, in the same way, the transition is communicated to all nodes through which the path passes such that all nodes recognize the transition. FIG. 54 shows the above-mentioned state transition.

Figure 55:
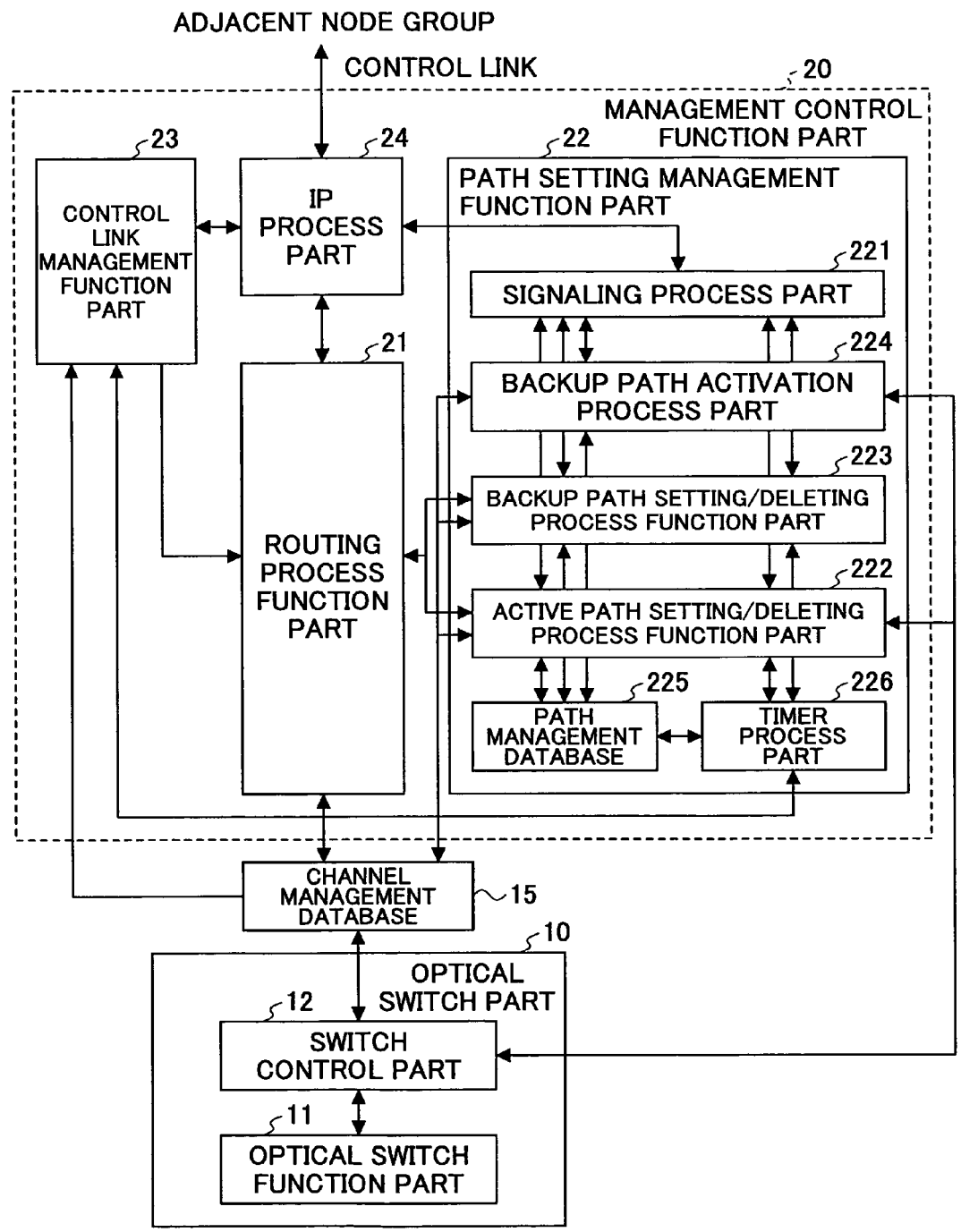
FIG. 55 is a figure showing a network control apparatus of the embodiment 7-1.

FIG. 55 shows a network control apparatus of the embodiment 7-1. In the figure, the network control apparatus includes an optical switch part 10 for realizing cross-connection for each wavelength path, a management control function part 20 for managing and controlling it, and a channel management database 15. The optical switch part 10 includes an optical switch function part 11 and a switch control part 12 for controlling the optical switch function part 11. The optical switch part 10 of this embodiment uses a 128×128 switch and has a function for inputting and outputting four fiber links each multiplexing 32 waves of optical paths. The transmission speed of each optical path is 2.5 Gbit/s, and is terminated with a SONET OC-48 interface.

Control links are formed by SONET OC-3 lines each having a transmission speed of 155 Mbit/s. The control signals are an OSPF/IS-IS protocol packet for obtaining a network topology of the optical network, a RSVP-TE/CR-LDR protocol packet for setting and releasing an optical path between packet switches, and a LMP protocol packet for performing failure monitoring for each fiber link.

The management control function part 20 includes a function part for processing the control signal protocols, and includes a routing process function part (OSPF/IS-IS protocol process function) 21 for realizing setting/releasing/switching/routing of an optical path, a path setting management function part (RSVP-TE/CR-LDR protocol process function) 22 for performing setting/releasing signaling for an optical path, a control link management function part (LMP protocol process function) 23 for performing failure monitoring of a control link network in which control signals are transmitted, and an IP process part 24.

The path setting management function part 22 includes a signaling process part 221, an active path setting/deleting process part 222, a backup path setting/deleting process part 223, a backup path activation process part 224 and a path management database 225 for performing setting management for paths that are set on the data network, and a timer process part 226. The signaling process part 221 not only performs establishment and deletion of a path, and a switching notification process associated with path failure recovery, but also keeps path setting by exchanging the hello packet periodically between path ends after path setting.

Figure 56:
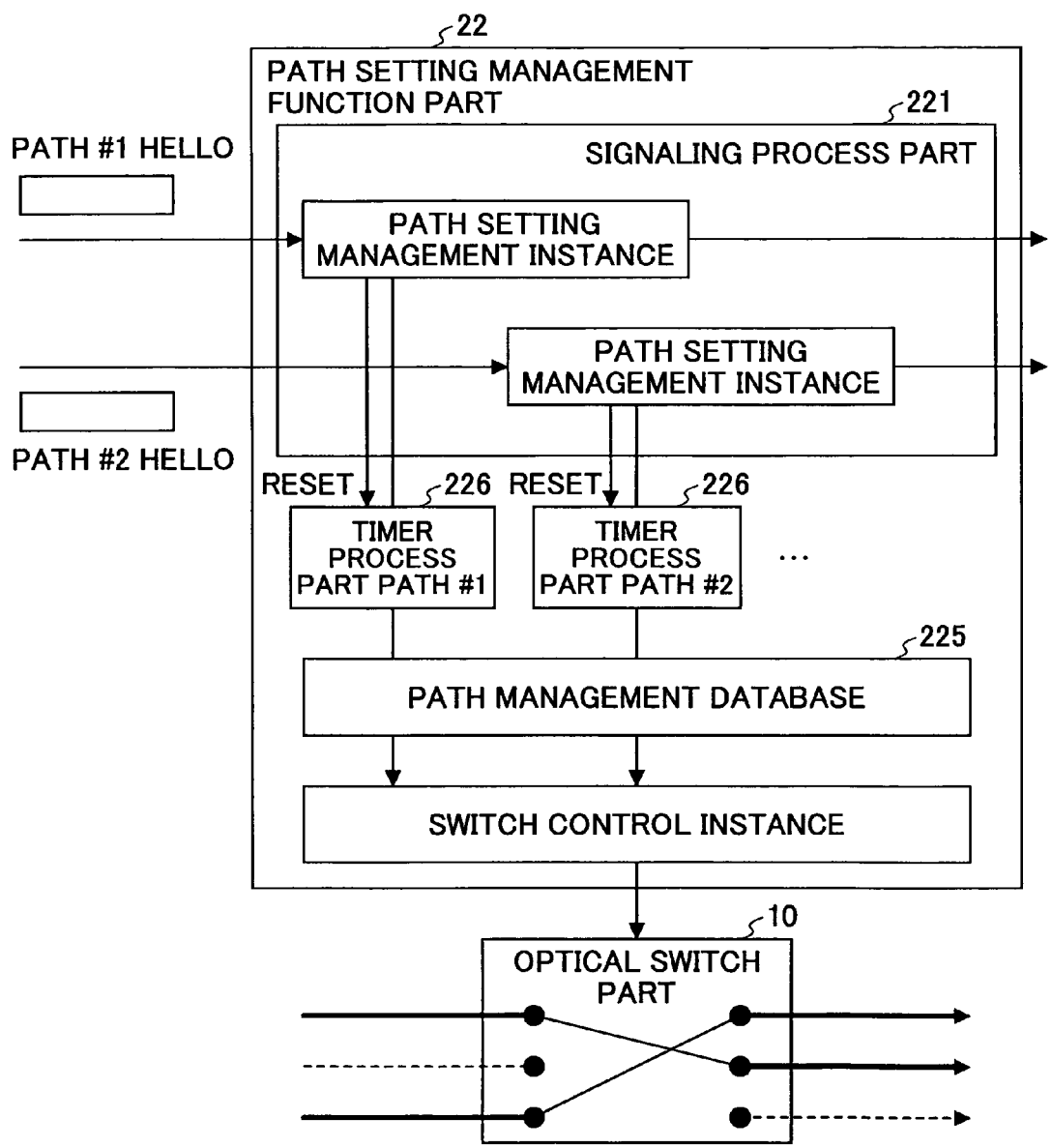
FIG. 56 is a figure for explaining an operation example of a path setting management function part 22.

As shown in FIG. 56, the signaling process part 221 notifies the timer process part 226 of arrival of the hello packet and a path identification number of a path on which the hello process has been performed, and the timer process part 226 resets the timer process for the path.

That is, the path setting is kept by periodically exchanging the hello packet for each of an active path and a backup path, and the timer process part 226 generates a process or an instance for the timer process for each path. When the normality check elapsed time elapsed by the timer process exceeds a threshold, the path management information registered in the path management database 225 is deleted, and the channel management database 15 for managing wavelength channels between optical cross-connects is operated so that a state of a channel occupied by the path to be deleted is changed to an unoccupied state. Further, the cross-connection state of the optical switch part 10 is released. By the above-mentioned procedure, maintenance and management by the soft state are realized.

Figure 57:
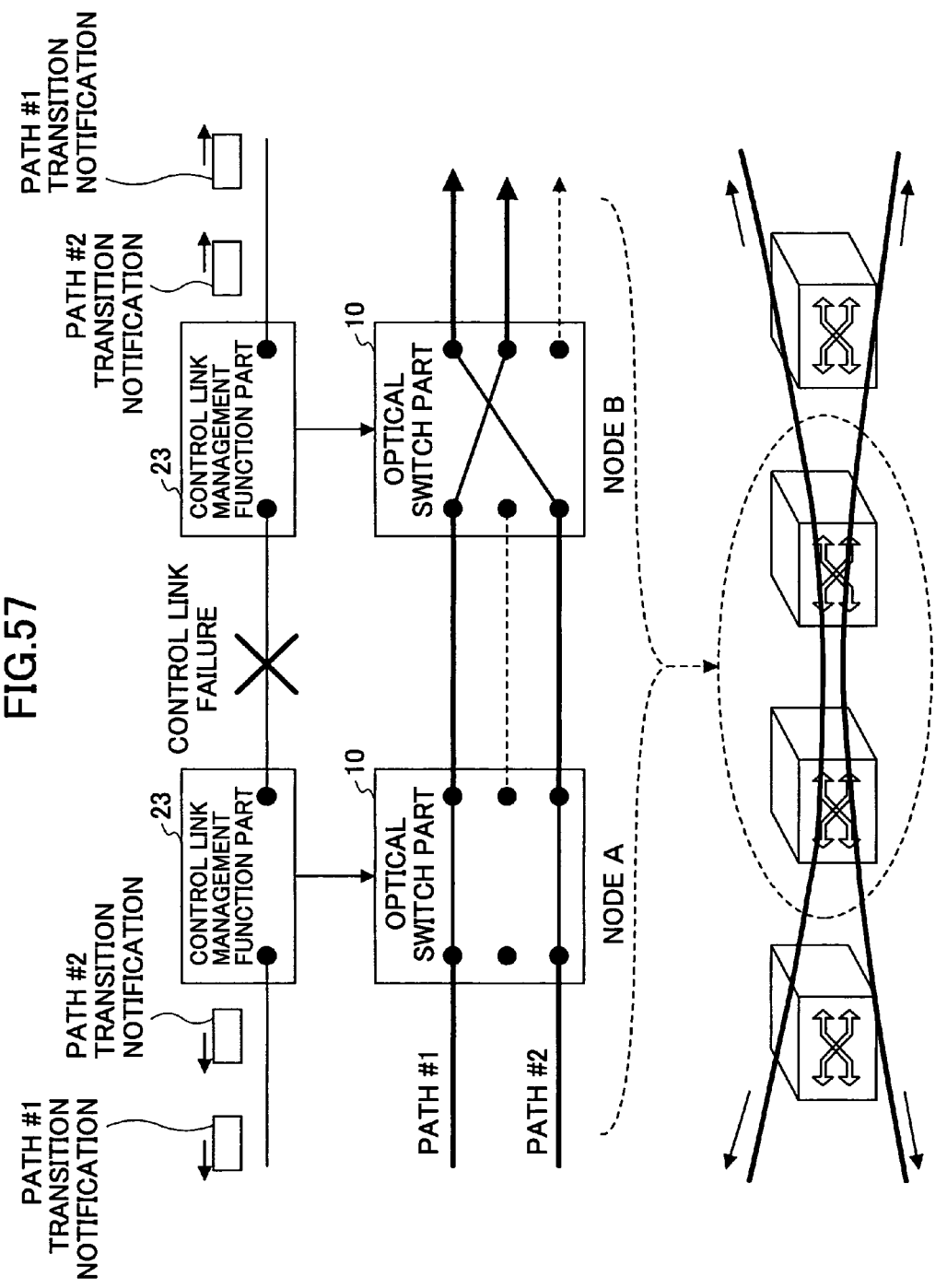
FIG. 57 is a figure for explaining an operation example of a control link management function part 23.

In a network in which the control plane and the data plane are clearly separated, reliable networking is realized in the following way. As shown in FIG. 57, when the control link management function part 23 detects abnormality of a control link connected to its own node, and verifies normality of a data link corresponding to the control link, the control link management function part 23 outputs a timer stopping signal to the timer process part 226 that is performing the timer process for the path in which setting maintenance (exchange of hello packet) is performed via the control channel in which the failure has occurred. The path for which the timer stopping process is performed is limited to one for which the exchange of the hello packet is performed via the control channel in which the failure occurred. The search for the corresponding path is performed by making an inquiry to the active path setting/deleting process part 222 and to the backup path setting/deleting process part 223 from the signaling process part 221.

The timer process part 226 receives the timer stopping signal so as to stop the timer process of the normality check elapsed time of the set path. Accordingly, an accidental disconnection process of paths associated with the failure of the control link can be avoided. That is, these paths are changed from the soft state to the soft-hard state.

In addition, following the failure of the control link, the signaling process part 221 performs the timer stopping process for a path for which the exchange of the hello packet is performed via the control link. As a result, as to the path in which the state is changed from the soft state to the soft-hard state, all nodes through which the path passes are notified of the transition. Accordingly, all sections of the path are changed from the soft state to the soft-hard state. As means for notifying the transition from the soft state to the soft-hard state, a signaling protocol such as RSVP-TE or CR-LDP is used.

Embodiment 7-2

Figure 58:
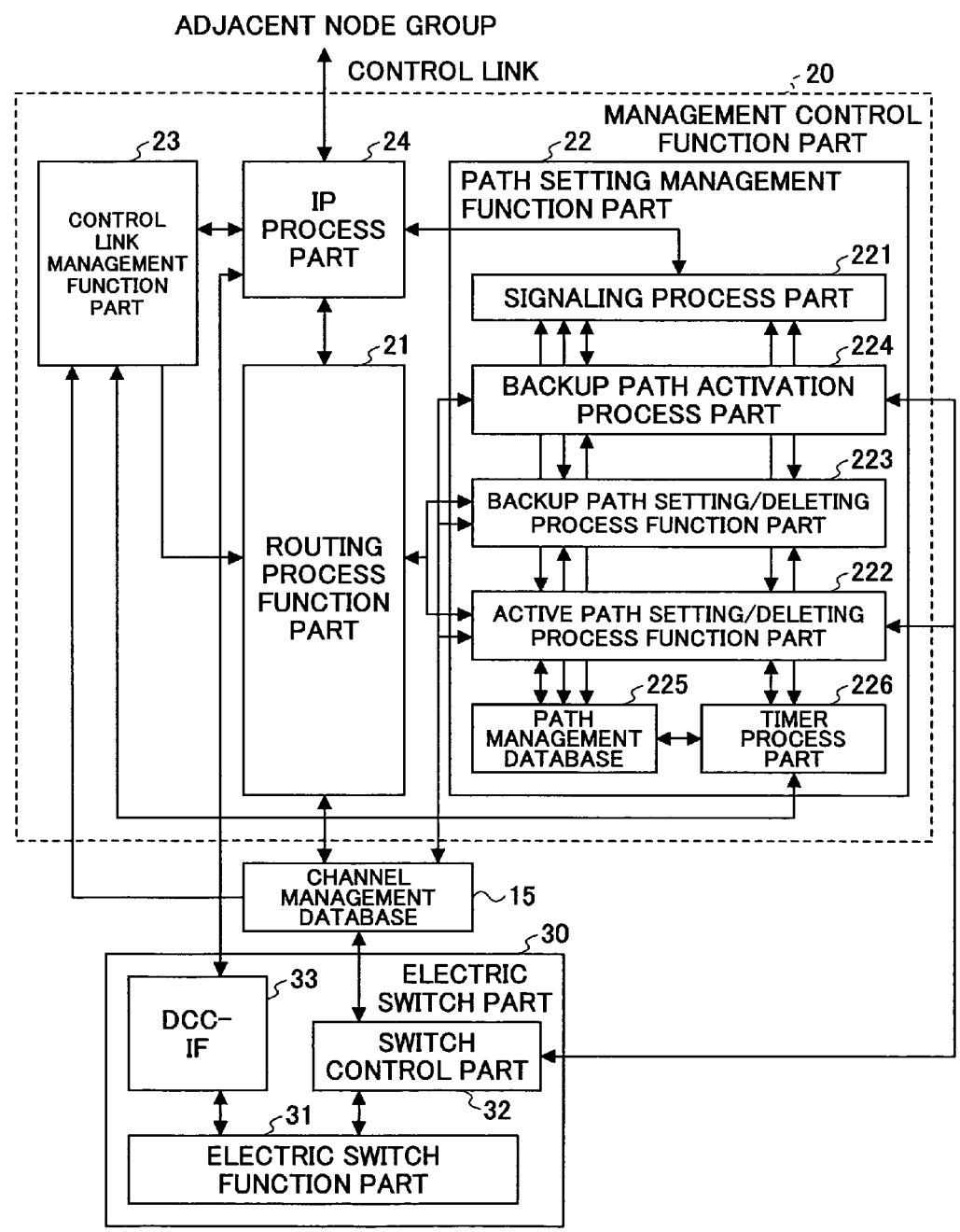
FIG. 58 is a figure showing a network control apparatus of the embodiment 7-2.

FIG. 58 shows a block diagram of the network control apparatus of the embodiment 7-2. The network control apparatus of this embodiment includes an electrical switch part 30 instead of the optical switch part 10 of the embodiment 7-1. The electrical switch part 30 includes a digital cross-connect switch function part 31 of 32×32 for realizing cross-connection for each SDH frame VC-4 (155 Mbit/s), a switch control part 32 for controlling it, and a digital cross connect interface (DCC-IF) 33 for exchanging a control signal with the management control function part 20.

The control circuit is configured by using a DCC channel of the STM 16 signal. The control signals are, for example, an OSPF/IS-IS protocol packet for obtaining a network topology, a RSVP-TE/CR-LDR protocol packet for setting or releasing a path established between packet switches, and a LMP protocol packet for performing failure monitoring of each fiber link.

The configuration of the management control function part 20 is almost the same as that of the embodiment 7-1, but functions are added to the control link management function part 23, which functions are a function for notifying an adjacent node of abnormality of a control link connected to the own node, and a function for notifying an adjacent node of the abnormality of the control link that is communicated from another adjacent node. Accordingly, the failure of the control link is communicated to the whole control area, so that all paths set in the control area are changed from the soft state to the soft-hard state. At the same time, new establishment of a VC-4 path that passes through the control area is temporarily stopped, so as to realize stable path operation. That is, for the failure of the control link, the soft state is introduced to the communication network, and at the same time, disconnection operation and unnecessary switching operation for the VC-4 path associated with the introduction of the soft state are suppressed in a predetermined area, so that stable path operation can be kept.

In the present embodiment, although the present invention is applied to the digital cross-connect network for realizing a networking of the STS-3/VC-4 path of the SONET/SDH frame, the present invention can be also applied to management control of virtual paths of the ATM network and label switched paths of the MPLS network.

In addition, when notifying the whole control area of the failure of the control link, by notifying the control area of identification number information of paths that pass through data links corresponding to the control links, transition from the soft state to the soft-hard state only for paths set in the data link can be also performed.

As described above, according to the network control apparatus of the embodiments 7-1 and 7-2, by introducing the soft state, cost reduction can be realized by reducing the development amount of abnormality process software in path management.

Further, normality of the data link corresponding to the control link is checked, and if there is no abnormality on the data link, a path that passes through the data link is changed to the soft-hard state, so that disconnection of a normal path set on the data plane and unnecessary switching operation due to control plane failure can be reduced. Accordingly, highly reliable networking independent from reliability of the control plane can be realized.

The present invention is not limited to the specifically disclosed embodiments, and variations and modifications may be made without departing from the scope of the present invention.

The invention claimed is:

1. A backup path bandwidth keeping method for keeping a bandwidth of a backup path to which an active path is switched when the active path becomes unavailable in nodes of a communication network, the backup path bandwidth keeping method including:

a step of keeping a backup path bandwidth by sending identification information indicating that a path for which a bandwidth is to be kept is a backup path, and sending risk classification number information of at least one of a link or a node of the link and the node through which an active path of the backup path to be set passes, to a destination-side node existing in a destination side of the backup path via each node on a route, the route being determined for the backup path before sending the identification information to the destination-side node; and a step of sending, before the active path becomes unavailable and to a source side node existing in a start point side of the backup path via each node on the route, a signaling message for keeping the bandwidth of the backup path, the signaling message including, for each link of the backup path, channel identification information of a backup channel or channel group identification information of a backup channel group, the channel identification information and the channel group identification information each specifying a communication resource to be used by the backup path on each link through which the backup path passes, wherein the channel identification information identifies a particular channel as the backup channel and the channel group identification information identifies a particular backup channel group as the backup channel group.

2. The backup path bandwidth keeping method as claimed in claim 1, wherein the identification information includes identification information to identify a failure service class.

3. The backup path bandwidth keeping method as claimed in claim 1, wherein the communication resource is a wavelength.

4. A backup path bandwidth keeping method for keeping a bandwidth of a backup path to which an active path is switched when the active path becomes unavailable in nodes of a communication network, wherein L (L is a natural number or 0) channels that are kept as a backup path bandwidth and that are connected to the same destination are defined as backup channels in each node, the backup path bandwidth keeping method includes:

a step of a keeping a backup path bandwidth, when keeping the bandwidth of the backup path, by sending identification information indicating that a path for which the bandwidth is to be kept is a backup path, and sending risk classification number information of at least one of a link or a node of the link and the node through which an active path passes, to a destination-side node existing in a destination side of the backup path via each node on a route, the route being determined for the backup path before sending the identification information to the destination-side node; and a step of sending, before the active path becomes unavailable and to a source side node existing in a start point side of the backup path via each node on the route, a signaling message for keeping the bandwidth of the backup path, the signaling message including, for each link of the backup path, channel identification information of a backup channel that is kept or that is to be kept when performing failure switching or channel group identification information of a backup channel group, the channel identification information and the channel group identification information each specifying a communication resource to be used by the backup path on each link through which the backup path passes, wherein the channel identification information identifies a particular channel as the backup channel and the channel group identification information identifies a particular backup channel group as the backup channel group.

5. A backup path bandwidth keeping method for keeping a bandwidth of a backup path to which an active path is switched when the active path becomes unavailable in nodes of a communication network, wherein L (L is a natural number or 0) channels that are kept as a backup path bandwidth and that are connected to the same destination are defined as backup channels in each node, the backup path bandwidth keeping method includes:

a step of keeping a backup path bandwidth, when keeping the bandwidth of the backup path, by sending identification information indicating that a path for which the bandwidth is to be kept is a back up path, sending risk classification number information of at least one of a link or a node of the link and the node through which an active path passes, and sending identification information of a backup channel that is a candidate to be kept, or identification information of a plurality of backup channels, to a destination-side node existing in a destination side of the backup path via each node on a route, the route being determined for the backup path before sending the identification information to the destination-side node; and a step of sending, before the active path becomes unavailable and to a source side node existing in a start point side of the backup path via each node on the route, a signaling message for keeping the bandwidth of the backup path, the signaling message including, for each link of the backup path, channel identification information of a backup channel that is kept or that is to be kept when performing failure switching or channel group identification information of a backup channel group, the channel identification information and the channel group identification information each specifying a communication resource to be used by the backup path on each link through which the backup path passes, wherein the channel identification information identifies a particular channel as the backup channel and the channel group identification information identifies a particular backup channel group as the backup channel group.

6. The backup path bandwidth keeping method as claimed in any one of claims 1-5, the method further including:

a step of reporting in which, as to the channel kept as the backup path bandwidth, when it becomes necessary to exchange the channel with another channel, at least identification number information of a new channel is reported to a node at an end point of an opposite side of the channel.

7. The backup path bandwidth keeping method as claimed in any one of claims 1-5, wherein path switching is performed in units of optical path transmitted between nodes by the wavelength division multiplexing scheme.

8. The backup path bandwidth keeping method as claimed in any one of claims 1-5, wherein path switching is performed in units of electrical path or optical path transmitted between nodes by the time division multiplexing scheme.

9. The backup path bandwidth keeping method as claimed in any one of claims 1-5, wherein path switching is performed in units of virtual electric path transmitted between nodes by cell, frame or packet multiplexing scheme.

10. A path switching apparatus comprising a path setting management function part for keeping a bandwidth of a backup path to which an active path is switched when the active path that is set in a communication network becomes unavailable, wherein the path setting management function part includes:

a backup path setting process part including a function for managing, as backup channels, L (L is a natural number or 0) channels that are kept as a backup path bandwidth and that are connected to the same destination; and a signaling process part for, when keeping the bandwidth of the backup path, receiving identification information indicating that a path for which the bandwidth is to be kept is a backup path that are reported from a first adjacent node on a source side, searching for an output port corresponding to the backup path, and outputting, to a second adjacent node on a destination side, identification information indicating that a path for which bandwidth is to be kept for an output side of the backup path is a backup path; and receiving, before the active path becomes unavailable and from the second adjacent node, a signaling message for keeping the bandwidth of the backup path, the signaling message including, for each link of the backup path, identification number information of a backup channel or channel group identification information of a backup channel group, the identification number information and the channel group identification information each specifying a communication resource to be used by the backup path on each link through which the backup path passes; and outputting the identification number information of the backup channel or the channel group identification information of the backup channel group to the first adjacent node, wherein the channel identification information identifies a particular channel as the backup channel and the channel group identification information identifies a particular backup channel group as the backup channel group, and wherein the first adjacent node, the path switching apparatus, and the second adjacent node are on a route, the route being determined for the backup path before outputting the identification information to the destination-side second adjacent node.

11. The path switching apparatus as claimed in claim 10, wherein the signaling process part includes a function for identifying a failure service class.

12. A path switching apparatus comprising a path setting management function part for keeping a bandwidth of a backup path to which an active path is switched when the active path that is set in a communication network becomes unavailable, wherein the path setting management function part includes:

a backup path setting process part including a function for managing, as backup channels, L (L is a natural number or 0) channels that are kept as a backup path bandwidth and that are connected to the same destination; and a signaling process part for, when keeping the bandwidth of the backup path, receiving identification information indicating that a path for which the bandwidth is to be kept is a backup path, and receiving risk classification number information of at least one of a link or a node of the link and the node through which an active path passes that are reported from a first adjacent node on a source side, searching for an output port corresponding to the backup path, and outputting, to a second adjacent node on a destination side, identification information indicating that a path for which bandwidth is to be kept for an output side of the backup path is a backup path, and risk classification number information of at least one of a link or a node of the link and the node through which an active path passes; and receiving, before the active path becomes unavailable and from the second adjacent node, a signaling message for keeping the bandwidth of the backup path, the signaling message including, for each link of the backup path, identification number information of a backup channel or channel group identification information of a backup channel group, the identification number information and the channel group identification information each specifying a communication resource to be used by the backup path on each link through which the backup path passes, and outputting the identification number information of the backup channel or the channel group identification information of the backup channel group to the first adjacent node, wherein the channel identification information identifies a particular channel as the backup channel and the channel group identification information identifies a particular backup channel group as the backup channel group, and wherein the first adjacent node, the path switching apparatus, and the second adjacent node are on a route, the route being determined for the backup path before outputting the identification information to the destination-side second adjacent node.

13. A path switching apparatus comprising a path setting management function part for keeping a bandwidth of a backup path to which an active path is switched when the active path that is set in a communication network becomes unavailable, wherein L (L is a natural number or 0) channels that are kept as a backup path bandwidth and that are connected to the same destination are defined as backup channels in each node, the path setting management function part includes:

a backup path bandwidth keeping process part for, when keeping the bandwidth of the backup path, by sending identification information indicating that a path for which the bandwidth is to be kept is a backup path, and sending risk classification number information of at least one of a link or a node of the link and the node through which an active path passes, to a destination-side node existing in a destination side of the backup path via each node on a route, the route being determined for the backup path before sending the identification information to the destination-side node; and a processing part for sending, before the active path becomes unavailable and to a source side node existing in a start point side of the backup path via each node on the route, a signaling message for keeping the bandwidth of the backup path, the signaling message including, for each link of the backup path, channel identification information of a backup channel that is kept or that is to be kept when performing failure switching or channel group identification information of a backup channel group, the channel identification information and the channel group identification information each specifying a communication resource to be used by the backup path on each link through which the backup path passes, wherein the channel identification information identifies a particular channel as the backup channel and the channel group identification information identifies a particular backup channel group as the backup channel group.

14. A path switching apparatus comprising a path setting management function part for keeping a bandwidth of a backup path to which an active path is switched when the active path that is set in a communication network becomes unavailable, wherein L (L is a natural number or 0) channels that are kept as a backup path bandwidth and that are connected to the same destination are defined as backup channels in each node, the path setting management function part includes:

a backup path bandwidth keeping process part for, when keeping the bandwidth of the backup path, by sending identification information indicating that a path for which the bandwidth is to be kept is a backup path, sending risk classification number information of at least one of a link or a node of the link and the node through which an active path passes, and sending identification information of a backup channel that is a candidate to be kept, or identification information of a plurality of backup channels, to a destination-side node existing in a destination side of the backup path via each node on a route, the route being determined for the backup path before sending the identification information to the destination-side node; and a processing part for sending, before the active path becomes unavailable and to a source side node existing in a start point side of the backup path via each node on the route, a signaling message for keeping the bandwidth of the backup path, the signaling message including, for each link of the backup path, channel identification information of a backup channel that is kept or that is to be kept when performing failure switching or channel group identification information of a backup channel group, the channel identification information and the channel group identification information each specifying a communication resource to be used by the backup path on each link through which the backup path passes, wherein the channel identification information identifies a particular channel as the backup channel and the channel group identification information identifies a particular backup channel group as the backup channel group.

15. The path switching apparatus as claimed in any one of claims 10-14, wherein path switching is performed in units of optical path transmitted between nodes by the wavelength division multiplexing scheme.

16. The path switching apparatus as claimed in any one of claims 10-14, wherein path switching is performed in units of electrical path or optical path transmitted between nodes by the time division multiplexing scheme.

17. The path switching apparatus as claimed in any one of claims 10-14, wherein path switching is performed in units of virtual electric path transmitted between nodes by cell, frame or packet multiplexing scheme.

* * * * *